US007251638B2

(12) United States Patent
Fujii et al.

(10) Patent No.: US 7,251,638 B2
(45) Date of Patent: Jul. 31, 2007

(54) INTELLIGENT ROBUST CONTROL SYSTEM FOR MOTORCYCLE USING SOFT COMPUTING OPTIMIZER

(75) Inventors: Shigeru Fujii, Iwata (JP); Hitoshi Watanabe, Iwata (JP); Sergey A. Panfilov, Crema (IT); Kazuki Takahashi, Crema (IT); Sergey V. Ulyanov, Crema (IT)

(73) Assignee: Yamaha Hatsudoki Kabushiki Kaisha (JP)

( * ) Notice: Subject to any disclaimer, the term of this patent is extended or adjusted under 35 U.S.C. 154(b) by 479 days.

(21) Appl. No.: 10/792,292

(22) Filed: Mar. 3, 2004

(65) Prior Publication Data

US 2005/0197994 A1 Sep. 8, 2005

(51) Int. Cl.
*G05B 13/00* (2006.01)
*G05B 13/04* (2006.01)
*G05B 15/00* (2006.01)

(52) U.S. Cl. .............................. 706/23; 706/1; 706/19; 700/28; 700/50

(58) Field of Classification Search ................. 706/59, 706/8, 50, 1, 23, 19; 700/28, 50
See application file for complete search history.

(56) References Cited

U.S. PATENT DOCUMENTS 4,989,148 A    1/1991  Gurke et al.

(Continued)

FOREIGN PATENT DOCUMENTS

| EP | 1 085 460 | 3/2001 |
|---|---|---|
| EP | 1083520 A | 3/2001 |
| JP | 10268904 A | 10/1998 |
| WO | WO 01-67186 A1 | 9/2001 |

OTHER PUBLICATIONS

Fuzzy Control of Rider-Motorcycle System Using Genetic Algorithm and Auto-Tuning. J.C. Wu and T.S. Liu. Mechatronics vol. 5, No. 4, pp. 441-455, 1995.*

(Continued)

*Primary Examiner*—Anthony Knight
*Assistant Examiner*—Adrian L. Kennedy
(74) *Attorney, Agent, or Firm*—Knobbe, Martens, Olson & Bear, LLP

(57) ABSTRACT

A Soft Computing (SC) optimizer for designing a Knowledge Base (KB) to be used in a control system for controlling a motorcycle is described. In one embodiment, a simulation model of the motorcycle and rider control is used. In one embodiment, the simulation model includes a feedforward rider model. The SC optimizer includes a fuzzy inference engine based on a Fuzzy Neural Network (FNN). The SC Optimizer provides Fuzzy Inference System (FIS) structure selection, FIS structure optimization method selection, and teaching signal selection and generation. The user selects a fuzzy model, including one or more of: the number of input and/or output variables; the type of fuzzy inference; and the preliminary type of membership functions. A Genetic Algorithm (GA) is used to optimize linguistic variable parameters and the input-output training patterns. A GA is also used to optimize the rule base, using the fuzzy model, optimal linguistic variable parameters, and a teaching signal. The GA produces a near-optimal FNN. The near-optimal FNN can be improved using classical derivative-based optimization procedures. The FIS structure found by the GA is optimized with a fitness function based on a response of the actual plant model of the controlled plant. The SC optimizer produces a robust KB that is typically smaller that the KB produced by prior art methods.

3 Claims, 42 Drawing Sheets

U.S. PATENT DOCUMENTS

| | | | |
|---|---|---|---|
| 5,111,531 | A | 5/1992 | Grayson et al. |
| 5,136,686 | A | 8/1992 | Koza |
| 5,142,877 | A | 9/1992 | Shimizu |
| 5,159,555 | A | 10/1992 | Wada |
| 5,159,660 | A | 10/1992 | Lu et al. |
| 5,204,718 | A | 4/1993 | Morita |
| 5,208,749 | A | 5/1993 | Adachi et al. |
| 5,214,576 | A | 5/1993 | Tani et al. |
| 5,263,123 | A * | 11/1993 | Hayashi ................. 706/45 |
| 5,268,835 | A | 12/1993 | Miyagaki et al. |
| 5,285,377 | A | 2/1994 | Sugasaka et al. |
| 5,305,230 | A | 4/1994 | Matsumoto et al. |
| 5,324,069 | A | 6/1994 | Ogawa |
| 5,349,646 | A * | 9/1994 | Furuta et al. .............. 706/23 |
| 5,361,628 | A | 11/1994 | Marko et al. |
| 5,367,612 | A | 11/1994 | Bozich et al. |
| 5,372,015 | A | 12/1994 | Suzuki et al. |
| 5,434,951 | A | 7/1995 | Kuwata |
| 5,471,381 | A | 11/1995 | Khan |
| 5,483,450 | A | 1/1996 | Titli et al. |
| 5,488,562 | A | 1/1996 | Otterbein et al. |
| 5,539,638 | A | 7/1996 | Keeler et al. |
| 5,557,520 | A | 9/1996 | Suissa et al. |
| 5,570,282 | A | 10/1996 | Hansen et al. |
| 5,706,193 | A | 1/1998 | Linzenkirchner |
| 5,740,323 | A * | 4/1998 | Nomura et al. .............. 706/13 |
| 5,740,324 | A | 4/1998 | Mathur et al. |
| 5,815,198 | A | 9/1998 | Vachtsevanos et al. |
| 5,877,954 | A | 3/1999 | Klimasauskas et al. |
| 5,912,821 | A | 6/1999 | Kobayashi |
| 5,928,297 | A | 7/1999 | Murata et al. |
| 5,943,660 | A | 8/1999 | Yesildirek et al. |
| 5,971,579 | A | 10/1999 | Kim |
| 6,021,369 | A | 2/2000 | Kamihira et al. |
| 6,064,996 | A | 5/2000 | Yamaguchi et al. |
| 6,188,988 | B1 * | 2/2001 | Barry et al. .............. 705/3 |
| 6,212,466 | B1 | 4/2001 | Ulyanov et al. |
| 6,216,083 | B1 | 4/2001 | Ulyanov et al. |
| 6,411,944 | B1 * | 6/2002 | Ulyanov .............. 706/13 |
| 6,463,371 | B1 * | 10/2002 | Ulyanov et al. ............ 701/40 |
| 6,490,237 | B1 * | 12/2002 | Supino .............. 369/59.1 |
| 6,496,761 | B1 * | 12/2002 | Ulyanov et al. ............ 701/37 |
| 6,544,187 | B2 | 4/2003 | Seward |
| 6,546,295 | B1 | 4/2003 | Pyotsia et al. |
| 6,578,018 | B1 | 6/2003 | Ulyanov |
| 6,675,154 | B2 | 1/2004 | Jaeger |
| 6,701,236 | B2 * | 3/2004 | Ulyanov et al. ............ 701/40 |
| 6,711,556 | B1 * | 3/2004 | Sepe et al. .............. 706/6 |
| 6,721,718 | B2 * | 4/2004 | Ulyanov .............. 706/2 |
| 6,735,576 | B1 * | 5/2004 | Kaji et al. .............. 706/1 |
| 6,801,881 | B1 | 10/2004 | Shah |
| 6,829,604 | B1 * | 12/2004 | Tifft .............. 707/5 |
| 2002/0016665 | A1 * | 2/2002 | Ulyanov et al. ............ 701/106 |
| 2002/0099673 | A1 * | 7/2002 | Pappalardo et al. ........... 706/1 |
| 2003/0078899 | A1 * | 4/2003 | Shanahan .............. 706/8 |
| 2003/0093392 | A1 | 5/2003 | Ulyanov |
| 2003/0101149 | A1 | 5/2003 | Jaeger |
| 2004/0024750 | A1 * | 2/2004 | Ulyanov et al. ............. 707/3 |
| 2004/0030420 | A1 * | 2/2004 | Ulyanov et al. ............. 700/48 |

OTHER PUBLICATIONS

A Model for a Rider-Motorcycle System Using Fuzzy Control. T.S. Lui and J.C. Wu. IEEE Transactions on Systems, Man, and Cybernetics, vol. 23, No. 1, pp. 267-276, 1993.*

J.C. Wu and T.S. Liu, Fuzzy Control of Rider-Motorcycle System Using Genetic Algorithm and Auto-Tuning, Mechatronic vol. 5, pp. 441-455. 1995.*

Antony Satyadas and K. Krishnakumar, GA-optimized Fuzzy Controller for Spacecraft Attitude Control, IEEE, pp. 1979-1984. 1994.*

Bose, Bimal K., (1994), "Expert System, Fuzzy Logic, and Neural Network Applications in Power Electric and Motion Control," Processing of the IEEE, vol. 82, No. 8, pp. 1303-1323.

Chen, Jen-Yang, "An Integration Design Approach in PID Controller," IEEE, 1999, pp. 901-907.

Dote, Y., "Real Time Nonlinear Learning Control for Robotic Manipulator Using Novel Fuzzy Neural Network," IEEE International Conference on System, Man, and Cybernetics, Oct. 1998.

Feng Q and Yamafuji K., (1988), "Design and Simulation of Control System of An Inverted Pendulum," Robotica, vol. 6, No. 3, pp. 235-241.

Gradetsky V.G. and Ulyanov S.V., (1993), "Mobile System With Wall Climbing Robots," Intern. J. of Computer and Systems Sciences, vol. 31, No. 1, pp. 126-142.

Johansson R., Magnusson M. and Fransson P.A., (1995), "Galvanic Vestibular Stimulation for Analysis of Postural Adaptation and Stability," IEEE Transactions on Biomedical Engineering, vol. 42, No. 3, pp. 282-292.

Ju M.S., Yi S.G., Tsuei Y.G, and Chou Y.L.., (1995), "Fuzzy Control of Electrohydraulic Above-Knee Prostheses," JSME International Journal, vol. 38, No. 1, pp. 78-85.

Lee Y.N., Kim T.W. and Suh I.H., (1994), "A Look-Up Table-Based Self Organizing Fuzzy Plus Linear Controller," Mechatronics, vol. 4, Vo. 1, pp. 71-90.

Liu T.S. and Wu J.C., (1993), "A Model For Rider-Motorcycle System Using Fuzzy Control," IEEE Transactions on Systems, Man and Cybernetics, vol. 23 SMC, No. 1, pp. 267-276.

Mendel, Jerry M., (1995), "Fuzzy Logic Systems for Engineering: A Tutorial", Proceeding of the IEEE, vol. 83, No. 3, pp. 345-377.

Nakajima R., Tsubouchi T., Yuta S. and Koyanagi E., (1997), "A development of a new mechanism of an autonomous unicycle", Proc. IEEE/RSJ International Conference on Intelligent Robots and Systems (IROS '97), vol. 2, Grenoble, France, pp. 906-912.

Perround M. and Saucier A., (1987), "Thermodynamics of dissipative systems", Helvetica Physica, vol. 60, No. 8, pp. 1038-1051.

Sheng Z.Q. and Yamafuji K., (1995), "Realization of a human riding a unicycle by a robot", Proc. of '95 IEEE Intern. Conf. on Robotics & Automation, Japan, vol. 2, pp. 1319-1326.

Sheng Z.Q. and Yamafuji K., (1997), "Postural stability of a human riding a unicycle and its emulation by a robot", IEEE Trans. on Robotics and Automation, vol. 13, No. 5, pp. 709-720.

Cellier et al., "Automated Formula Manipulation Supports Object-Oriented Continuous-System Modeling," Control Systems Magazine, IEEE vol. 13, Issue 2, Apr. 1993, pp. 28-38.

Ku et al., "A Modulized Train Performance Simulator for Rapid Transit DC Analysis," Railroad Conference, 2000, Proceedings of the 2000 ASME/IEEE Joint; Apr. 4-6, 2000, pp. 213-219.

Kutz, Myer, "Mechanical Engineers' Handbook," Second Edition, New York: Wiley, 1998; pp. 842-843.

Lavine et al., "Innovative Genetic Algorithms for Chemoinformatics," Chemometrics and Intelligent Laboratory Systems 60 (2002), pp. 161-171.

Matia et al., "Calibration of Fuzzy Control Systems," IEEE, 1994.

Nielsen et al., "Quantum Computation and Quantum Information," 2000 Cambridge University, Section 6.

Oldaker et al., "An Integrated Package for the Simulation and Practical Evaluation of Discrete Control Systems Running within the MATLAB Environment," Applied Control Techniques Using MATLAB, IEE Collquium on Jan. 26, 1995, pp. 7/1-7/3.

Zakharov et al., "Fuzzy Models of Intelligent Controllers and Control Systems," 1995, Scripta Technica, Inc., Part II.

Zakharov et al., "Fuzzy Models of Intelligent Industrial Controllers and Control Systems," 1995, Scripta Technica, Inc., Part III.

* cited by examiner

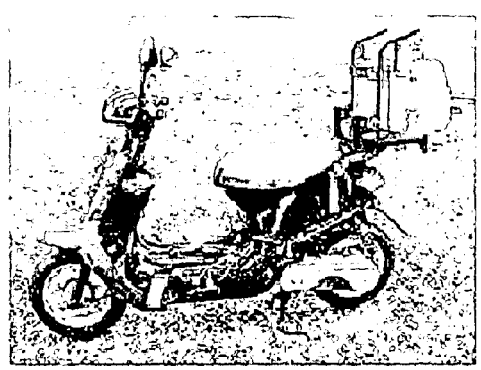 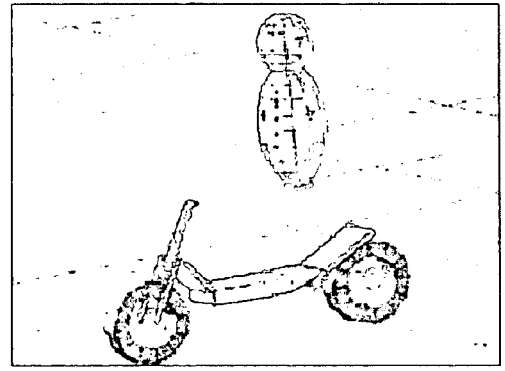
(a)            (b)
*Figure 2*

*Figrue 6*

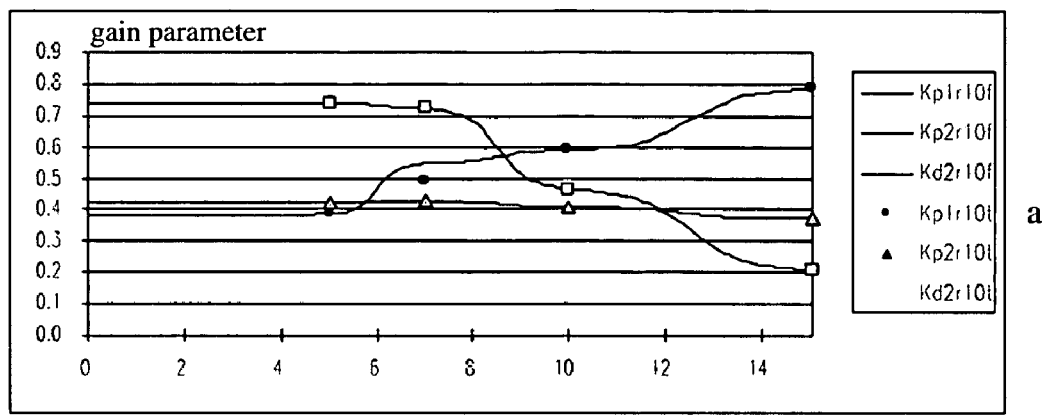
Lines: Fuzzy controller output (roll 10 deg)
point: Teaching signal (roll 10 deg)
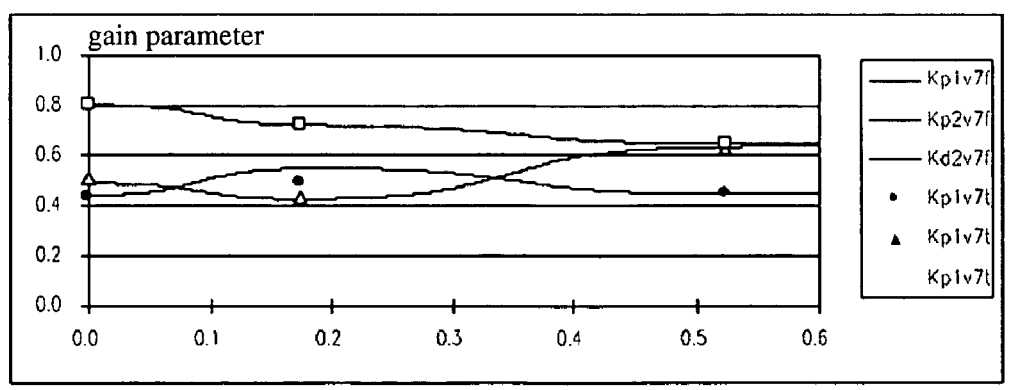
Lines: Fuzzy controller output (vel. 7 m/s)
point: Teaching signal (vel. 7 m/s)
*Figure 20*

*(a-c from above)*

*(d-f from above)*

*(a-b from above)*

(c-e from above)

(a-b from above)

(c-d from above)

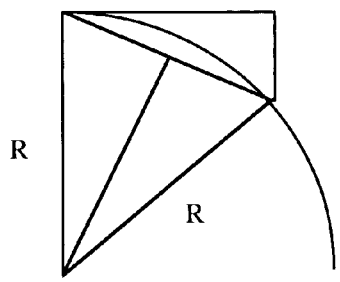
(a) Relation between
deviation of course at length of reference
and turning radius
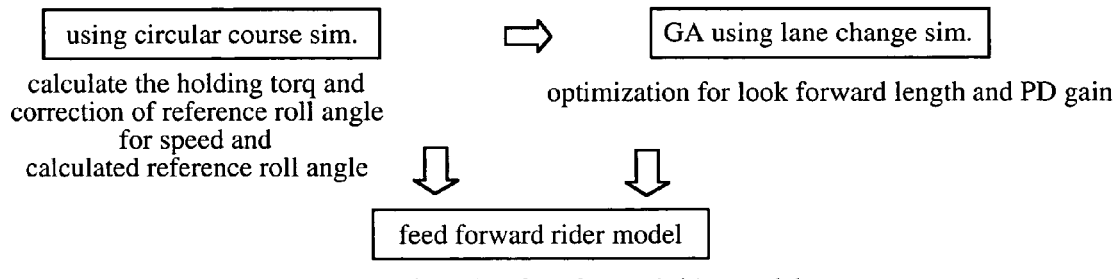
(b) Process of making feed forward rider model
*Figure 26*

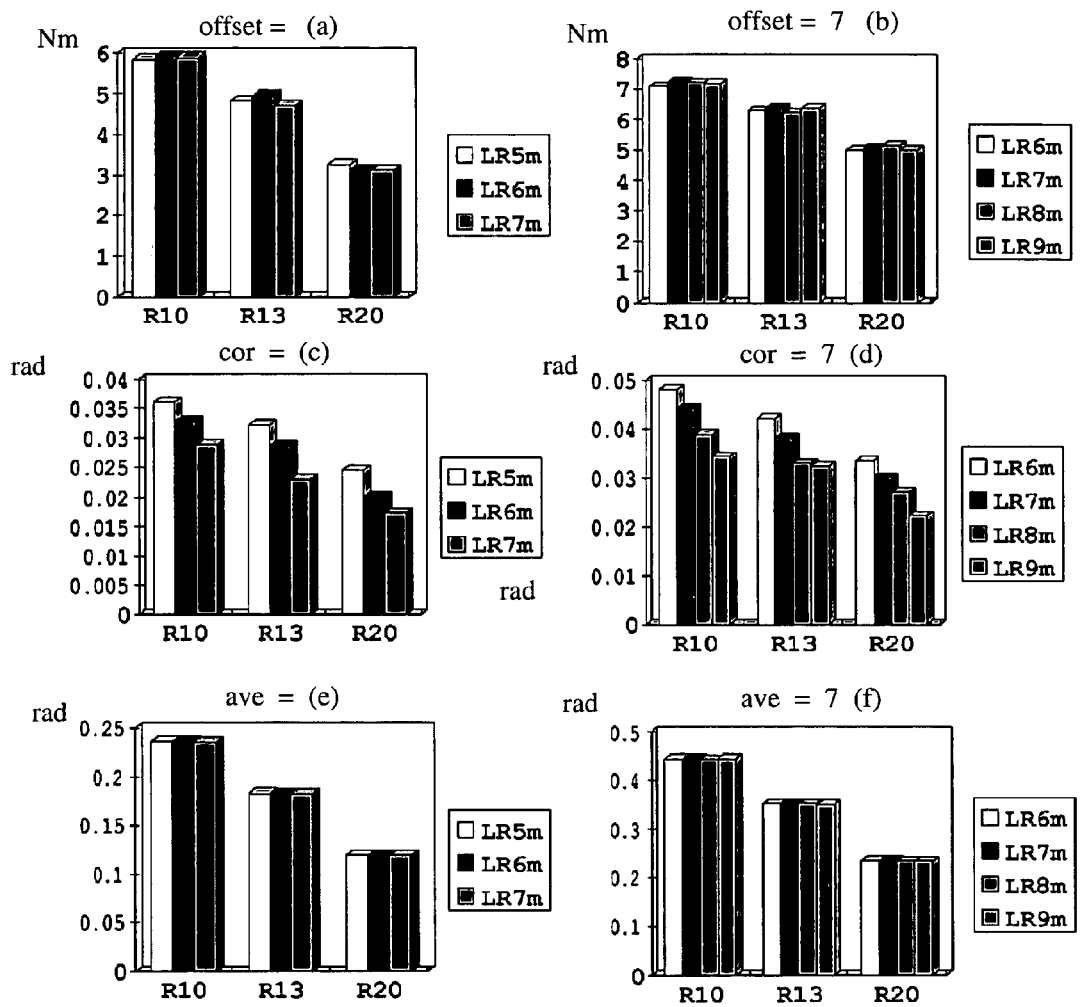
Figure 28 (a-f)

Course of lane change

Model for lane change simulation

*(a-c from above)*

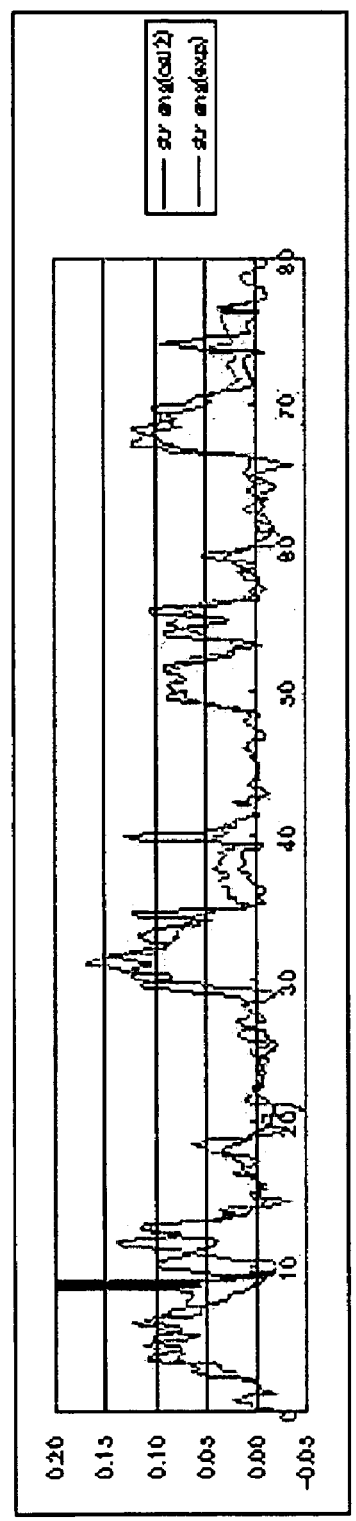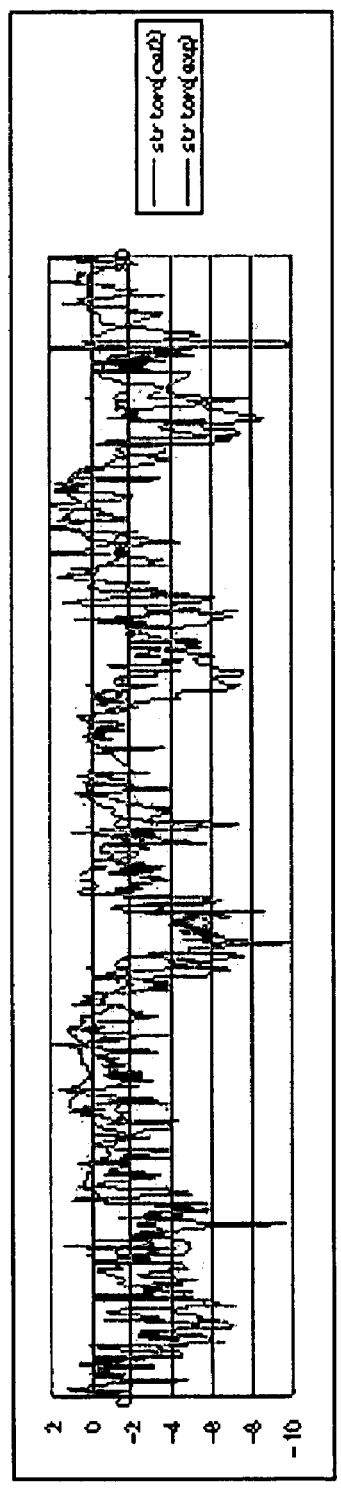
*Figure 32*
*(d-e from above)*

(a-d from above)

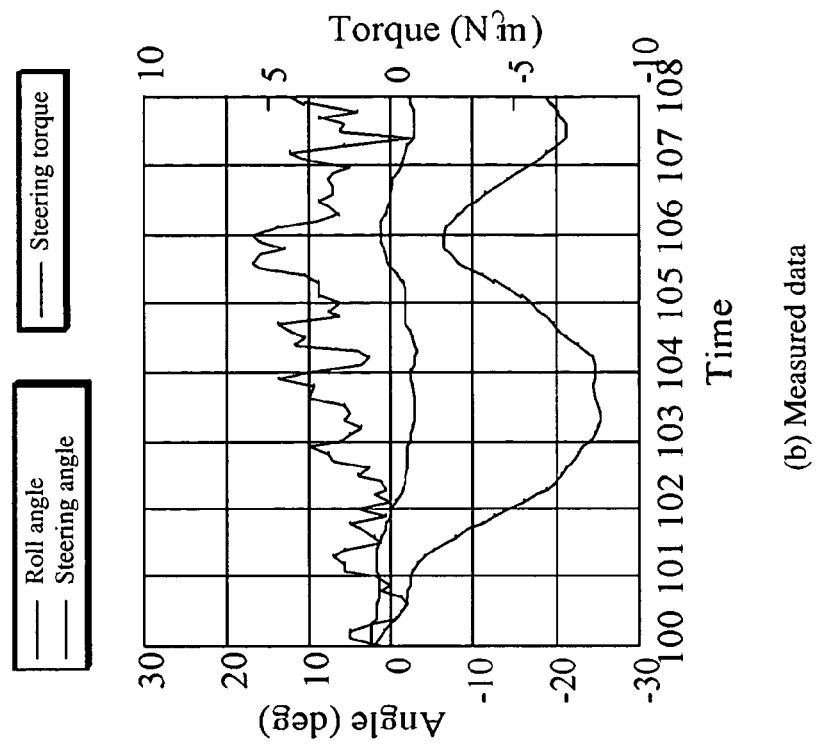
(b) Measured data
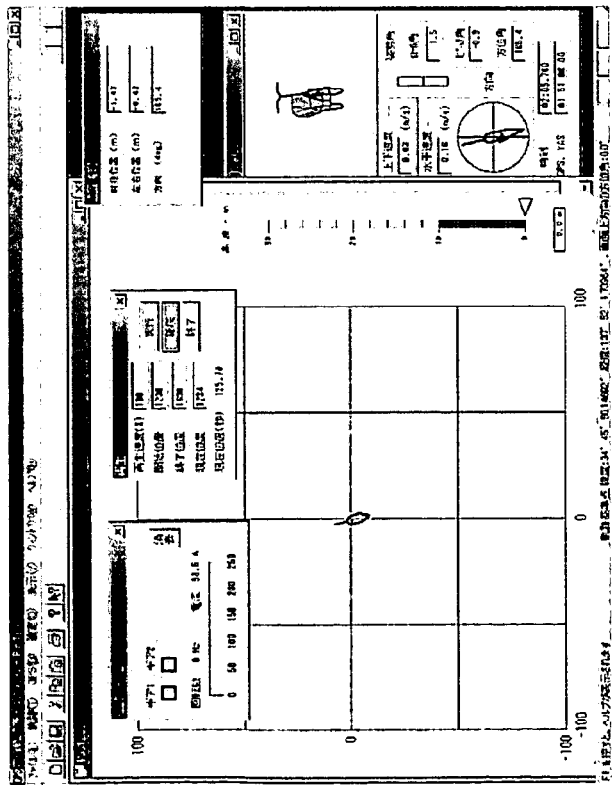
(a) Realtime monitor of position and attitude
*Figure 36*

INTELLIGENT ROBUST CONTROL SYSTEM FOR MOTORCYCLE USING SOFT COMPUTING OPTIMIZER

BACKGROUND

1. Field of the Invention

The present invention relates to electronically-controlled motorcycle steering and maneuverability systems based on soft computing.

2. Description of the Related Art

Feedback control systems are widely used to maintain the output of a dynamic system at a desired value in spite of external disturbances that would displace it from the desired value. For example, a household space-heating furnace, controlled by a thermostat, is an example of a feedback control system. The thermostat continuously measures the air temperature inside the house, and when the temperature falls below a desired minimum temperature the thermostat turns the furnace on. When the interior temperature reaches the desired minimum temperature, the thermostat turns the furnace off. The thermostat-furnace system maintains the household temperature at a substantially constant value in spite of external disturbances such as a drop in the outside temperature. Similar types of feedback controls are used in many applications.

A central component in a feedback control system is a controlled object, a machine or a process that can be defined as a "plant", whose output variable is to be controlled. In the above example, the "plant" is the house, the output variable is the interior air temperature in the house and the disturbance is the flow of heat (dispersion) through the walls of the house. The plant is controlled by a control system. In the above example, the control system is the thermostat in combination with the furnace. The thermostat-furnace system uses simple on-off feedback control system to maintain the temperature of the house. In many control environments, such as motor shaft position or motor speed control systems, simple on-off feedback control is insufficient. More advanced control systems rely on combinations of proportional feedback control, integral feedback control, and derivative feedback control. A feedback control based on a sum of proportional, plus integral, plus derivative feedback is often referred as a linear control. Similarly, Proportional feedback control is often referred to as P control, and Proportional plus Derivative feedback is often referred to as P(D) control, and Proportional plus Integral feedback is referred as P(I) control.

A linear control system (e.g., P, P(I), P(D), P(I)D, etc.) is based on a linear model of the plant. In classical control systems, a linear model is obtained in the form of ordinary differential equations. The plant is assumed to be relatively linear, time invariant, and stable. However, many real-world plants are time varying, highly non-linear, and unstable. For example, the dynamic model may contain parameters (e.g., masses, inductance, aerodynamics coefficients, etc.), which are either only approximately known or depend on a changing environment. If the parameter variation is small and the dynamic model is stable, then the linear controller may be satisfactory. However, if the parameter variation is large or if the dynamic model is unstable, then it is common to add Adaptive or Intelligent (AI) control functions to the linear control system.

AI control systems use an optimizer, typically a non-linear optimizer, to program the operation of the linear controller and thereby improve the overall operation of the control system.

Classical advanced control theory is based on the assumption that all controlled "plants" can be approximated as linear systems near equilibrium points. Unfortunately, this assumption is rarely true in the real world. Most plants are highly nonlinear, and often do not have simple control algorithms. In order to meet these needs for a nonlinear control, systems have been developed that use Soft Computing (SC) concepts such Fuzzy Neural Networks (FNN), Fuzzy Controllers (FC), and the like. By these techniques, the control system evolves (changes) in time to adapt itself to changes that may occur in the controlled "plant" and/or in the operating environment.

Control systems based on SC typically use a Knowledge Base (KB) to contain the knowledge of the FC system. The KB typically has many rules that describe how the SC determines control parameters during operation. Thus, the performance of an SC controller depends on the quality of the KB and the knowledge represented by the KB. Increasing the number of rules in the KB generally increases (very often with redundancy) the knowledge represented by the KB but at a cost of more storage and more computational complexity. Thus, design of a SC system typically involves tradeoffs regarding the size of the KB, the number of rules, the types of rules. etc. Unfortunately, the prior art methods for selecting KB parameters such as the number and types of rules are based on ad hoc procedures using intuition and trial-and-error approaches.

Steering and/or maneuverability control of a motorcycle using soft computing is particularly difficult because of the difficulty in obtaining a sufficiently optimal knowledge base (KB). If the KB does not contain enough knowledge about the dynamics of the motorcycle-rider system, then the soft computing controller will not be able to steer and/or maneuver the motorcycle in a satisfactory manner. At one level, increasing the knowledge conatined in the KB generally produces an increase in the size of the KB. A large KB is difficult to store and requires relatively large amounts of computational reasources in the soft computing controller. What is missing from the prior art is a system and method for controlling a motorcycle using a reduced-size KB that provides sufficient knowledge to provide good control.

SUMMARY

The present invention solves these and other problems by providing a SC optimizer for designing a globally-optimized KB to be used in a SC system for an electronically-controlled motorcycle. In one embodiment, the SC optimizer includes a fuzzy inference engine. In one embodiment, the fuzzy inference engine includes a Fuzzy Neural Network (FNN). In one embodiment, the SC Optimizer provides Fuzzy Inference System (FIS) structure selection, FIS structure optimization method selection, and teaching signal selection.

In one embodiment, the user makes the selection of fuzzy model, including one or more of: the number of input and/or output variables; the type of fuzzy inference model (e.g., Mamdani, Sugeno, Tsukamoto, etc.); and the preliminary type of membership functions.

In one embodiment, a Genetic Algorithm (GA) is used to optimize linguistic variable parameters and the input-output training patterns. In one embodiment, a GA is used to optimize the rule base, using the fuzzy model, optimal linguistic variable parameters, and a teaching signal.

One embodiment, includes optimization of the FIS structure by using a GA with a fitness function based on a response of a model of motorcycle and rider system.

One embodiment, includes optimization of the FIS structure by a GA with a fitness function based on a response of the actual motorcycle/rider system.

The result is a specification of an FIS structure that specifies parameters of the optimal FC according to desired requirements.

BRIEF DESCRIPTION OF THE FIGURES

The above and other aspects, features, and advantages of the present invention will be more apparent from the following description thereof presented in connection with the following drawings.

FIG. 2A is a photograph of an electric scooter used for demonstration purposes.

FIG. 2B shows a computer model of the scooter from FIG. 2A.

FIG. 20 shows outputs of the fuzzy controller.

FIG. 26A-B show the look-forward model and the process to generate a feedforward rider model, where (A) shows the relation between deviation of course at length of reference and turning radius, and (B) shows the process of assembling the g feedforward rider model.

FIG. 28A-F show the optimized parameters.

FIG. 36A-B show an example of monitoring display (A) and measured data (B).

DETAILED DESCRIPTION

Figure 1:
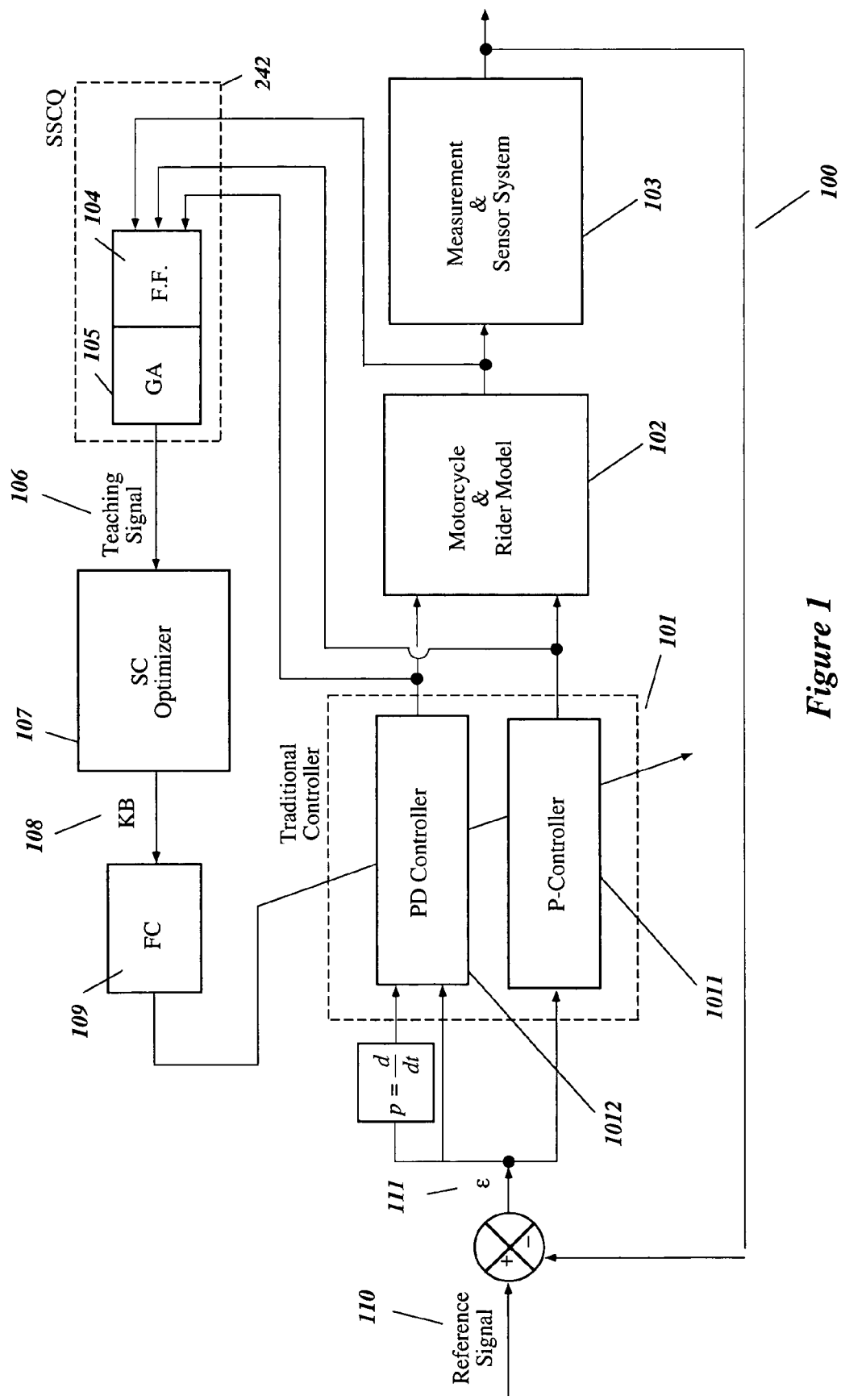
FIG. 1 shows a robust intelligent control system of motorcycle and rider navigation model.

FIG. 1 is a block diagram of an intelligent motorcycle (with rider) navigation control system based on soft computing and using a soft computing optimizer to generate a Knowledge Base (KB) 108 for a Fuzzy Controller (FC) 109. The motorcycle and rider system is represented by a block 102. Output from the block 102 is provided to a fitness function in block 104 of a GA in block 105. The objective information for the knowledge base (KB) 108 is extracted (from the output of block 102) by a Genetic Analyzer (GA) 105 using the results of stochastic simulation of the motorcycle/rider dynamic behavior. The GA 105 and Fitness Function 104 are components of a System Simulation of Control Quality (SSCQ) 242.

Using a set of inputs, and a fitness function in block 104, the GA in block 105 works in a manner similar to an evolutionary process to arrive at a solution, which is, hopefully, optimal. The GA in block 105 generates sets of "chromosomes" (that is, possible solutions) and then sorts the chromosomes by evaluating each solution using the fitness function in block 104. The fitness function in block 104 determines where each solution ranks on a fitness scale. Chromosomes (solutions), which are more fit, are those, which correspond to solutions that rate high on the fitness scale. Chromosomes, which are less fit, are those, which correspond to solutions that rate low on the fitness scale.

Chromosomes that are more fit are kept (survive) and chromosomes that are less fit are discarded (die). New chromosomes are created to replace the discarded chromosomes. The new chromosomes are created by crossing pieces of existing chromosomes and by introducing mutations.

The motorcycle/rider model 102 is controlled by a linear P(D) controller 101. In one embodiment, the controller 100 uses both a PD controller 1012 and a P controller 1011 to control different aspects of the motorcycle system. The P(D) controller 101 has a linear transfer function and thus is based upon a linearized equation of motion for the control object in block 102. Prior art GAs used to program P(D) controllers typically use simple fitness function and thus do not solve the problem of poor controllability typically seen in linearization models. As is the case with most optimizers, the success or failure of the optimization often ultimately depends on the selection of the performance (fitness) function.

Evaluating the motion characteristics of a nonlinear plant is often difficult, in part due to the lack of a general analysis method. Conventionally, when controlling a plant with nonlinear motion characteristics, it is common to find certain equilibrium points of the plant and the motion characteristics of the plant are linearized in a vicinity near an equilibrium point. Control is then based on evaluating the pseudo (linearized) motion characteristics near the equilibrium point.

Computation of optimal control based on soft computing includes the GA in block 105 as the first step of global search for optimal solution on a fixed space of solutions. The GA searches for a set of control weights for the plant. Firstly the weight vector $K=\{k_1, \ldots, k_n\}$ is used by a conventional P(D) controller in block 101 in the generation of a signal $\delta(K)$ which is applied to the plant. The entropy $S(\delta(K))$ associated with the behavior of the plant on this signal is assumed as a fitness function to be minimized. The GA is repeated several times with regular time intervals in order to produce a set of weight vectors. The vectors generated by the GA in block 105 are then provided to a FNN and the output of the FNN to a fuzzy controller in block 109. The output of the fuzzy controller in block 109 is a collection of gain schedules for the linear controllers in block 101 that control the motorcycle 102.

So in summary, designing the intelligent control system includes two stages. Stage 1 involves finding a teaching signal (also referred to as teaching patterns). Stage 2 involves approximation of optimal control.

Finding teaching patterns (input-output pairs) of optimal control by using the GA are aspects of the SSCQ 242, based on the mathematical model of the controlled motorcycle and a physical criteria of minimum of entropy production rate.

Approximation of the optimal control (from Stage 1) by the corresponding Fuzzy Controller (FC). This FC is referred to as the optimal Fuzzy Controller.

The first stage is the acquisition of a robust teaching signal of optimal control without the loss of information. The output of first stage is the robust teaching signal, which contains information about the controlled object behavior and corresponding behavior of the control system.

The second stage is the approximation of the teaching signal by building of a fuzzy inference system. The output of the second stage is the knowledge base (KB) 108 for the FC 109.

The design of the optimal KB 108 includes specifying the optimal numbers of input-output membership functions, their optimal shapes and parameters, and a set of optimal fuzzy rules.

In one embodiment for the Stage 2 realization, the optimal FC 109 is obtained using a FNN with the learning method based on the error back-propagation algorithm. The error back-propagation algorithm is based on the application of the gradient descent method to the structure of the FNN. The error is calculated as a difference between the desired output of the FNN and an actual output of the FNN. Then the error is "back propagated" through the layers of the FNN, and parameters of each neuron of each layer are modified towards the direction of the minimum of the propagated error.

However, back-propagation algorithm has a few disadvantages. In order to apply back-propagation approach it is necessary to know the complete structure of the FNN prior to the training optimization. The back-propagation algorithm cannot be applied to a network with an unknown number of layers or an unknown number nodes. The back-propagation process cannot automatically modify the types of the membership functions. Usually, the initial state of the coefficients for back-propagation algorithm is set up randomly, and as a result, the back-propagation algorithm often finds only a "local" optimum close to the initial state.

In spite of the above disadvantages, the error back-propagation algorithm is commonly used in practice. For example, the Adaptive Fuzzy Modeler (AFM) provided by STMicroelectronics Inc. creates Sugeno 0 order fuzzy inference systems using the error back-propagation algorithm.

The algorithm used in the AFM is based on the following two steps. In the first step, a user specifies the parameters of a future FNN such as the numbers of inputs and outputs and the number of fuzzy sets for each input/output. The AFM "optimizes" the rule base, using a so-called "let the best rule win" (LBRW) technique. During this phase, the membership functions are fixed as uniformly distributed among the universe of discourse, and AFM calculates the firing strength of the each rule, eliminating the rules with zero firing strength, and adjusting centers of the consequents of the rules with nonzero firing strength. It is possible during optimization of the rule base specify the learning rate parameter, depending on the current problem. In AFM there is also an option to build the rule base manually. In this case, user can specify the centroids of the input fuzzy sets, and then according to the specification, the system builds the rule base automatically.

In the second step, the AFM builds the membership functions. The user can specify the shape factors of the input membership functions. Shape factors supported by AFM are: Gaussian, Isosceles Triangular, and Scalene Triangular. The user must also specify the type of fuzzy operation in Sugeno model: supported methods are Product and Minimum.

After specifying the membership function shape and Sugeno inference method, the AFM starts optimization of the membership function shapes, using the structure of the rules, developed during Step 1. There are also some optional parameters to control optimization rate such as a target error and the number of iterations, the network should make. The termination condition on the optimization is reaching of the number of iterations, or when the error reaches its target value.

AFM inherits the weakness of the back-propagation algorithm described above, and the same limitations. The user must specify types of membership functions, number of membership functions for each linguistic variable and so on. The rule number optimizer in the AFM is called before membership functions optimization, and as a result the system often becomes unstable during membership function optimization phase.

However, some of the weakness of system such as the AFM can be ameliorated by optimizing the structure of the KB before training the KB.

In FIG. 1, the motorcycle (MC) and rider model (control algorithm) are shown as a simulation model 102. FIG. 2A shows an example of a real MC (in this cas, an electric scooter) and FIG. 2B shows a model image of the scooter from FIG. 2A.

Figure 3:
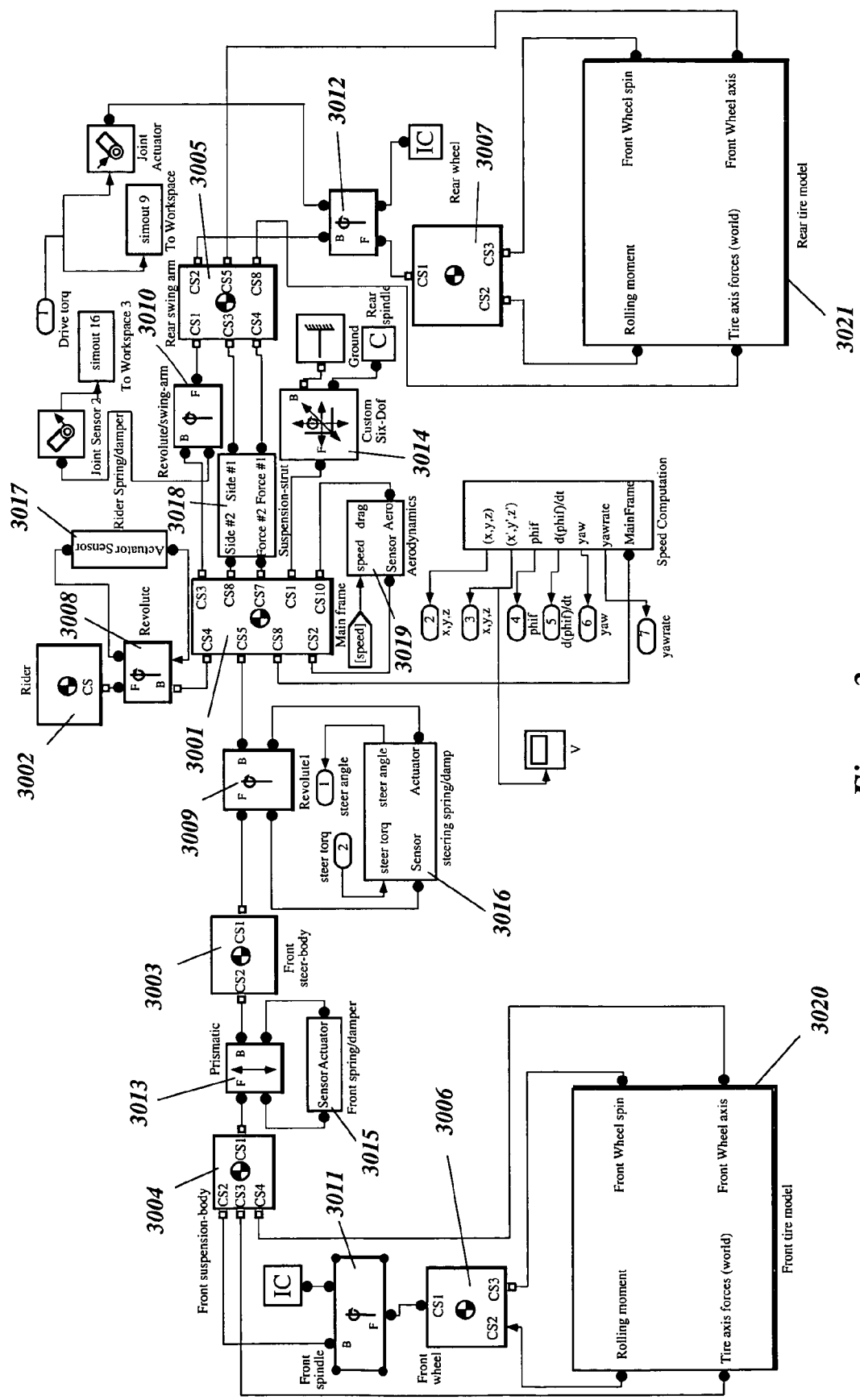
FIG. 3 shows a simulation model of the scooter from FIG. 2B.

FIG. 3 shows one embodiment of a simulation motorcycle/rider model developed by using SimMechanics (a MATLAB add-on). Various rider models, including, for example, a fuzzy controller model and a hold torque feed-forward model, can be used.

In one embodiment, the models describe the stability of the MC during a straight line run. The model descriptions of the MC in this approach is provided by conventional straight-line modeling techniques. Such straight-line models typically do not include a steering model but do typically include a passive rider model (e.g., a hands on and hands off model).

In one embodiment, the model is similar to a model constructed using the propular DADS modeling program from LMS International. In this model, the forward velocity is fixed. The rider steering models structure is similar to the fuzzy controller model, but the parameters of the rider model use fixed values which can be selected by trial and error.

In one embodiment, the MC model is constructed using DADS, with a rider steering model based on a look-forward model. The parameters are fixed for each course. Lane change simulation and sine course simulation are shown.

In one embodiment, the control behaviour of motorcycle and rider is described. The motorcycle model of the simulation is substantially simialr to the model described above. The rider model is a look-forward model. The parameters were fixed for each course. Lane change simulation is shown.

In one embodiment, various driving maneuvers such as cornering and double lane change with a driver control algorithm are used with a motorcycle model using the ADAMS program available from MSC Software Corporation. The driver control model has two parts: a velocity control model and a steering control model. In this steering control model, the desired camber angle is estimated and depends on the driving maneuver. The parameters for the controller can be fixed.

In one embodiment, the stability control of a motorcycle/rider system based on fuzzy control in conjunction with a GA and an auto-tuning method is used. The model used in simulation need not be a true motorcycle model. For example, an inverted pendulum hinged to a rotating disk can be used as a representative model of the motorcycle.

One embodiment provides an autonomous two-wheeled vehicle and simulation results. The rider model can be divided into two parts: standing control and directional control. The control algorithm of standing stability is based on feedback control with gain parameters that depend on velocity. Directional control is the target roll angle, which can be determined by predicted course error. In one embodiment a spring-damper is connected between the steering bar and the actuator for steering to stabilize the motorcycle (which makes the control method relatively more complex).

Figure 7:
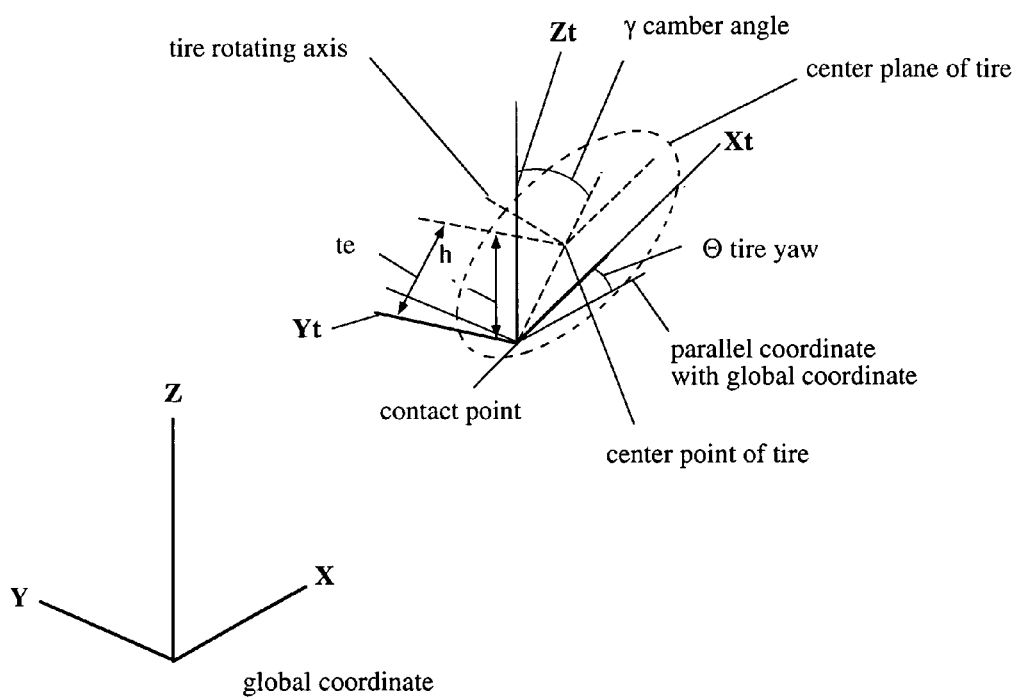
FIG. 7 shows a tire force coordinate system (Xt,Yt,Zt).
Figure 8:
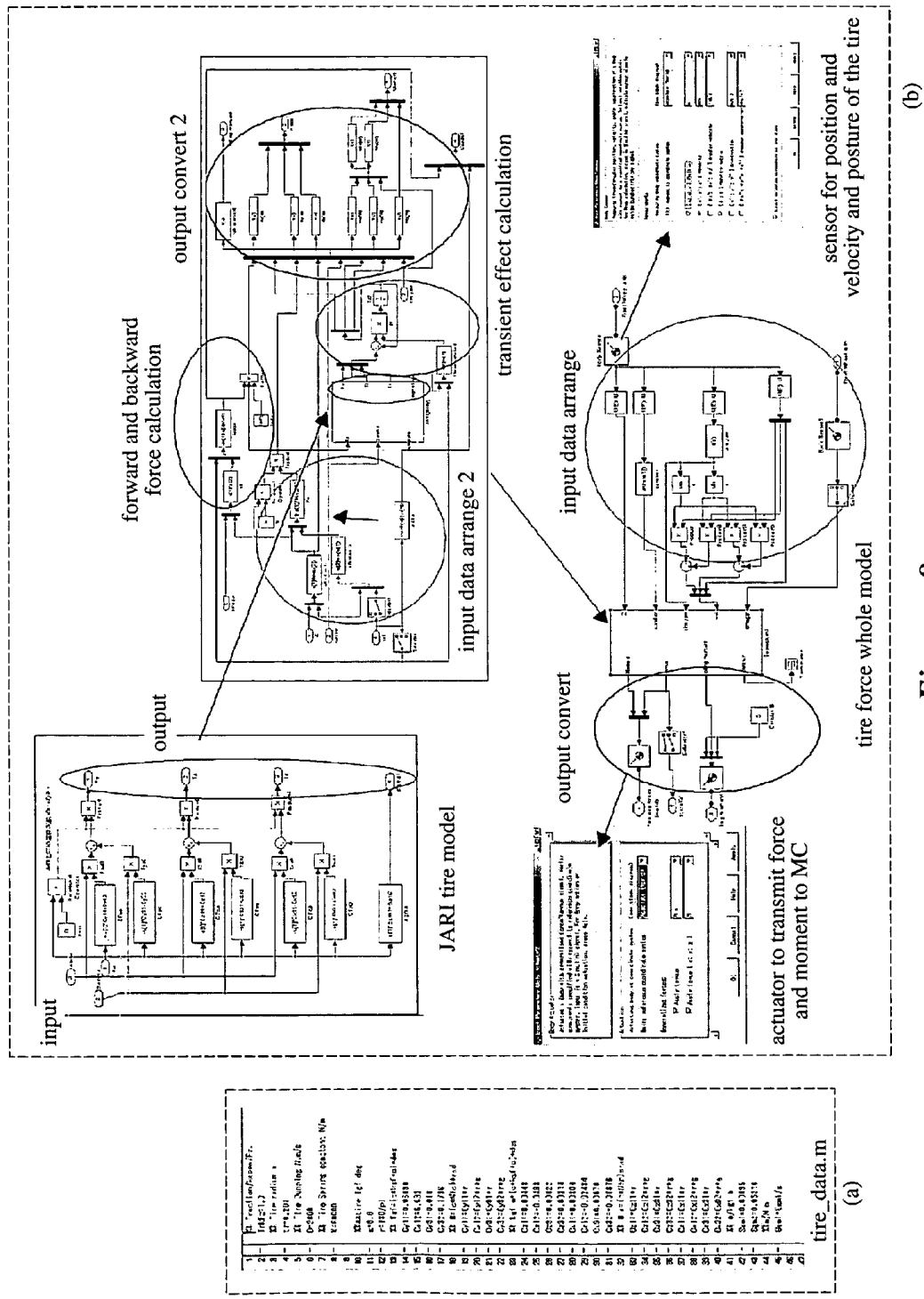
FIGS. 8A-B show tire modeling using a JARI tire, including tire data (A), and tire model (B).

The effect on the perception of riding comfort issue for changing mass center position, total weight on the MC, the wheelbase, the front fork rake angle and the front wheel trail distance of the MC is discussed. The tire model is described in connection with FIGS. 6-8.

FIG. 3 shows a simulation model of the scooter shown in FIGS. 2A-B. The model in the FIG. 3 was made using SimMechanics which is an optional tool for kinematics analysis using the popular MATLAB computer program.

Table 1 shows the model notations and parameter definitions.

TABLE 1

| Used notations Model notations |
| --- |
| $\tau_d$: Drive Torq(Nm) |
| $\tau_z$: Steer Torq(Nm) |
| $\tau_{hold}$: steer torq to hold roll angle(Nm) |
| $\tau_1$: lower body controlling Torq(Nm) |
| $\tau_2$: upper body controlling Torq(Nm) |
| $K_{p1}, K_{p2}, K_{d2},,,$: gains |

TABLE 1-continued

| Used notations Model notations |
| --- |
| v: forward velocity(m/s) |
| $v_{ref}$: reference velocity(m/s) |
| φ: roll angle(rad) |
| $φ_{ref}$: reference roll angle(rad) |
| $φ_{ref0}$: calculated reference roll angle(rad) |
| $φ_{col}$: correction for reference roll angle(rad) |
| ϕ: rollrate(rad/s) |
| α: required lateral acceleration(m/s$^2$) |
| g: gravity acceleration(m/s$^2$) |
| y: deviation at LR(m) |
| $y_0$: deviation (course err)(m) |
| t: time(sec) |
| LR: length of reference(m) |
| FF: fitness function |
| ω: yawrate(rad/s) |
| R: turning radius(m) |
| θ: tire yaw angle in h@rizontal plane(FIG. 7) |
| γ: camber angle(rad)(FIG. 7) |
| α: lateral slip(rad) |
| κ: rolling slip |
| h: height of tire center(m)(FIG. 7) |
| tr: Tire original radius(m) |
| te: Tire effective radius(m)(FIG. 7) |
| ωs: tire spin velocity(rad/s) |
| ($x_r, y_r, z_r$): directional vector of the tire rotational axis in gloval coordinate(m) |
| (vx, vy, vz): velocity vector of tire center point in gloval coordinate(m/s) |
| ($vx_1, vy_1, vz_1$): velocity vector of tire center point in tire force coordinate(m/s)(FIG. 7) |
| ($F_{Xα}, F_{Yα}, F_{Zα}$): force vector of tire at contact point in tire force coordinate(N)(FIG. 7) |
| ($T_{Xα}, 0, T_{Zα}$): moment vector of tire at contact point in tire force coordinate(Nm) |
| $F_{Yα0}$: static lateral force of tire at contact point in tire force coordinate(N) |
| $T_{Xα0}$: static overturning moment of tire at contact point in tire force coordinate(Nm) |
| $T_{Zα0}$: static aligning torque of tire at contact point in tire force coordinate(Nm) |
| $T_{X1}$: moment of tire excepting rolling moment around Xt(FIG. 7) direction in tire force coordinate at center point of tire (Nm) |
| $T_{Y1}$: moment of tire excepting rolling moment around Yt(FIG. 7) direction in tire force coordinate at center point of tire (Nm) |
| ($F_X, F_Y, F_Z$): force vector of tire at center point of tire in global coordinate(N) |
| ($T_X, T_Y, T_Z$): moment vector of tire excepting rolling moment at center point of tire in global coordinate(Nm) |
| $M_{roll}$: rolling moment of tire(Nm) |
| K: Tire vertical spring constant(N/m) |
| D: Tire vertical damping(Ns/m) |
| $C_1$: traction coeficient |
| $v_1$: forward speed for tire(m/s) |
| σ: coefficient for relaxation length(m) |
| $σ_1$: coef. for relaxation length proportion to load |
| $σ_2$: coef. for relaxation length constant |
| $Cy_1, Cy_{11}, Cy_{12}, Cy_3, Cy_{31}, Cy_{32}$: coef. lateral force |
| $Cz_1, Cz_{11}, Cz_{12}, Cz_3, Cz_{31}, Cz_{32}$: coef. overturning moment |
| $Cx_1, Cx_{11}, Cx_{12}, Cx_3, Cx_{31}, Cx_{32}$: coef. aligning torque |
| $d_{Fy}, d_{Fz}, d_{Tz}, d_{Tx}$: noises |

The MC plant model includes:

7 rigid bodies (mainframe in block 3001, rider in block 3002, front fork in block 3003, front arm in block 3004, rear arm in block 3005, front & rear wheels in block 3006 and in block 3007, respectively);

5 rotating joints (rider roll in block 3008, steer in block 3009, rear arm pivot in block 3010, front & rear wheels in block 3011 and in block 3012, respectively);

1 slide joint (front suspension in block 3013);

1 combination joint in block 3014 (a 6 degree of freedom main body to inertial system);

4 spring & damper (front suspension in block 3015, steer in block 3016, rider in block 3017, rear suspension in block 3018);

an external force in block 3019 (air force(drag & lift); and a tire force in block 3020 for the front tire and a tire forces in block 3021 for the rear tire.

Figure 4:
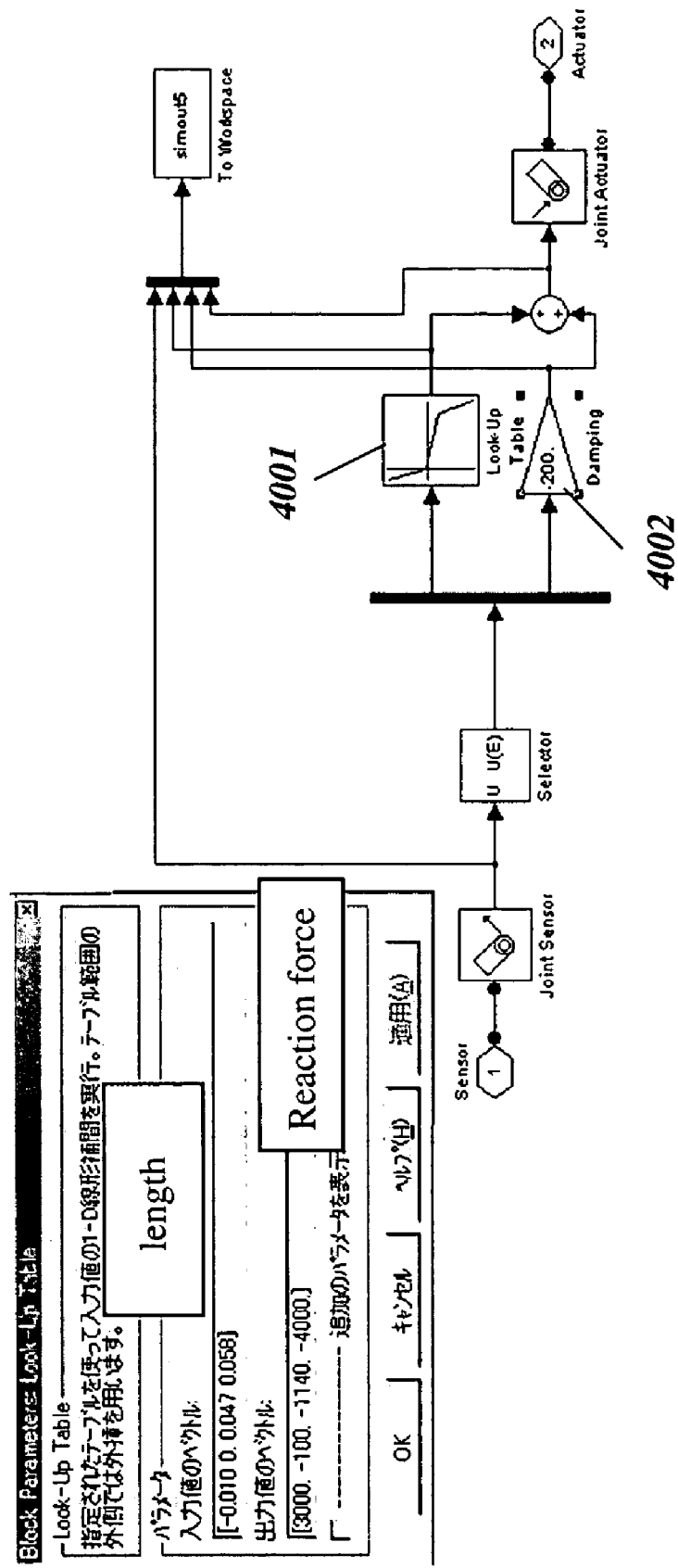
FIG. 4 shows a model of a spring and damper system.

FIG. 4 shows the spring and damper model used in blocks 3015 and 3018. Parameters of the nonlinear spring, represented as look-up table, are provided to the block 4001. Damping coefficient are provided to the block 4002.

Figure 5:
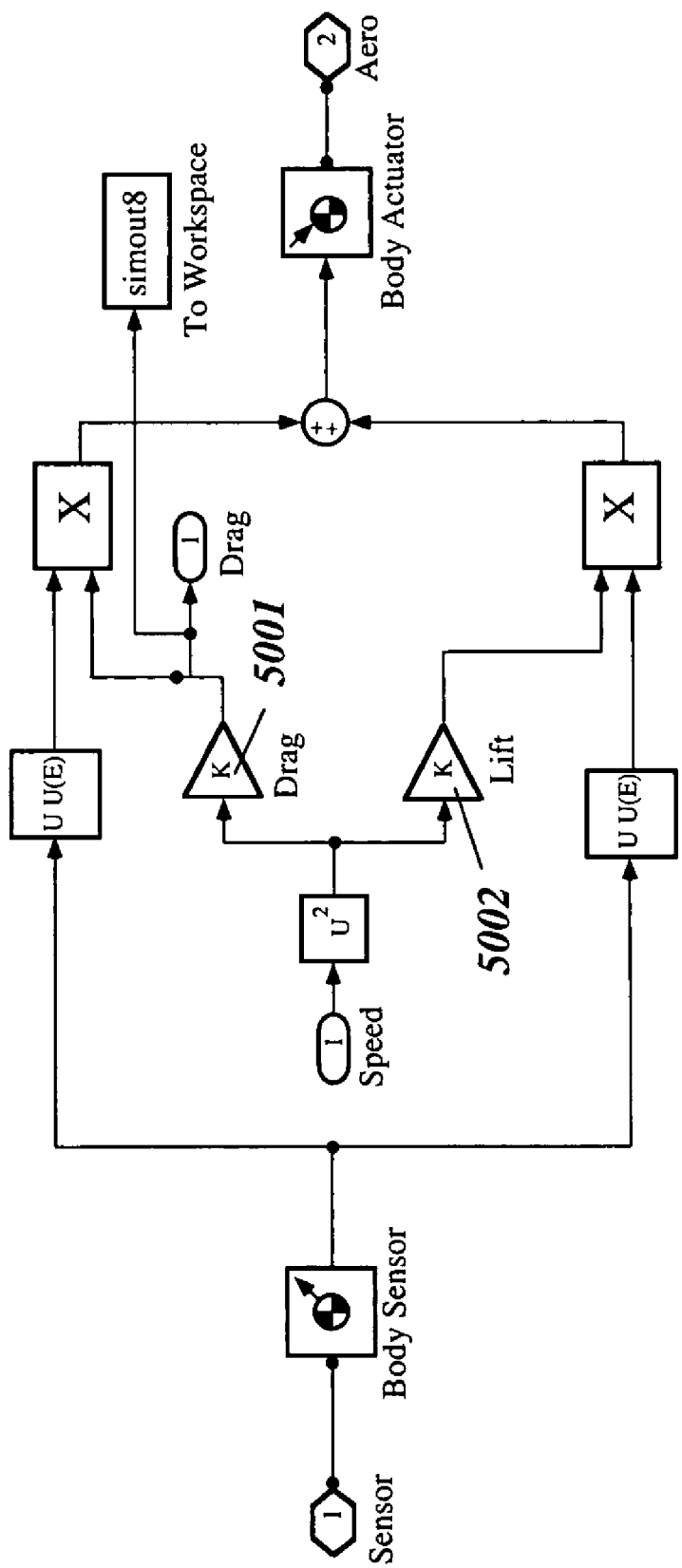
FIG. 5 shows a model for aerodynamic forces (drag and lift).

FIG. 5 shows the aerodynamic force model used in block 3019. Drag and lift parameters are provided to block 5001 and to block 5002, respectively.

In the present disclosure, results from a MC simulation model are compared with results from an actual demonstration model. The differences between the MC model developed and the demonstration model are:

1. The linear tire force model in block 3020 and in block 3021 with first order lag was applied in the MC model (instead of the complex model used in the demonstration).
2. Noise road signals were added to the tire model.
3. Coordinate system was changed: +Z points up in the MC model and +Z points down in the demonstration.
4. Front and rear brakes were removed in the MC model.
5. Twist freedom of steering shaft was removed and only steering rotation freedom remains in block 3009. The removed twist axis was perpendicular axis to the steering shaft in central plane. The reason to remove the freedom is that in this model, linear tire model was used and small elastic deformation should be ignored in view of balance of accuracy.

Figure 6:
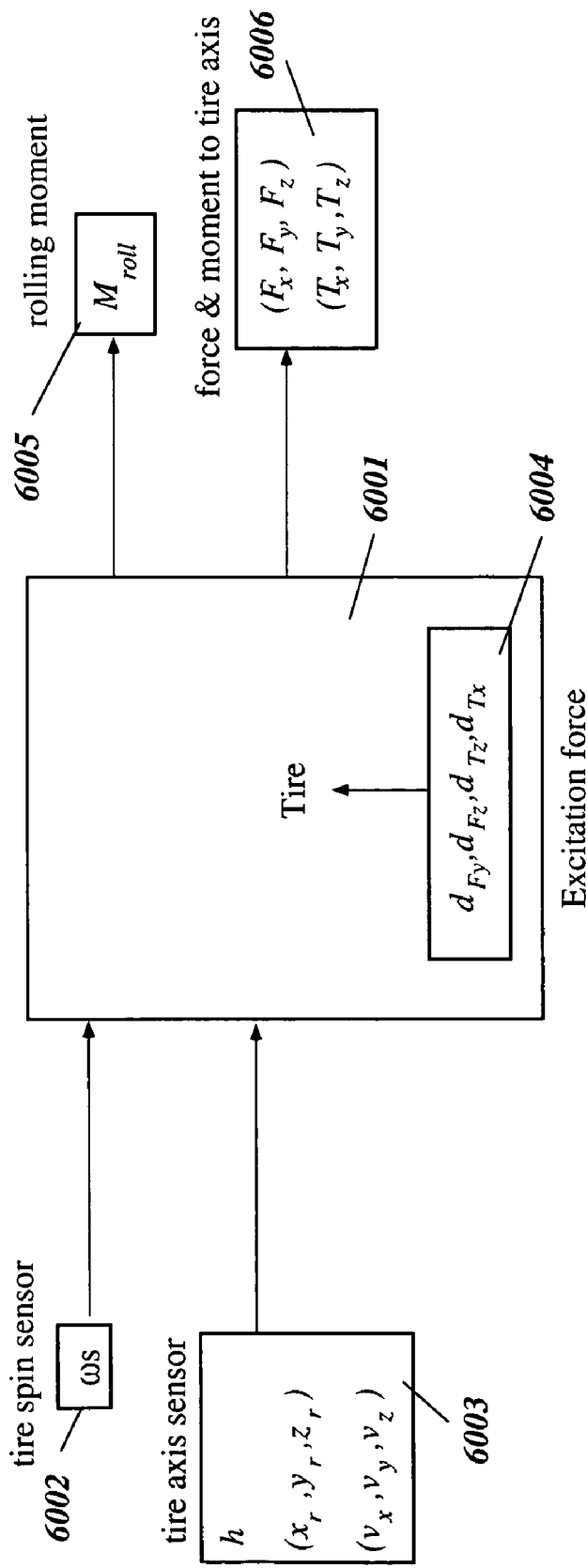
FIG. 6 shows a tire model.

As mentioned above, blocks 3020 and 3021 represented the linear tire model. Tire properties are an important determinant of MC maneuverability and stability, and tire models are thus important to behavior simulations employing a mechanical analysis. FIG. 6 is a block diagram of the tire model, where tire axis sensor data 6003 and tire spin sensor data are provided to a tire model 6001. The tire model 6001 provides rolling moment data 6005 and force moment and tire axis data 6006. The tire mathematical model in block 6001 is designed using the following equations:

$$\theta = -\arctan(x_r/y_r) \quad (5\text{-}1)$$

$$\gamma = \arcsin(z_r/\sqrt{(x_r^2 + y_r^2 + z_r^2)}) \quad (5\text{-}2)$$

$$vx_t = vx \cos\theta + vy \sin\theta \quad (5\text{-}3)$$

$$vy_t = -vx \sin\theta + vy \cos\theta \quad (5\text{-}4)$$

$$vz_t = vz \quad (5\text{-}5)$$

$$te = h/\cos\gamma \quad (5\text{-}6)$$

$$\kappa = -(vx_t - te \cdot \omega s)/vx_t \quad (5\text{-}7)$$

$$\alpha = vy_t/vx_t \quad (5\text{-}8)$$

$$F_{Zct} = (K(tr-te) - Dte)(1+d_{Fz}) \quad (5\text{-}9)$$

$$F_{Xct} = C_t \kappa F_{Zct} \quad (5\text{-}10)$$

$$F_{Yct0} = (Cy_1 \alpha + Cy_3 \gamma)(1+d_{Fy}) \quad (5\text{-}11)$$

$$T_{Zct0} = (Cz_1 \alpha + Cz_3 \gamma)(1+d_{Tz}) \quad (5\text{-}12)$$

$$T_{Xct0} = Cx_1 \alpha + Cx_3 \gamma)(1+d_{Tx}) \quad (5\text{-}13)$$

$$Cy_1 = Cy_{11} F_{Zct0} + Cy_{12} \quad (5\text{-}14)$$

$$Cy_3 = Cy_{31} F_{Zct0} + Cy_{32} \quad (5\text{-}15)$$

$$Cz_1 = Cz_{11} F_{Zct0} + Cx_{12} \quad (5\text{-}16)$$

$$Cz_3 = Cz_{31} F_{Zct0} + Cz_{32} \quad (5\text{-}17)$$

$$Cx_1 = Cx_{11} F_{Zct0} + Cx_{12} \quad (5\text{-}18)$$

$$Cx_3 = Cx_{31} F_{Zct0} + Cx_{32} \quad (5\text{-}19)$$

$$\sigma = \sigma_1 F_{Zct} + \sigma_2 \quad (5\text{-}20)$$

$$\frac{\sigma}{V} \dot{F}_{Yct} + F_{Yct} = F_{Yct\,0} \quad (5\text{-}21)$$

$$\frac{\sigma}{V} \dot{T}_{Zct} + T_{Zct} = T_{Zct\,0} \quad (5\text{-}22)$$

$$\frac{\sigma}{V} \dot{T}_{Xct} + T_{Xct} = T_{Xct\,0} \quad (5\text{-}23)$$

$$M_{roll} = T_{Zct} \sin\gamma - F_{Xct} \cdot te \quad (5\text{-}24)$$

$$F_X = F_{Xct} \cos\theta - F_{Yct} \sin\theta \quad (5\text{-}25)$$

$$F_Y = F_{Xct} \sin\theta + F_{Yct} \cos\theta \quad (5\text{-}26)$$

$$F_Z = F_{Zct} \quad (5\text{-}27)$$

$$T_{Xt} = T_{Xct} + F_{Yct} \cdot te \cos\gamma + F_{Zct} \cdot te \sin\gamma \quad (5\text{-}28)$$

$$T_{yt} = -T_{Zct} \cos\gamma \sin\gamma \quad (5\text{-}29)$$

$$T_t = T_{Xt} \cos\theta - T_{Yt} \sin\theta \quad (5\text{-}30)$$

$$T_Y = T_{Xt} \sin\theta + T_{Yt} \cos\theta \quad (5\text{-}31)$$

$$T_Z = T_{Zct} \cos^2\gamma \quad (5\text{-}32)$$

Inputs for the tire model in block 6001 are tire spin velocity in-block 6002 and the data of tire axis in block 6003. The data of the tire axis in block 6003 contain the height h of tire center and vector of tire axis $(x_r, y_r, z_r)$ and velocity vector of tire center $(v_x, v_y, v_z)$. From these data, tire yaw angle, camber angle, velocity vector of tire center in tire force coordinate, tire effective radius, rolling slip, and lateral slip are calculated by Eqs (5-1)-(5-8) (see FIG. 7 for details).

Static tire forces and moments at contact point in tire force coordinate are calculated by Eqs (5-9)-(5-20). Noise signals in block 6004 can be added to the tire model during these calculations. Output data from the tire model 6001 include: vertical force, driving force, static side force, static self aligning torque, static overturning torque at the contact point, and relaxation length. Conversion from static force and moments to dynamic moments is provided by Eqs (5-21)~(5-23).

The rolling moment in block 6005 for tire can be split by Eq. (5-24). The conversion from forces and moments at contact point to that at the shaft of tires in global coordinate system in block 6006 is provided by Eqs (5-25)-(5-32).

The tire data for a desired tire can be measured or obtained, for example, from organizations such as the Japan Automobile Research Institute (JARI). In one embodiment, tires of the same specification can be used for the front and rear.

In one embodiment, input data from a JARI tire model are vertical force, camber angle, and slip angle. Output data are side force, self aligning torque, overturning torque, and relaxation length. FIG. 8A shows a sample tire data file containing data provided by JARI. This tire model is a linear model and thus less accurate than non-linear models for large camber angles and large slip angles. Nevertheless, the linear model is adequate for many circumstances, including, but not limited to, modeling the scooter of FIG. 2A in typical operating regimes.

FIG. 8B shows a transformation of the JARI tire model to add caculation of transient effects to the tire model. In FIG. 8B input blocks, provide for arranging input data from sensed data of posistion, velocity, and posture of the tire. Additoinal blocks are provided to convert output data at tire contact in tire coordinate system to force and moment at tire center in inertia coordinate system containing transient effect. Forward and backward force calculation are provided to evaluate drag and driving forces.

The model of the MC in SimMechanics is a complicated numerical simulation model that predicts the operation of the motorcycle system. In one embodiment, Eigenvalue analysis is used in connection with the numerical model to extract and explore various characteristics of the MC model produced by the simulation.

For eigenvalue analysis, linearization of the model in the straight balanced running model can be used. The model has 12 degrees of freedom and adding differentiation to those 12 degrees, gives are 24 degrees of freedom. Moreover, there are six degrees of freedom that originated in the feedback model of the relaxation length used in order to take the dynamic character of a tire into consideration. As a result of linearization of the model, a 30×30 matrix representation of the system is obtained, correspdingly, 30 eigenvalues and 30 eigenvectors are calculated. The characteristics of the motion of the model are determined by a relatively few modes among the 30 modes. The MC weave modes and wobble modes can be unstable, and the corredponding eigenvalues and eigenvectors are relatively large.

Figure 9:
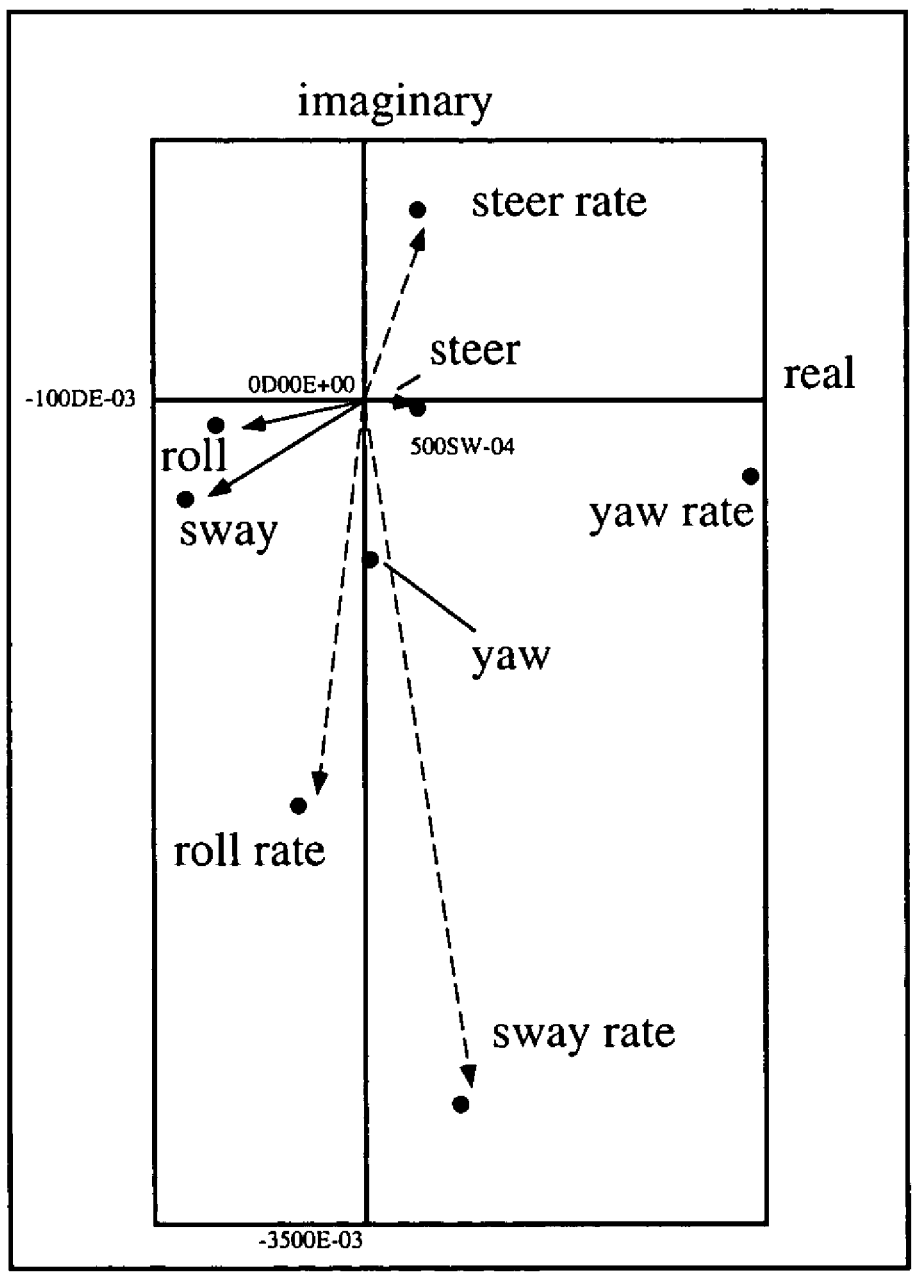
FIG. 9 shows an eigenvector of weave mode.

FIG. 9 shows the eigenvector of weave mode corresponding to 7 m/sec. The mode is a coupling mode that includes cyclic motions of sway, roll, yaw and swing of steer. Yaw rate and swing of steer are in phase and roll angle is out of phase.

Figure 10:
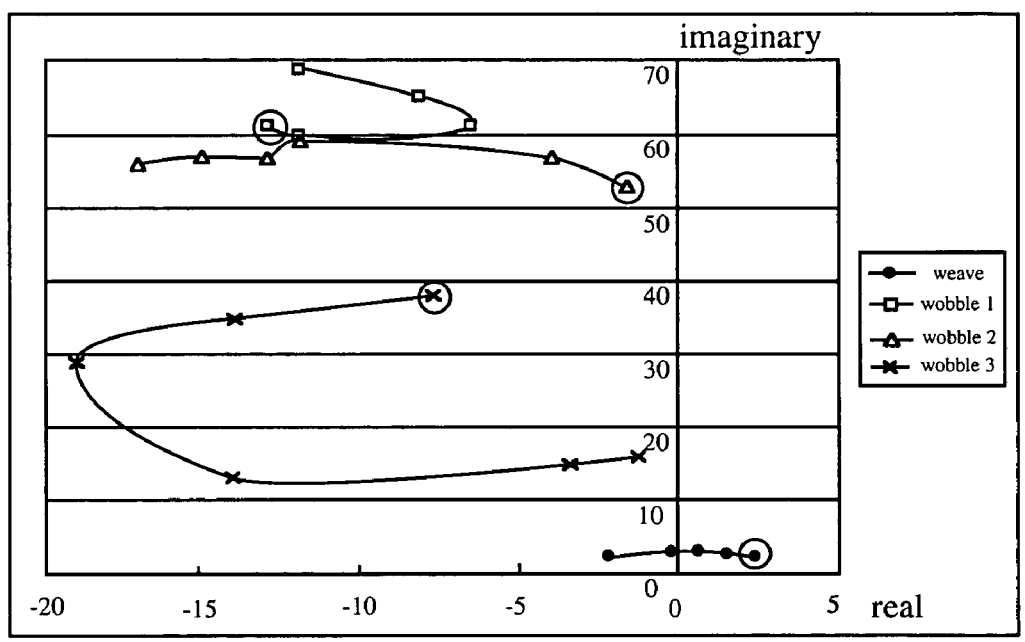
FIG. 10 shows a locus of eigenvalues of the weave and wobble mode for various velocities.

FIG. 10 shows the locus of eigenvalues of weave and wobble modes for various velocities. The weave mode is unstable for velocities under 10 m/sec. Wobble 1 mode corresponds to a simple swing of the steering. When the damping coefficient of steering is small, the mode will be unstable. In this model the damping coefficient $C_{st}=5$ is adopted. Wobble 2 mode includes rider roll, chassis roll, and steering swing. Wobble 3 mode includes yaw, roll, and steering swing. Table 2 shows eigenvalues of weave and wobble 1 when the damping coefficient of steering changes.

TABLE 2

| Coefficient $C_{st}$ | Weave eigenvalue | Wobble 1 eigenvalues |
|---|---|---|
| 0 | 0.55 + 3.3i | 12 + 57i |
| 1 | 0.63 + 3.3i | 8.0 + 58i |
| 3 | 0.76 + 3.2i | 1.2 + 60i |
| 5 | 0.88 + 3.0i | −6.7 + 61i |

The results of simulation by the rider models were both stable. Robustness of the controllers was confirmed by simulation taking into account the transmission delay of the response of actuator and noises in tire forces (as described below).

In one embodiment, Stage 2 (defining the structure of the KB) is realized using a new structure based on Soft Computing (SC) techniques. The structure of the intelligent control system is based on the SC optimizer shown in FIG. 1. In this case, the SC optimizer is used in place of the FNN block.

The SC optimizer generates a KB of Fuzzy Inference System (FIS) from the digital in-out data. The SC optimizer provides GA based FNN learning, including rule extraction and KB optimization. In one embodiment, the SC optimizer can use as a teaching signal both pattern file and the model (control object) output.

Figure 11:
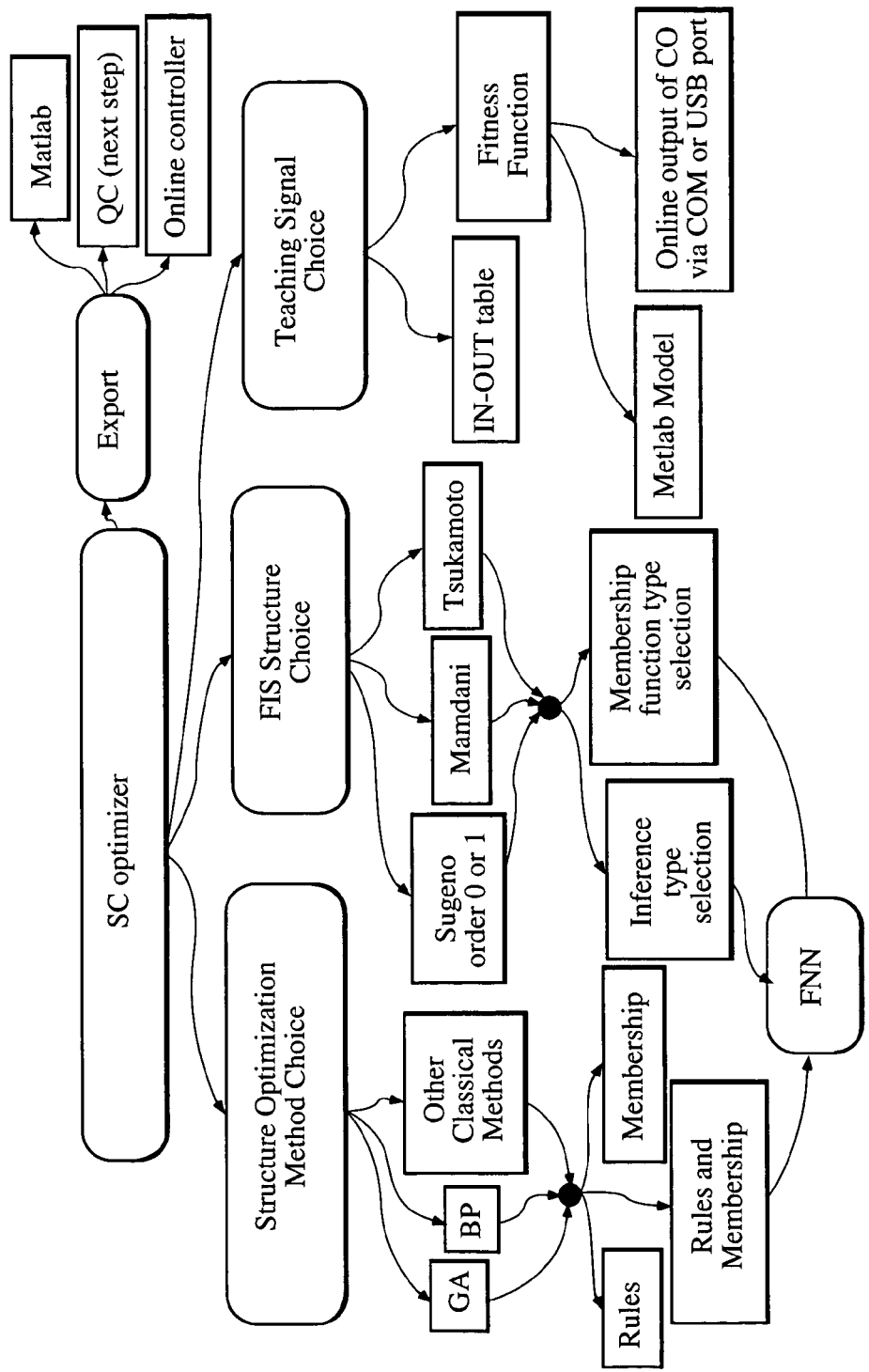
FIG. 11 shows features of the SC Optimizer.

FIG. 11 shows the features of the SC optimizer. The SC optimizer includes a fuzzy inference system (FIS) represented in the form of a FNN. In one embodiment, the SC optimizer allows structure selection, such as for example, Sugeno FIS order 0 and 1, Mamdani FIS, Tsukamoto FIS, etc. In one embodiment, the SC optimizer allows structure optimization selection, such as for example, Optimization via Genetic Algorithm (GA), Linguistic variables optimization, and rule-based optimization. In one embodiment, the SC optimizer allows teaching source selection, such as for example: teaching signal as a look-up table (e.g., a table of in-out patterns); and/or teaching signal as a fitness function. When provided by a fitness function, the teaching signal fitness function can be: calculated as a dynamic system response (e.g., using in MATLAB), calculated as a result of control of real control object (e.g., obtained using dSPACE or other method of connection of control object directly to computer), etc.

Figure 12A:
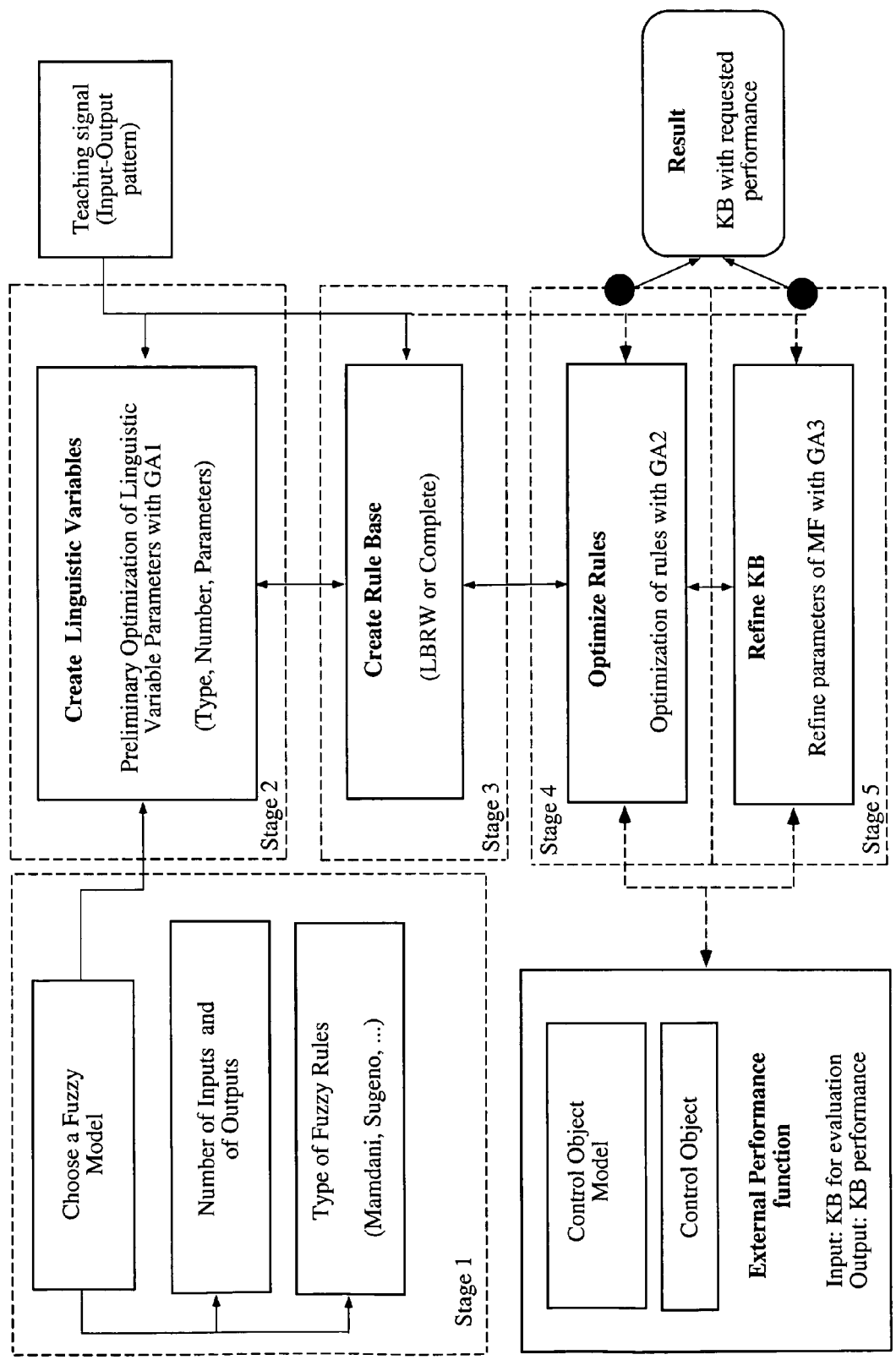
FIG. 12A is a flowchart of the SC Optimizer.
Figure 12B:
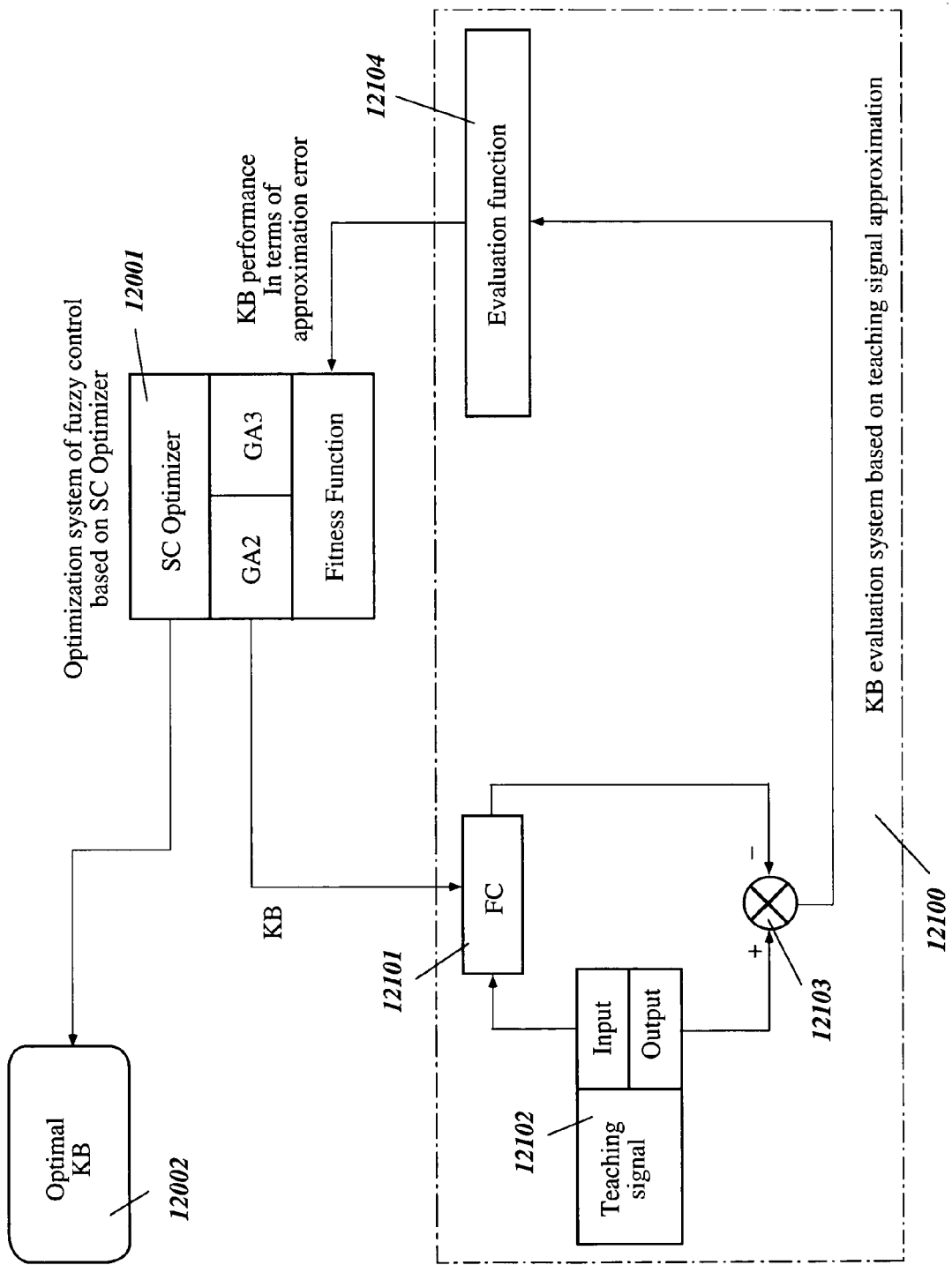
FIG. 12B is a flowchart for using SC Optimizer.
Figure 12:
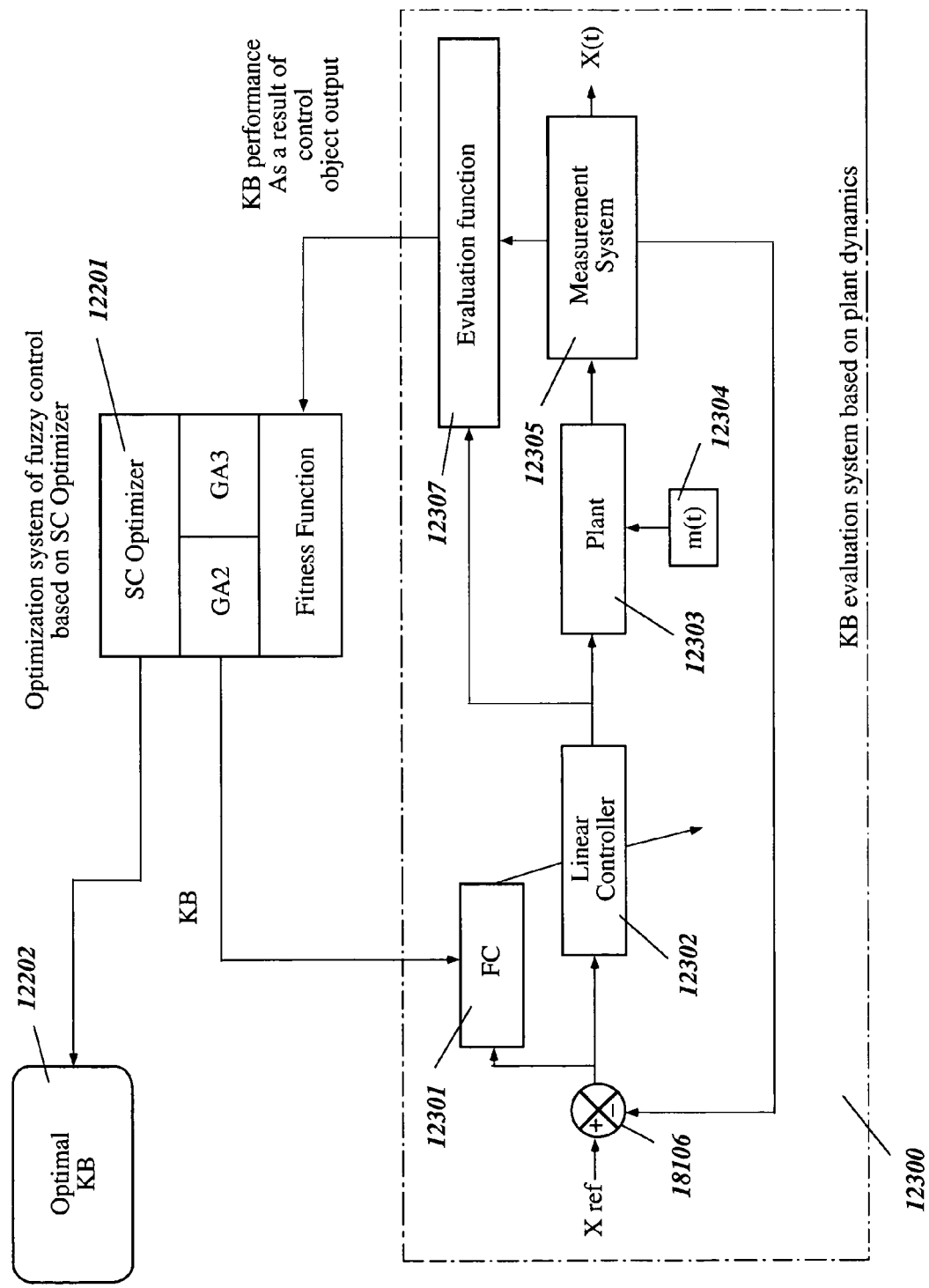
FIG. 12C shows a flowchart for evaluating the SC Optimizer.

FIG. 12 is a flowchart for one embodiment of the SC optimizer. By way of explanation, and not by way of limitation, the operation of the flowchart divides operation in to five stages, shown as Stages 1, 2, 3, 4, and 5.

In Stage 1, the user selects a fuzzy model by selection one of parameters such as, for example, the number of input and output variables, the type of fuzzy inference model (Mamdani, Sugeno, Tsukamoto, etc.), source of the teaching signal.

In Stage 2, a first GA (GA1) optimizes linguistic variable parameters, using the information obtained in Stage 1 about the general system configuration, and the input-output training patterns, obtained from the training signal as an input-output tables.

In Stage 3 a precedent part of the rule base is created and rules are ranked according to their firing strength. Rules with high firing strength are kept, whereas weak rules with small firing strength are eliminated.

In Stage 4, a second GA (GA2) optimizes a rule base, using the fuzzy model obtained in Stage 1, optimal linguistic variable parameters obtained in Stage 2, selected set of rules obtained in Stage 3 and the teaching signal.

In Stage 5, the structure of FNN is further optimized. In order to reach the optimal structure, the classical derivative-based optimization procedures can be used, with a combination of initial conditions for back propagation, obtained from previous optimization stages. The result of Stage 5 is a specification of fuzzy inference structure that is optimal for the plant 120. Stage 5 is optional and can be bypassed. If Stage 5 is bypassed, then the FIS structure obtained with the GAs of Stages 2 and 4 is used.

In one embodiment the teaching signal, representing one or more input signals and one or more output signals, is divided into input and output parts. Each of the parts is divided into one or more signals. Thus, in each time point of the teaching signal there is a correspondence between the input and output parts.

Each component of the teaching signal (input or output) is assigned to a corresponding linguistic variable, in order to explain the signal characteristics using linguistic terms. Each linguistic variable is described by some unknown number of membership functions, like "Large", "Medium", "Small", etc.

"Vertical relations" represent the explicitness of the linguistic representation of the concrete signal, e.g. how the membership functions is related to the concrete linguistic variable. Increasing the number of vertical relations will increase the number of membership functions, and as a result will increase the correspondence between possible states of the original signal, and its linguistic representation. An infinite number of vertical relations would provide an exact correspondence between signal and its linguistic representation, because to each possible value of the signal would be assigned a membership function, but in this case the situations as "over learning" may occur. Smaller number of vertical relations will increase the robustness, since some small variations of the signal will not affect much the linguistic representation. The balance between robustness and precision is a very important moment in design of the intelligent systems, and usually this task is solved by Human expert.

"Horizontal relations" represent the relationships between different linguistic variables. Selected horizontal relations can be used to form components of the linguistic rules.

To define the "horizontal" and "vertical" relations mathematically, consider a teaching signal:

[x(t),y(t)],

Where:
t=1, . . . , N—time stamps;
N—number of samples in the teaching signal;
$x(t)=(x_1(t), \ldots x_m(t))$—input components;
$y(t)=(y_1(t), \ldots y_n(t))$—output components.

Define the linguistic variables for each of the components. A linguistic variable is usually defined as a quintuple: (x,T(x),U,G,M), where x is the name of the variable, T(x) is a term set of the x, that is the set of the names of the linguistic values of x, with a fuzzy set defined in U as a value, G is a syntax rule for the generation of the names of the values of the x and M is a semantic rule for the association of each value with its meaning. In the present case, x is associated with the signal name from x or y, term set T(x) is defined using vertical relations, U is a signal range. In some cases one can use normalized teaching signals, then the range of U is [0,1]. The syntax rule G in the linguistic variable optimization can be omitted, and replaced by indexing of the corresponding variables and their fuzzy sets.

Semantic rule M varies depending on the structure of the FIS, and on the choice of the fuzzy model. For the representation of all signals in the system, it is necessary to define m+n linguistic variables:

Let [X,Y], $X=(X_1, \ldots, X_m)$, $Y=(Y_1, \ldots, Y_n)$ be the set of the linguistic variables associated with the input and output signals correspondingly. Then for each linguistic variable one can define a certain number of fuzzy sets to represent the variable:

$$X_1: \{\mu_{X_1}^1, \ldots, \mu_{X_1}^{l_{X_1}}\}, \ldots, X_m: \{\mu_{X_m}^1, \ldots, \mu_{X_m}^{l_{X_m}}\};$$

$$Y_1: \{\mu_{Y_1}^1, \ldots, \mu_{Y_1}^{l_{Y_1}}\}, \ldots, Y_n: \{\mu_{Y_n}^1, \ldots, \mu_{Y_n}^{l_{Y_n}}\}$$

Where
$\mu_{X_i}^{j_i}$, i=1, . . . , m, $j_i$=1, . . . , $l_{X_i}$ are membership functions of the i th component of the input variable; and
$\mu_{Y_i}^{j_i}$, i=1, . . . , $j_i$=1, . . . , $l_{Y_i}$ are membership functions of the i th component of the output variable.

Usually, at this stage of the definition of the KB, the parameters of the fuzzy sets are unknown, and it may be difficult to judge how many membership functions are necessary to describe a signal. In this case, the number of membership functions (power of term set), $l_{X_i} \in [1, L_{MAX}]$, i=1, . . . , m can be considered as one of the parameters for the GA (GA1) search, where $L_{MAX}$ is the maximum number of membership functions allowed. In one embodiment, $L_{MAX}$ is specified by the user prior to the optimization, based on considerations such as the computational capacity of the available hardware system.

Knowing the number of membership functions, it is possible to introduce a constraint on the possibility of activation of each fuzzy set, denoted as $p_{X_i}^j$.

One of the possible constraints can be introduced as:

$$p_{X_i}^{j_i} \geq \frac{1}{l_{X_i}}, i=1, \ldots, m; j=1, \ldots, l_{X_i}$$

This constraint will cluster the signal into the regions with equal probability, which is equal to division of the signal's histogram into curvilinear trapezoids of the same surface area. Supports of the fuzzy sets in this case are equal or greater to the base of the corresponding trapezoid. How much greater the support of the fuzzy set should be, can be defined from an overlap parameter. For example, the overlap parameter takes zero, when there is no overlap between two attached trapezoids. If it is greater than zero then there is some overlap. The areas with higher probability will have in this case "sharper" membership functions. Thus, the overlap parameter is another candidate for the GA1 search. The fuzzy sets obtained in this case will have uniform possibility of activation.

Modal values of the fuzzy sets can be selected as points of the highest possibility, if the membership function has unsymmetrical shape, and as a middle of the corresponding trapezoid base in the case of symmetric shape. Thus one can set the type of the membership functions for each signal as a third parameter for the GA1.

The relation between the possibility of the fuzzy set and its membership function shape can also be found. The possibility of activation of each membership function is calculated as follows:

$$p_{X_i}^j = p(x_i \mid x_i = \mu_{X_i}^j) = \frac{1}{N} \sum_{t=1}^{N} \mu_{X_i}^j(x_i(t)) \quad (6.1)$$

Mutual possibility of activation of different membership functions can be defined from a geometrical view point as:

$$p_{X_i \mid X_k}^{(j,l)} = p\left(x_i \mid_{x_i = \mu_{X_i}^j, x_k = \mu_{X_k}^l}\right) = \frac{1}{N} \sum_{t=1}^{N} [\mu_{X_i}^j(x_i(t)) * \mu_{X_k}^l(x_k(t))] \quad (6.2)$$

where * denotes selected T-norm (Fuzzy AND) operation; j=1, . . . , $l_{X_i}$, l=1, . . . , $l_{X_k}$, are indexes of the corresponding membership functions.

In fuzzy logic literature, T-norm, denoted as * is a two-place function from [0,1]×[0,1] to [0,1]. It represents a fuzzy intersection operation and can be interpreted as minimum operation, or algebraic product, or bounded product or drastic product. S-conorm, denoted by +̇, is a two-place function, from [0,1]×[0,1] to [0,1]. It represents a fuzzy union operation and can be interpreted as algebraic sum, or bounded sum and drastic sum. Typical T-norm and S-conorm operators are presented in Table 3.

TABLE 3

| T-norms (fuzzy intersection) | S-conorms (fuzzy union) |
|---|---|
| min(x, y) – minimum operation | max(x, y) – maximum operation |
| xy – algebraic product | x + y – xy – algebraic sum |
| x * y = max[0, x + y – 1] – bounded product | x + y = min[1, x + y] – bounded sum |
| $x*y = \begin{cases} x, \text{ if } y=1 \\ y, \text{ if } x=1 \\ 0, \text{ if } x,y<1 \end{cases}$ – drastic product | $x+y = \begin{cases} x, \text{ if } y=0 \\ y, \text{ if } x=0 \\ 0, \text{ if } x,y>0 \end{cases}$ – drastic product |

If i=k, and j≠l, then equation (6.2) defines "vertical relations"; and if i≠k, then equation (6.2) defines "horizontal relations". The measure of the "vertical" and of the "horizontal" relations is a mutual possibility of the occurrence of the membership functions, connected to the correspondent relation.

The set of the linguistic variables is considered as optimal, when the total measure of "horizontal relations" is maximized, subject to the minimum of the "vertical relations".

Hence, one can define a fitness function for the GA1 which will optimize the number and shape of membership functions as a maximum of the quantity, defined by equation (6.2), with minimum of the quantity, defined by equation (6.1).

The chromosomes of the GA1 for optimization of linguistic variables according to Equations (6.1) and (6.2) have the following structure:

$$\underbrace{[l_{X_1}, \ldots, l_{Y_n}]}_{m+n} \underbrace{[\alpha_{X_1}, \ldots, \alpha_{Y_n}]}_{m+n} \underbrace{[T_{X_1}, \ldots, T_{Y_N}]}_{m+n}$$

Where:

$l_{X(Y)_i} \in [1, L_{MAX}]$ are genes that code the number of membership functions for each linguistic variable $X_i(Y_i)$;

$\alpha_{X(Y)_i}$ are genes that code the overlap intervals between the membership functions of the corresponding linguistic variable $X_i(Y_i)$; and $T_{X(Y)_i}$ are genes that code the types of the membership functions for the corresponding linguistic variables.

Another approach to the fitness function calculation is based on the Shannon information entropy. In this case instead of the equations (6.1) and (6.2), for the fitness function representation one can use the following information quantity taken from the analogy with information theory:

$$H_{X_i}^j = -p_{X_i}^j \log(p_{X_i}^j) \quad (6.1a)$$
$$= -p(x_i \mid x_i = \mu_{X_i}^j) \log[p(x_i \mid x_i = \mu_{X_i}^j)]$$
$$= -\frac{1}{N} \sum_{t=1}^{N} \mu_{X_i}^j(x_i(t)) \log[\mu_{X_i}^j(x_i(t))]$$

and

-continued $$H_{X_i|X_k}^{(j,l)} = H\left(x_i \mid_{X_i=\mu_{X_i}^j, X_k=\mu_{X_k}^l}\right) \quad (6.2a)$$
$$= -\frac{1}{N} \sum_{t=1}^{N} [\mu_{X_i}^j(x_i(t)) * \mu_{X_k}^l(x_k(t))]$$
$$\log[\mu_{X_i}^j(x_i(t)) * \mu_{X_k}^l(x_k(t))]$$

In this case, GA1 will maximize the quantity of mutual information (6.2a), subject to the minimum of the information about each signal (6.1a). In one embodiment the combination of information and probabilistic approach can also be used.

In case of the optimization of number and shapes of membership functions in Sugeno—type FIS, it is enough to include into GA chromosomes only the input linguistic variables. The detailed fitness functions for the different types of fuzzy models will be presented in the following sections, since it is more related with the optimization of the structure of the rules.

In one embodiment, a rules pre-selection algorithm selects the number of optimal rules and their premise structure prior optimization of the consequent part. Consider the structure of the first fuzzy rule of the rule base $R^1(t) = $ IF $x_1(t)$ is $\mu_1^1(x_1)$ AND $x_2(t)$ is $\mu_2^1(x_2)$ AND ... AND $x_m(t)$ is $\mu_m^1(x_m)$,

THEN $y_1(t)$ is $\mu_{m+1}^{\{l_{m+1}\}}(y_1)$, $y_2(t)$ is $\mu_{m+2}^{\{l_{m+2}\}}(y_2)$, ..., $y_n(t)$ is $\mu_{m+n}^{\{l_{m+n}\}}(y_n)$

Where:
m is the number of inputs;
n is the number of outputs;
$x_i(t)$, i=1, ..., m are input signals;
$y_j(t)$, j=1, ..., n are output signals;
$\mu_k^{l_k}$ are membership functions of linguistic variables;
k=1, ..., m+n are the indexes of linguistic variables;
$l_k$=2,3, ... are the numbers of the membership functions of each linguistic variable;
$\mu_k^{\{l_k\}}$—are membership functions of output linguistic variables, upper index; $\{l_k\}$ means the selection of one of the possible indexes; and
t is a time stamp.
Consider the antecedent part of the rule:

$R_{IN}^1(t) = $ IF $x_1(t)$ is $\mu_1^1(x_1)$ AND $x_2(t)$ is $\mu_2^1(x_2)$ AND ... AND $x_m(t)$ is $\mu_m^1(x_m)$

The firing strength of the rule $R^1$ in the moment t is calculated as follows:

$$R_{fs}^1(t) = \min[\mu_1^1(x_1(t)), \mu_2^1(x_2(t)), \ldots, \mu_m^1(x_m(t))]$$

for the case of the min-max fuzzy inference, and as $$R_{fs}^1(t) = \Pi[\mu_1^1(x_1(t)), \mu_2^1(x_2(t)), \ldots, \mu_m^1(x_m(t))]$$

for the case of product-max fuzzy inference.

In general case, here can be used any of the T-norm operations.

The total firing strength $R_{fs}^1$ of the rule, the quantity $R_{fs}^1(t)$ can be calculated as follows:

$$R_{fs}^1 = \frac{1}{T}\int_t R_{fs}^1(t)\,dt$$

for a continuous case, and:

$$R_{fs}^1 = \frac{1}{T}\sum_t R_{fs}^1(t)$$

for a discrete case.

In a similar manner the firing strength of each s-th rule is calculated as:

$$R_{fs}^s = \frac{1}{N}\int_t R_{fs}^s(t)\,dt, \text{ or } R_{fs}^2 = \frac{1}{N}\sum_t R_{fs}^s(t), \qquad (6.3)$$

where $$s = 1, 2, \ldots, \prod_{i=1}^m l_i$$

is a linear rule index

N—number of points in the teaching signal or maximum of t in continuous case.

In one embodiment the local firing strength of the rule can be calculated in this case instead of integration, the maximum operation is taken in equation (6.3):

$$R_{fs}^s = \max_t R_{fs}^s(t) \qquad (6.4)$$

In this case, the total strength of all rules will be:

$$R_{fs} = \sum_{s=1}^{L_0} R_{fs}^s,$$

where:

$$L_0 = \prod_{k=1}^m l_k - \text{Number of rules in complete rule base}$$

Quantity $R_{fs}$ is important since it shows in a single value the integral characteristic of the rule base. This value can be used as a fitness function which optimizes the shape parameters of the membership functions of the input linguistic variables, and its maximum guaranties that antecedent part of the KB describes well the mutual behavior of the input signals. Note that this quantity coincides with the "horizontal relations," introduced in the previous section, thus it is optimized automatically by GA1.

Alternatively, if the structure of the input membership functions is already fixed, the quantities $R_{fs}^s$ can be used for selection of the certain number of fuzzy rules. Many hardware implementations of FCs have limits that constrain, in one embodiment, the total possible number of rules. In this case, knowing the hardware limit L of a certain hardware implementation of the FC, the algorithm can select $L \leq L_0$ of rules according to a descending order of the quantities $R_{fs}^s$. Rules with zero firing strength can be omitted.

It is generally advantageous to calculate the history of membership functions activation prior to the calculation of the rule firing strength, since the same fuzzy sets are participating in different rules. In order to reduce the total computational complexity, the membership function calculation is called in the moment t only if its argument x(t) is within its support. For Gaussian-type membership functions, support can be taken as the square root of the variance value $\sigma^2$.

In one embodiment, a rule pre-selection algorithm is based on a firing strength of the rules. The threshold level can be selected based on the maximum number of rules desired, based on user inputs, based on statistical data and/or based on other considerations. Rules with relatively high firing strength will be kept, and the remaining rules are eliminated. Rules with zero firing strength can be eliminated by default. In one embodiment, the presence of the rules with zero firing strength may indicate the explicitness of the linguistic variables (linguistic variables contain too many membership functions). The total number of the rules with zero firing strength can be reduced during membership functions construction of the input variables. This minimization is equal to the minimization of the "vertical relations."

This algorithm produces an optimal configuration of the antecedent part of the rules prior to the optimization of the rules. Optimization of the consequential part of KB can be applied directly to the optimal rules only, without unnecessary calculations of the "un-optimal rules". This process can also be used to define a search space for the GA (GA2), which finds the output (consequential) part of the rule.

A chromosome for the GA2 which specifies the structure of the output part of the rules can be defined as:

$$[I_1, \ldots, I_M], I_i = [I_1, \ldots, I_n], I_k = \{1, \ldots, 1_{Y_k}\},$$
$$k = 1, \ldots, n$$

where:

$I_i$ are groups of genes which code single rule;

$I_k$ are indexes of the membership functions of the output variables;

n is the number of outputs; and

M is the number of rules.

In one embodiment the history of the activation of the rules can be associated with the history of the activations of membership functions of output variables or with some intervals of the output signal in the Sugeno fuzzy inference case. Thus, it is possible to define which output membership functions can possibly be activated by the certain rule. This allows reduction of the alphabet for the indexes of the output variable membership functions from $\{\{1, \ldots, 1_{Y_1}\}, \ldots, \{1, \ldots, 1_{Y_n}\}\}^N$ to the exact definition of the search space of each rule:

$$\{l^{min}_{Y_1}, \ldots, l^{max}_{Y_1}\}_1, \ldots, \{l^{min}_{Y_n}, \ldots,$$
$$l^{max}_{Y_n}\}_1, \ldots, \{l^{min}_{Y_1}, \ldots, l^{max}_{Y_1}\}_N, \ldots,$$
$$\{l^{min}_{Y_n}, \ldots, l^{max}_{Y_n}\}_N$$

Thus the total search space of the GA is reduced. In cases where only one output membership function is activated by some rule, such a rule can be defined automatically, without GA2 optimization.

In one embodiment in case of Sugeno 0 order FIS, instead of indexes of output membership functions, corresponding intervals of the output signals can be taken as a search space.

For some combinations of the input-output pairs of the teaching signal, the same rules and the same membership functions are activated. Such combinations are uninteresting from the rule optimization view point, and hence can be removed from the teaching signal, reducing the number of input-output pairs, and as a result total number of calculations. The total number of points in the teaching signal (t) in this case will be equal to the number of rules plus the number of conflicting points (points when the same inputs result in different output values).

The previous section described optimization of the FIS, without the details into the type of FIS selection. In one embodiment, the fitness function used in the GA2 depends, at least in part, on the type of the optimized FIS. Examples of fitness functions for the Mamdani, Sugeno and/or Tsukamoto FIS models are described herein. One of ordinary skill in the art will recognize that other fuzzy models can be used as well.

Define error $E^p$ as a difference between the output part of teaching signal and the FIS output as:

$$E^p = \frac{1}{2}(d^p - F(x_1^p, x_2^p, \ldots, x_n^p))^2 \text{ and } E = \sum_p E^p,$$

where $x_1^p, x_2^p, \ldots, x_n^p$ and $d^p$ are values of input and output variables in the p training pair, respectively. The function $F(x_1^p, x_2^p, \ldots, x_n^p)$ is defined according to the chosen FIS model.

For the Mamdani model, the function $F(x_1^p, x_2^p, \ldots, x_n^p)$ is defined as:

$$F(x_1, \ldots, x_n) = \frac{\sum_{l=1}^{M} \overline{y}^l \prod_{i=1}^{n} \mu_{j_i}^l(x_i)}{\sum_{l=1}^{M} \prod_{i=1}^{n} \mu_{j_i}^l(x_i)} = \frac{\sum_{l=1}^{M} \overline{y}^l z^l}{\sum_{l=1}^{M} z^l}, \quad (6.5)$$

where $$z^l = \prod_{i=1}^{n} \mu_{j_i}^l(x_i) \text{ and } \overline{y}^l$$

is the point of maximum value (called also as a central value) of $\mu_y^l(y)$, $\Pi$ denotes the selected T-norm operation.

Typical rules in the Sugeno fuzzy model can be expressed as follows:

IF $x_1$ is $\mu_{j_1}^{(l)}(x_1)$ AND $x_2$ is $\mu_{j_2}^{(l)}(x_2)$ AND . . . AND $x_n$ is $\mu_{j_n}^{(l)}(x_n)$

THEN $y=f^l(x_1, \ldots, x_n)$, where $l=1,2, \ldots, M$—the number of fuzzy rules M defined as {number of membership functions of $x_1$ input variable}× {number of membership functions of $x_2$ input variable}× . . . ×{number of membership functions of $x_n$ input variable}.

The output of Sugeno FIS is calculated as follows:

$$F(x_1, x_2, \ldots, x_n) = \frac{\sum_{l=1}^{M} f^l \prod_{i=1}^{n} \mu_{j_i}^l(x_i)}{\sum_{l=1}^{M} \prod_{i=1}^{n} \mu_{j_i}^l(x_i)}. \quad (6.6)$$

Typical rules in the first-order Sugeno fuzzy model can be expressed as follows:

IF $x_1$ is $\mu_{j_1}^{(l)}(x_1)$ AND $x_2$ is $\mu_{j_2}^{(l)}(x_2)$ AND . . . AND $x_n$ is $\mu_{j_n}^{(l)}(x_n)$

THEN $y=f^l(x_1, \ldots, x_n)=p_1^{(l)}x_1+p_2^{(l)}x_2+ \ldots p_n^{(l)} x_n+r^{(l)}$, (Output variables described by some polynomial functions.)

The output of Sugeno FIS is calculated according equation (6.6).

Typical rules in the zero-order Sugeno FIS can be expressed as follows:

IF $x_1$ is $\mu_{j_1}^{(l)}(x_1)$ AND $x_2$ is $\mu_{j_2}^{(l)}(x_2)$ AND . . . AND $x_n$ is $\mu_{j_n}^{(l)}(x_n)$

THEN $y=r^{(l)}$,

The output of zero-order Sugeno FIS is calculated as follows $$F(x_1, x_2, \ldots, x_n) = \frac{\sum_{l=1}^{M} r^l \prod_{i=1}^{n} \mu_{j_i}^l(x_i)}{\sum_{l=1}^{M} \prod_{i=1}^{n} \mu_{j_i}^l(x_i)} \quad (6.7)$$

The typical rule in the Tsukamoto FIS is:

IF $x_1$ is $\mu_{j_1}^{(l)}(x_1)$ AND $x_2$ is $\mu_{j_2}^{(l)}(x_2)$ AND . . . AND $x_n$ is $\mu_{j_n}^{(l)}(x_n)$

THEN y is $\mu_k^{(l)}(y)$, where $j_1 \in I_{m_1}$ is the set of membership functions describing linguistic values of $x_1$ input variable; $j_2 \in I_{m_2}$ is the set of membership functions describing linguistic values of $x_2$ input variable; and so on, $j_n \in I_{m_n}$ is the set of membership functions describing linguistic values of $x_n$ input variable; and $k \in O$ is the set of monotonic membership functions describing linguistic values of y output variable.

The output of the Tsukamoto FIS is calculated as follows:

$$F(x_1, \ldots, x_n) = \frac{\sum_{l=1}^{M} y^l \prod_{i=1}^{n} \mu_{j_i}^l(x_i)}{\sum_{l=1}^{M} \prod_{i=1}^{n} \mu_{j_i}^l(x_i)} = \frac{\sum_{l=1}^{M} y^l z^l}{\sum_{l=1}^{M} z^l}, \quad (6.8)$$

where $z^l = \prod_{i=1}^{n} \mu_{j_i}^l(x_i)$ and $z^l = \mu_k^{(l)}(y^l)$

Stage 4 described above generates a KB with required robustness and performance for many practical control system design applications. If performance of the KB generated in Stage 4 is, for some reasons, insufficient, then the KB refinement algorithm of Stage 5 can be applied.

In one embodiment, the Stage 5 refinement process of the KB structure is realized as another GA (GA3), with the search space from the parameters of the linguistic variables. In one embodiment the chromosome of GA3 can have the following structure: $\{[\Delta_1,\Delta_2,\Delta_3]\}^L$; $\Delta_i \in [-\text{prm}_i^j, 1-\text{prm}_i^j]$; i=1,2,3;j=1,2, . . . , L, where L is the total number of the membership functions in the system In this case the quantities $\Delta_i$ are modifiers of the parameters of the corresponding fuzzy set, and the GA3 finds these modifiers according to the fitness function as a minimum of the fuzzy inference error. In such an embodiment, the refined KB has the parameters of the membership functions obtained from the original KB parameters by adding the modifiers $\text{prm}^{new}_i = \text{prm}_i + \Delta_i$.

Different fuzzy membership function can have the same number of parameters, for example Gaussian membership functions have two parameters, as a modal value and variance. Iso-scalene triangular membership functions also have two parameters. In this case, it is advantageous to introduce classification of the membership functions regarding the number of parameters, and to introduce to GA3 the possibility to modify not only parameters of the membership functions, but also the type of the membership functions, form the same class.

GA3 improves fuzzy inference quality in terms of the approximation error, but may cause over learning, making the KB too sensitive to the input. In one embodiment a fitness function for rule base optimization is used. In one embodiment, an information-based fitness function is used. In another embodiment the fitness function used for membership function optimization in GA1 is used. To reduce the search space, the refinement algorithm can be applied only to some selected parameters of the KB. In one embodiment refinement algorithm can be applied to selected linguistic variables only.

The structure realizing evaluation procedure of GA2 or GA3 is shown in FIG. 12B. In FIG. 12B, the SC optimizer 12001 sends the KB structure presented in the current chromosome of GA2 or of GA3 to FC 12101. An input part of the teaching signal 12102 is provided to the input of the FC 12101. The output part of the teaching signal is provided to the positive input of adder 12103. An output of the FC 12101 is provided to the negative input of adder 12103. The output of adder 12103 is provided to the evaluation function calculation block 12104. Output of evaluation function calculation block 12104 is provided to a fitness function input of the SC optimizer 12001, where an evaluation value is assigned to the current chromosome.

In one embodiment evaluation function calculation block 12104 calculates approximation error as a weighted sum of the outputs of the adder 12103.

In one embodiment evaluation function calculation block 12104 calculates the information entropy of the normalized approximation error.

In one embodiment of Stages 4 and 5 the fitness function of GA can be represented as some external function Fitness=$f$(KB), which accepts as a parameter the KB and as output provides KB performance. In one embodiment, the function $f$ includes the model of an actual plant controlled by the system with FC. In this embodiment, the plant model in addition to plant dynamics provides for the evaluation function.

In one embodiment function $f$ might be an actual plant controlled by an adaptive LINEAR controller with coefficient gains scheduled by FC and measurement system provides as an output some performance index of the KB.

In one embodiment the output of the plant provides data for calculation of the entropy production rate of the plant and of the control system while the plant is controlled by the FC with the structure from the KB.

In one embodiment, the evaluation function is not necessarily related to the mechanical characteristics of the motion of the plant (such as, for example, in one embodiment control error) but it may reflect requirements from the other viewpoints such as, for example, entropy produced by the system, or harshness and or bad feelings of the operator expressed in terms of the frequency characteristics of the plant dynamic motion and so on.

FIG. 12C shows one embodiment the structure-realizing KB evaluation system based on plant dynamics. In FIG. 12C, and SC optimizer 12201 provides the KB structure presented in the current chromosome of the GA2 or of the GA3 to an FC 12301. the FC is embedded into the KB evaluation system based on plant dynamics 12300. The KB evaluation system based on plant dynamics 12300 includes the FC 12301, an adaptive LINEAR controller 12302 which uses the FC 12301 as a scheduler of the coefficient gains, a plant 12303, a stochastic excitation generation system 12304, a measurement system 12305, an adder 12306, and an evaluation function calculation block 12307. An output of the linear controller 12302 is provided as a control force to the plant 12303 and as a first input to the evaluation function calculation block 12307. Output of the excitation generation system 12304 is provided to the Plant 12303 to simulate an operational environment. An output of the Plant 12303 is provided to the measurement system 12305. An output of the measurement system 12305 is provided to the negative input of the adder 12306 and together with the reference input Xref forms in adder 12306 control error which is provided as an input to the linear controller 12302 and to the FC 12301. An output of the measurement system 12305 is provided as a second input of the evaluation function calculation block 12307. The evaluation function calculation block 12307 forms the evaluation function of the KB and provides it to the fitness function input of SC optimizer 12201. Fitness function block of SC optimizer 12201 ranks the evaluation value of the KB presented in the current chromosome into the fitness scale according to the current parameters of the GA2 or of the GA3.

In one embodiment, the evaluation function calculation block 12307 forms evaluation function as a minimum of the entropy production rate of the plant 12303 and of the linear controller 12302.

In one embodiment, the evaluation function calculation block 12307 applies Fast Fourier Transformation on one or more outputs of the measurement system 12305, to extract one or more frequency characteristics of the plant output for the evaluation.

In one embodiment, the KB evaluation system based on plant dynamics 12300 uses a nonlinear model of the plant 12303. In one embodiment, the KB evaluation system based on plant dynamics 12300 is realized as an actual plant with one or more parameters controlled by the adaptive linear controller 12302 with control gains scheduled by the FC 12301. In one embodiment plant 12303 is a stable plant. In one embodiment plant 12303 is an unstable plant. The output of the SC optimizer 12201 is an optimal KB 12202.

Figure 13:
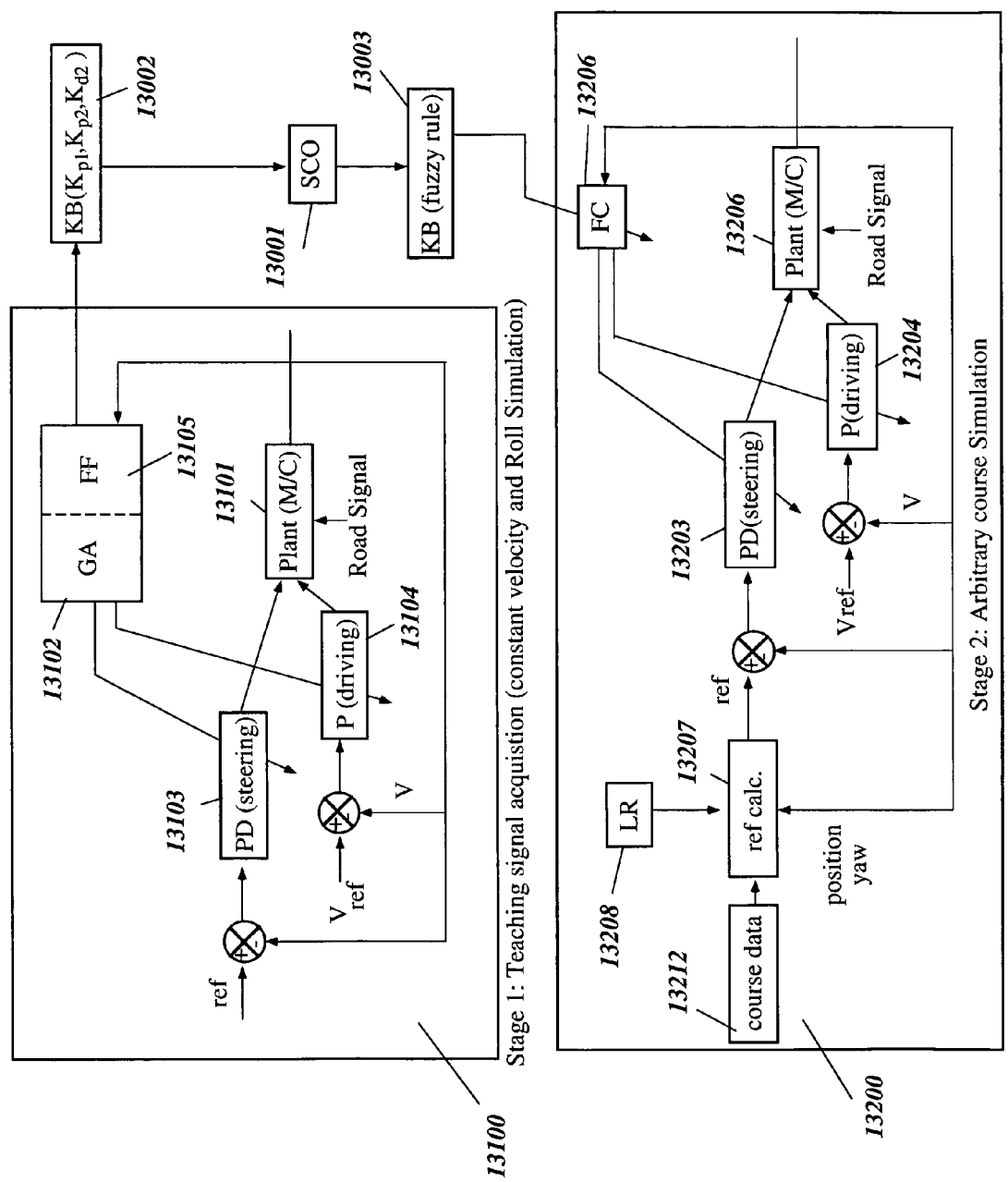
FIG. 13 shows a structure of the fuzzy control system and development of the fuzzy controller.

In FIG. 13, the structure of the fuzzy controller system and its development stages is described, combining the following Stages: Stage 1 (13100), teaching signal acquisition stage for several initial conditions; Stage 2 (13200), arbitrary course simulation.

In stage 1 (13100), several combinations of reference velocities and roll angles are set, which are also used as initial velocities and roll angles. The plant model of motorcycle 13101 (as shown in FIG. 3) and PD controller for steering 13103 and P controller for driving 13104 are embedded into the structure of Stage 1 (13100). The calculation for controllers 13103, 13104 is based on the equation (7-1)-(7-2). And the gain parameters for the PD controller for steering 13103 and the P controller for driving 13104 are provided by the GA 13102. The GA 13102 provides optimization of the parameters executed through the evaluation of the value of the Fitness Function 13105 for various conditions. The calculation of the Fitness Function 13105 is based on the equation (7-6).

Optimized parameters are stored in the KB 13002. Data for the KB 13002 are transformed into fuzzy rule form for the KB 13003 by the SCO 13001. The same plant model of MC 13201 and PD controller for steering 13203 and P controller for driving 13204 are embedded into the structure of Stage 2 (13200). The calculation for the controllers 13203, 13204 is based on equations (7-1)-(7-2). In this stage, the gain parameters for the PD controller for steering 13203 and P controller for driving 13204 are provided by the FC 13206 using the KB of the fuzzy rule 13003. Input data for the P controller for driving 13204 is the difference between forward velocity and reference velocity. Input data for the PD controller for steering 13203 are the difference between roll angle and reference roll angle, which is calculated by $\phi_{ref}$ calculator 13207. Input data for the calculator 13207 are LR 13208, course data 13212 and position and yaw of the plant model of the MC 13201. The calculation is based on equations (7-3)-(7-5).

$$\tau_d = -K_{p1}(v - v_{ref}) \qquad (7\text{-}1)$$

$$\tau_s = -K_{p2}(\phi - \phi_{ref}) - K_{d2}\dot{\phi} \qquad (7\text{-}2)$$

$$t = LR/v \qquad (7\text{-}3)$$

$$a = 2y/t^2 \qquad (7\text{-}4)$$

$$\phi_{ref} = \tan^{-1}(a/g) = \tan^{-1}\left(\frac{2y*v^2}{g*LR^2}\right) \qquad (7\text{-}5)$$

$$FF = (v - v_{ref})^2 \times 0.2 + (\phi - \phi_{ref})^2 + \dot{\phi}^2 + \tau_d^2 0.0001 + \tau_s^2 \times 0.0005 \qquad (7\text{-}6)$$

Figure 14:
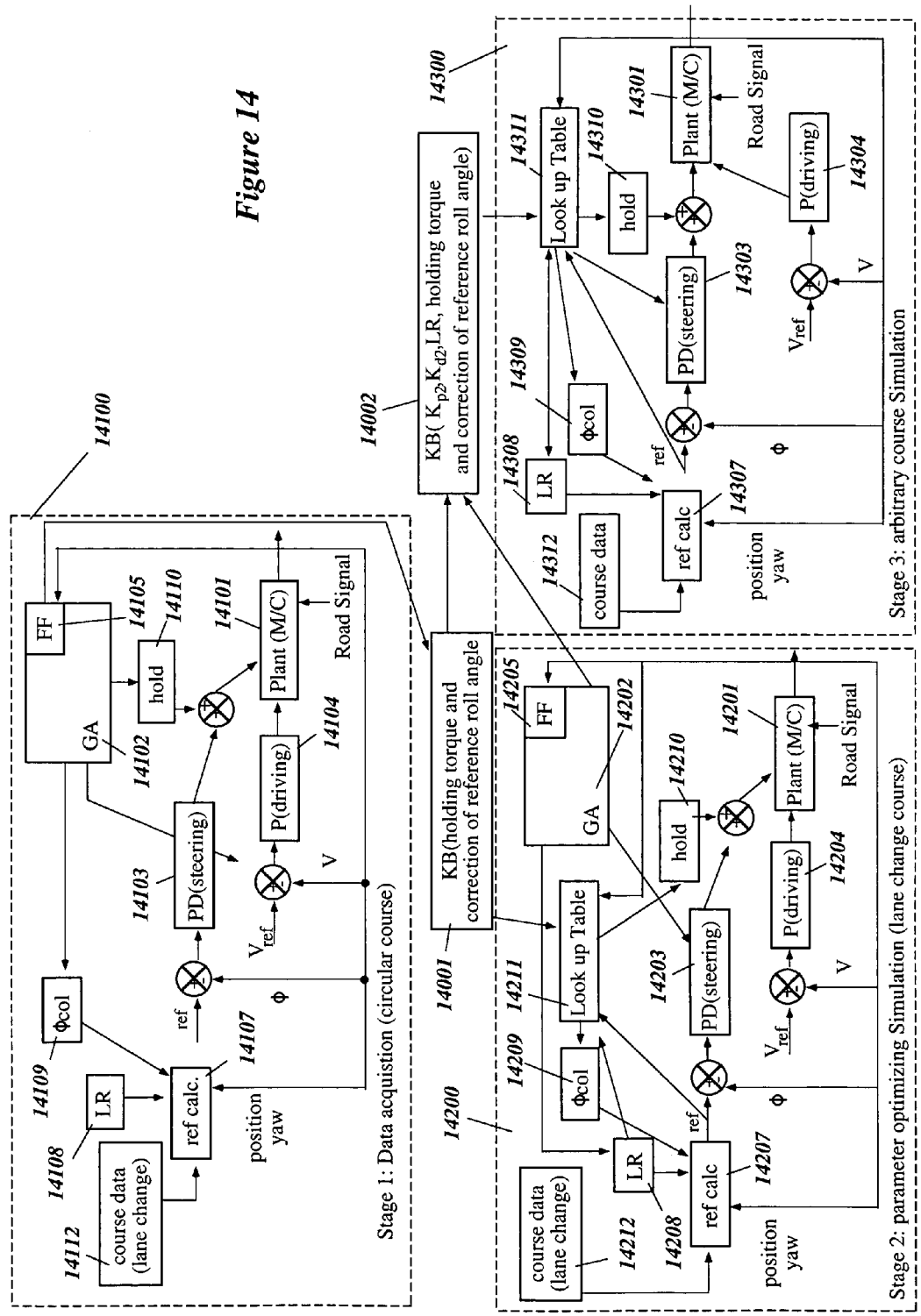
FIG. 14 shows a structure of the feedforward controller and its development.

FIG. 14 is a block diagram showing the structure of the hold steering torque feedforward system and its development. FIG. 14 shows the following 3 stages. Stage 1 (14100) is a data acquisition stage for several conditions. Stage 2 (14200) is a parameter optimization stage for several forward velocities. Stage 3 (14300) is an arbitrary course simulation.

In Stage 1 (14100), several reference velocities are set. The reference velocities are also used as initial velocities. Several radius of circle course 14112 and several LR 14108 are used. As combination of several reference velocities and several radius of circle course 14112 and several LR 14108, many cases of simulation must be executed. The plant model of the motorcycle 14101, the PD controller for steering 14103, and the P controller for driving 14104 are embedded into the structure of Stage 1 (14100). The calculation for controllers 14103, 14104 is based on equation (7-1)-(7-2). The P gain parameter for PD controller for steering 14103 and P controller for driving 14104 are fixed. The D parameter for PD controller for steering 14103 are provided by a GA 14102. The GA 14102 feeds the value of $\phi_{col}$ 14109 and $\tau_{hold}$ 14110. $\phi_{col}$ 14109 is used as input for $\phi_{ref\,calc}$ 14107. Other input data of the calculator 14107 are LR 14108 and course data (a circular course is used here) 14112 and position and yaw of the plant model of the motorcycle 14101. The calculation 14107 is based on equations (7-7)-(7-111). The value $\tau_{hold}$ 14110 is added to the output of the PD controller for steering 14103. By using the GA 14102, the optimization of the parameters is executed through the evaluation of the value of the Fitness Function 14105 for each desired condition. The calculation of Fitness Function 14105 is based on equation (7-12). Optimized parameters of $\phi_{col}$ 14109 and $\tau_{hold}$ 14110 are stored in the KB 14001.

Figure 30:
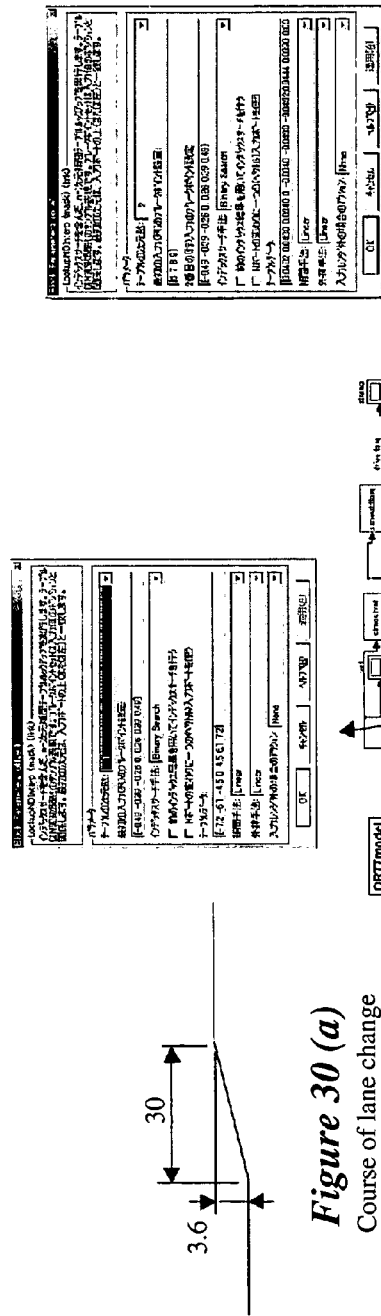
FIG. 30A-B show course lane change and model for lane change simulation.
Figure 30:
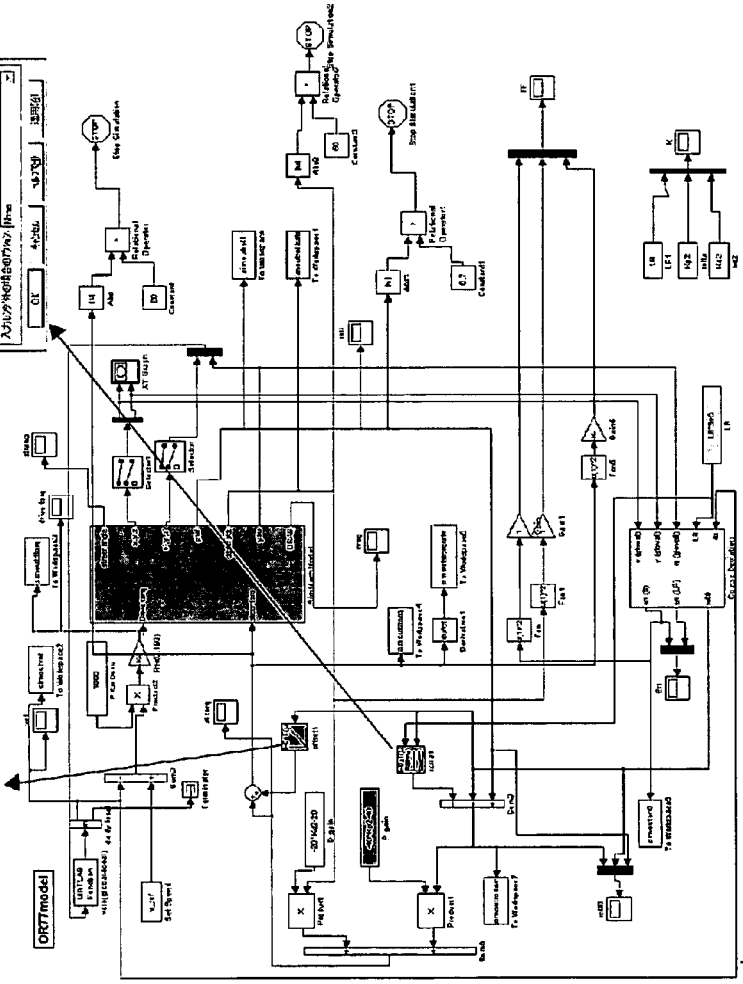

The data of KB 14001 are used in the Look up table 14211 in Stage 2 (14200). The Look up table 14211 brings optimized $\phi_{col}$ 14209 and $\tau_{hold}$ 14210 according to LR 14208 and reference roll angle calculated by $\phi_{ref\,calc}$. 14107 and forward velocity of the plant model of the motorcycle 14201. In stage 2 (14200), several reference velocities are set, which are also used as initial velocities. The plant model of the motorcycle 14201, the PD controller for steering 14203, and the P controller for driving 14204 are embedded into the structure of Stage 2 (14200). The calculation for controllers 14203, 14204 is based on equations (7-1)-(7-2). The gain parameters for P controller for driving 14204 are fixed. In this stage, the gain parameters for the PD controller for steering 14203 are provided by a GA 14202. The LR 14208 is also provided by the GA 14202. The LR 14208, course data (lane change course which is shown in FIG. 30(*a*) is used here) 14212 and position and yaw of the plant model of motorcycle 14201 and optimized $\phi_{col}$ 14209 are used as inputs for $\phi_{ref\,calc}$ 14207. The calculation 14207 is based on equations (7-7)-(7-11). The value $\tau_{hold}$ 14210 is added to the output of the PD controller for steering 14203. By using the GA 14202, the optimization of the parameters is executed through the evaluation of the value of the Fitness Function 14205 for each reference velocity. The calculation of the Fitness Function 14205 is based on equations (7-13). Optimized parameters of the gain parameters for the PD controller for steering 14203 and LR 14208 are added to the KB 14001, and the KB 14002 is constructed.

The data of the KB 14002 are used in the Look-up table 14311 in Stage 3 (14300). The Look-up table 14311 brings optimized $\phi_{col}$ 14309 and $\tau_{hold}$ 14310 and the gain parameters for the PD controller for steering 14303 and LR 14308 according to reference roll angle calculated by $\phi_{ref\,calc}$ 14107 and forward velocity of the plant model of motorcycle 14301. The plant model of the motorcycle 14301, the PD controller for steering 14303, and the P controller for driving 14304 are embedded into the structure of Stage 3 (14300). The calculation for controllers 14303, 14304 is based on equations (7-1)-(7-2).

The gain parameters for the P controller for driving 14304 are fixed. In this stage, the gain parameters for the PD controller for steering 14303 are provided by the Look-up table 14311 as mentioned above. The LR 14308, arbitrary course data 14312, and the position and yaw of the plant model of the motorcycle 14301 and optimized $\phi_{col}$ 14309 are used as inputs for $\phi_{ref\,calc}$ 14307. The calculation 14307 is based on equation (7-7)-(7-11). The value $\tau_{hold}$ 14310 is added to the output of the PD controller for steering 14303.

$$\omega = v/R \quad (7\text{-}7)$$

$$a = v * \omega \quad (7\text{-}8)$$

$$R = (y^2 + LR^2)/2y \quad (7\text{-}9)$$

$$\phi_{ref0} = \tan^{-1}(a/g) = \tan^{-1}\left(\frac{2y*v^2}{g*(y^2 + LR^2)}\right) \quad (7\text{-}10)$$

$$\phi_{ref} = \phi_{ref0} - \phi_{cor} \quad (7\text{-}11)$$

$$FF = y_0^2 + (\phi - \phi_{ref})^2 \quad (7\text{-}12)$$

$$FF = y_0^2 + \tau_s^2 \times 0.007 \quad (7\text{-}13)$$

The optimized KB defines the optimal fuzzy control system to realize a robust rider model, which can drive the motorcycle (plant model) passing through an arbitrary course trace with arbitrary velocity without fall down, and within the desired control error tolerance and control quality.

Figure 15:
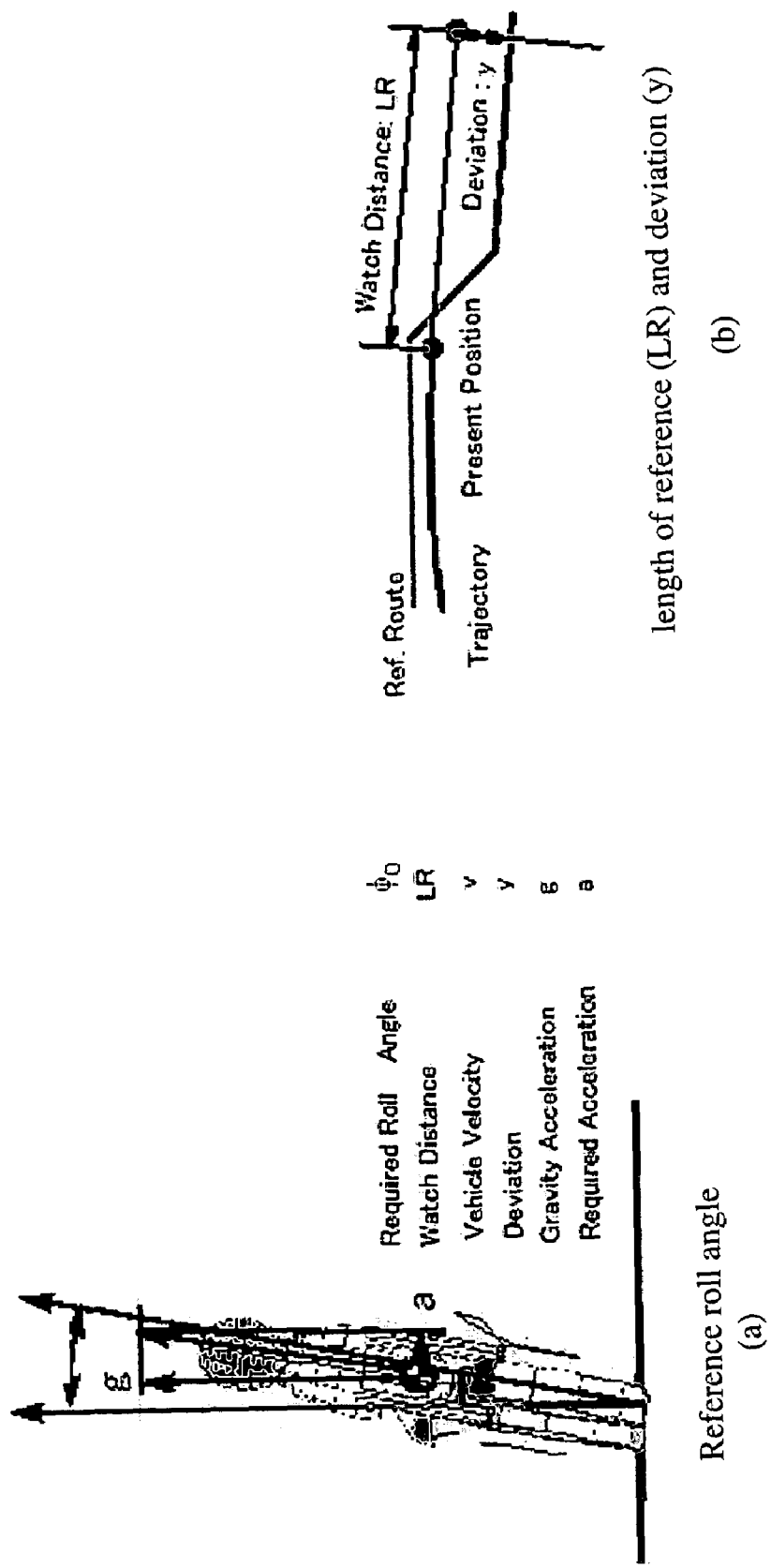
FIGS. 15A-B show geometrical parameters of a rider model and course, including reference roll angle (A), and length of reference and deviation (B).

In one embodiment, the rider model presented is a combination model of look-forward a model and an ideal roll control model. To calculate steering torque, using deviation at length of reference is from look-forward model and using roll rate is from ideal roll control model (see FIG. 15). The rider model uses a fuzzy controller that optimizes the gain parameters corresponding to the velocity and the roll angle. To optimize the gain parameters, the Soft Computing Optimizer based on GA (genetic algorithm) with different types of fitness function is used in a simulation to control the velocity and roll angle to reference value. The method using the Soft Computing Optimizer is divided into two parts. The first part is to gain the teaching signals by simulation, and the second part is to make the optimized fuzzy controller by using the teaching signals.

The equations for controller torque are:

$$\tau_d = -K_{p1}(v - v_{ref}) \quad (9\text{-}1)$$

$$\tau_s = -K_{p2}(\phi - \phi_{ref}) - K_{d2}\dot{\phi} \quad (9\text{-}2)$$

The equations for reference roll angle are:

$$t = LR/v \quad (9\text{-}3)$$

$$a = 2y/t^2 \quad (9\text{-}4)$$

$$\phi_{ref} = \tan^{-1}(a/g) = \tan^{-1}\left(\frac{2y*v^2}{g*LR^2}\right) \quad (9\text{-}5)$$

The equations for steer torque and body movement controller are:

$$\tau_s = K_{\phi s}\phi + K_{ys}y \quad (9\text{-}6)$$

$$\tau_1 = K_\tau \tau_s \quad (9\text{-}7)$$

$$\tau_2 = K_{\phi 2}\phi + K_{y2}y \quad (9\text{-}8)$$

The reference roll angle is given by course radius:

$$\tau_d = K_{p1}(v_{ref} - v) \quad (9\text{-}9)$$

$$\tau_s = K_P(\phi_{ref} - \phi) + K_I \int (\phi_{ref} - \phi)dt + K_D(\dot{\phi}_{ref} - \dot{\phi}) \quad (9\text{-}10)$$

Figure 16:
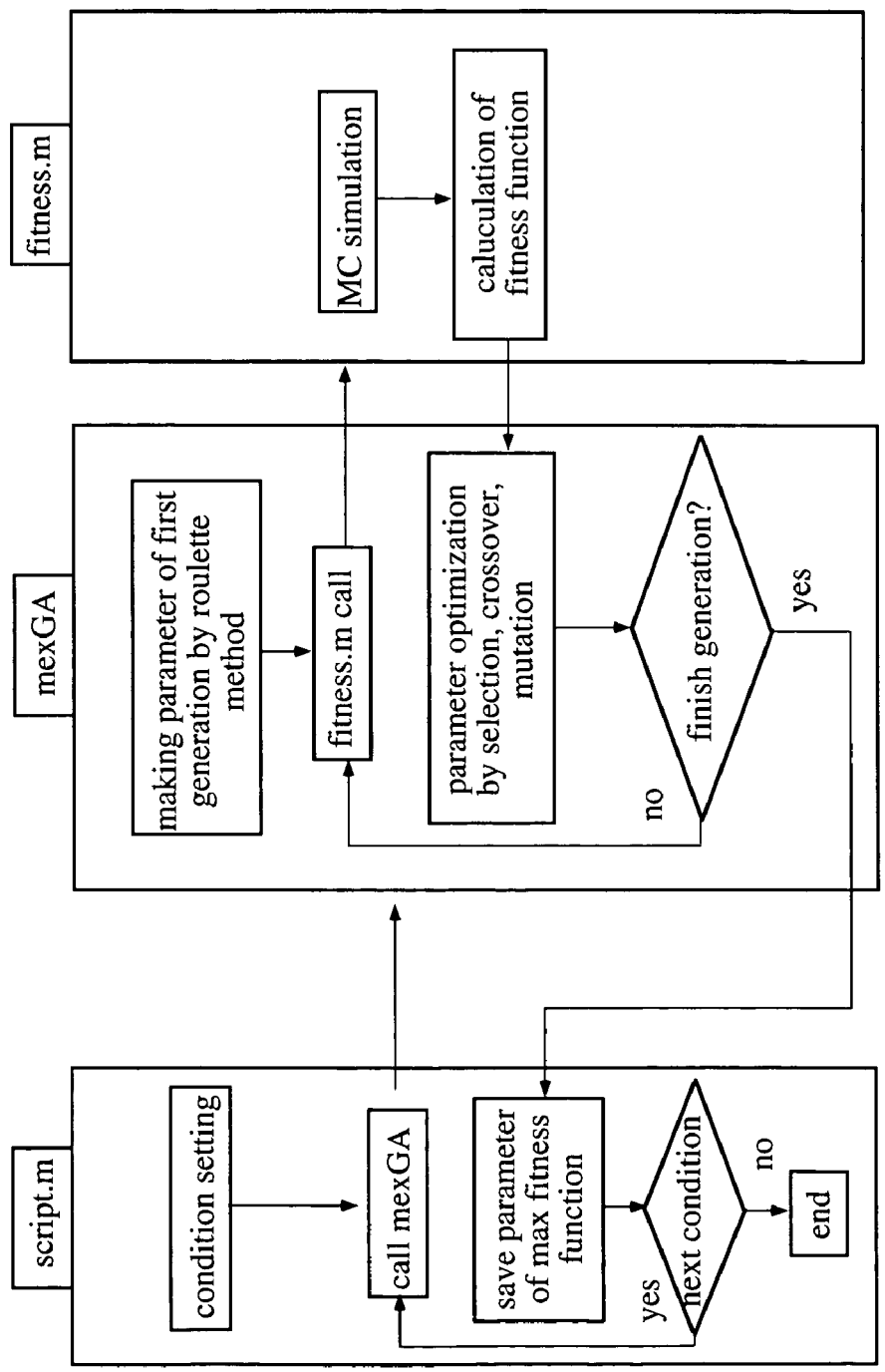
FIG. 16 shows the structure of a simulation to gain the teaching signals used by the SC optimizer.

To obtain the teaching signal, the Soft Computing Optimizer uses a program mexGA, a MATLAB program script.m a MATLAB program fitness.m and the MC model. The structure is shown in FIG. 16. In script.m the initial conditions and reference values are set. In fitness.m the fitness function is defined as:

M-file: file in MATLAB language
Reference velocity=5 7 10 15 m/s
Reference roll angle=0° 10° 30°
Optimized gain Kp1, Kp2, Kd2
Fitness function $$FF = (v - v_{ref})^2 \times 0.2 + (\phi - \phi_{ref})^2 + \dot{\phi}^2 + \tau_d^2 \times 0.0001 + \tau_s^2 = 0.0005 \quad (7\text{-}6)$$

GA parameter
Population=100
Generation=5
Mutation_rate=0.6
Crossover_rate=0.9
Delete_rate=0.8
Fitness_reduce=0.05

Figure 17:
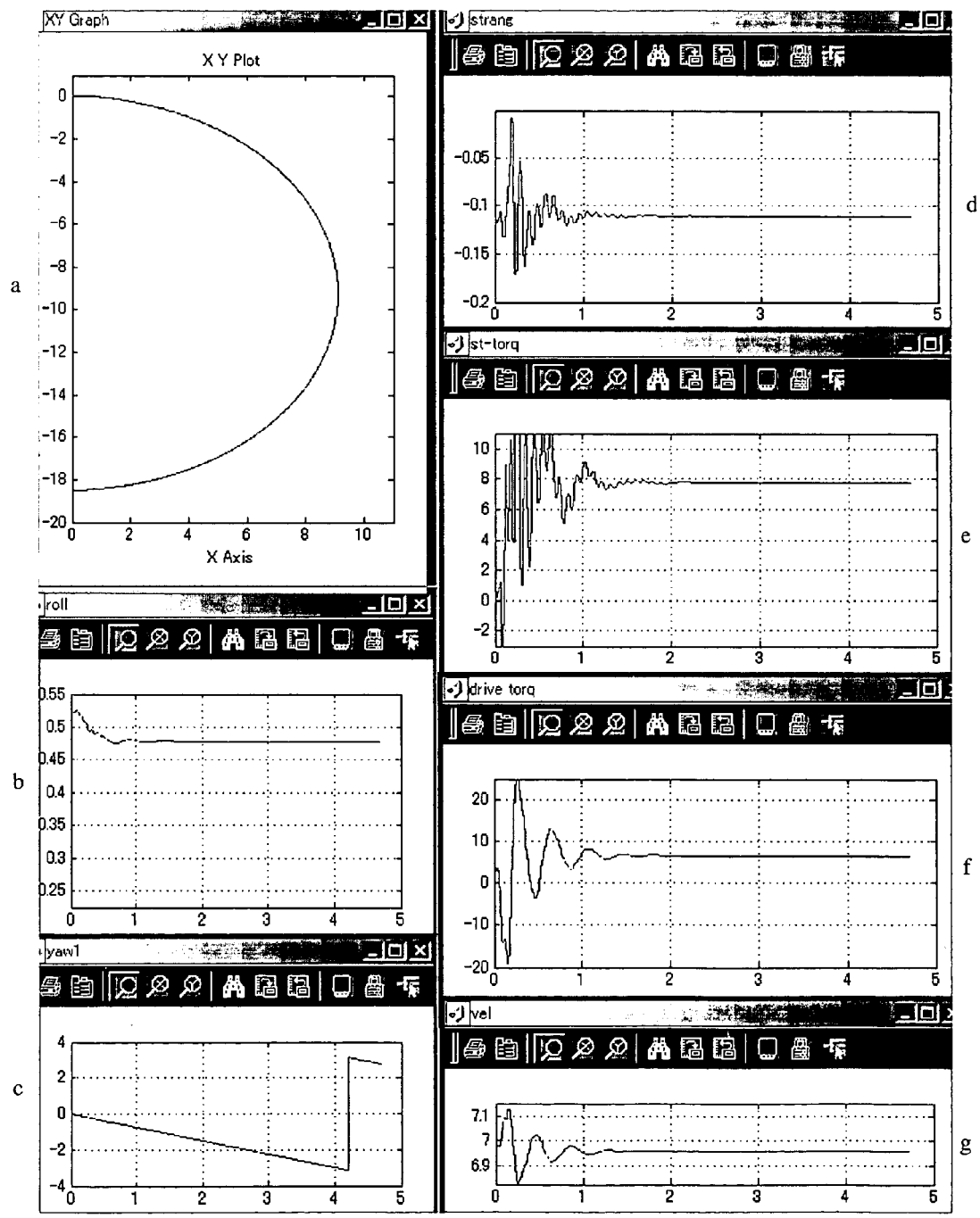
FIGS. 17A-G show examples of the data during fitness function evaluation simulation.
Figure 18:
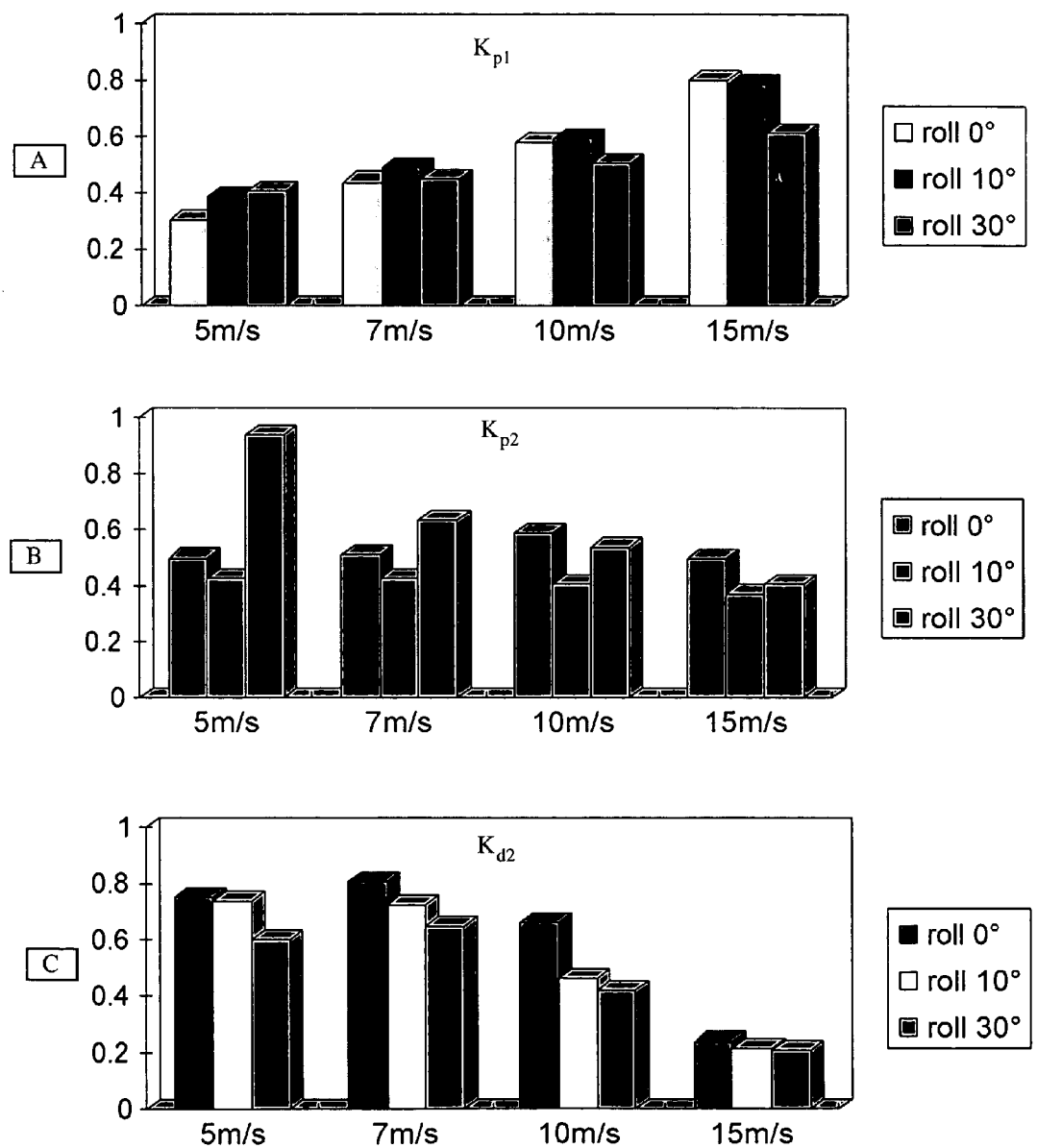
FIGS. 18A-C show example results of the optimized parameters for different initial conditions, including Kp1 (A), Kp2 (B), and Kd2 (C).

FIG. 17 shows examples of teaching signals obtained from the simulation. FIG. 18 shows results of optimized parameters for different initial conditions. Several features of the teaching signals produced by simulation are noted as follows. Kp1 is relatively large when the velocity is fast, regardless of roll angle. Kp2 change relatively little except when velocity is slow and roll angle is large. When the reference roll angle is 30 deg. and the reference velocity is 5 m/s, the resulting roll angle converges at less than 27 deg., regardless of gain parameters. This appears to be the basis for the preceding exception. Torque of the front tire around the steering axis is largely the reason for this phenomenon. Kd2 is relatively large when the velocity is slow, regardless of roll angle.

Figure 19:
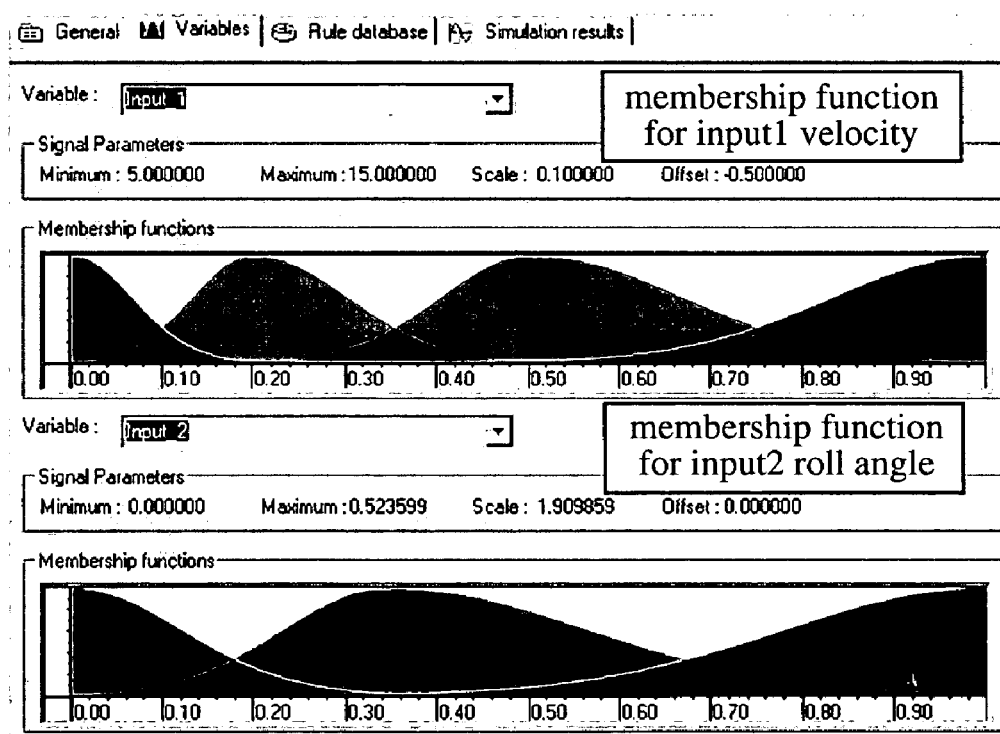
FIG. 19 shows membership functions for the fuzzy controller.

As a next step, the SC optimizer computes the optimum structure of the KB for the fuzzy controller. The input for the SC optimizer is the teaching signal. The membership functions for the KB are set to make the input data of fuzzy operation from the input data of the fuzzy controller, such as velocity and roll angle. The SC optimizer determines functions and makes fuzzy rules and optimizes them by the teaching signals using GA. FIGS. 19 and 20 shows the results of membership function design and FC output, correspondingly.

Figure 21:
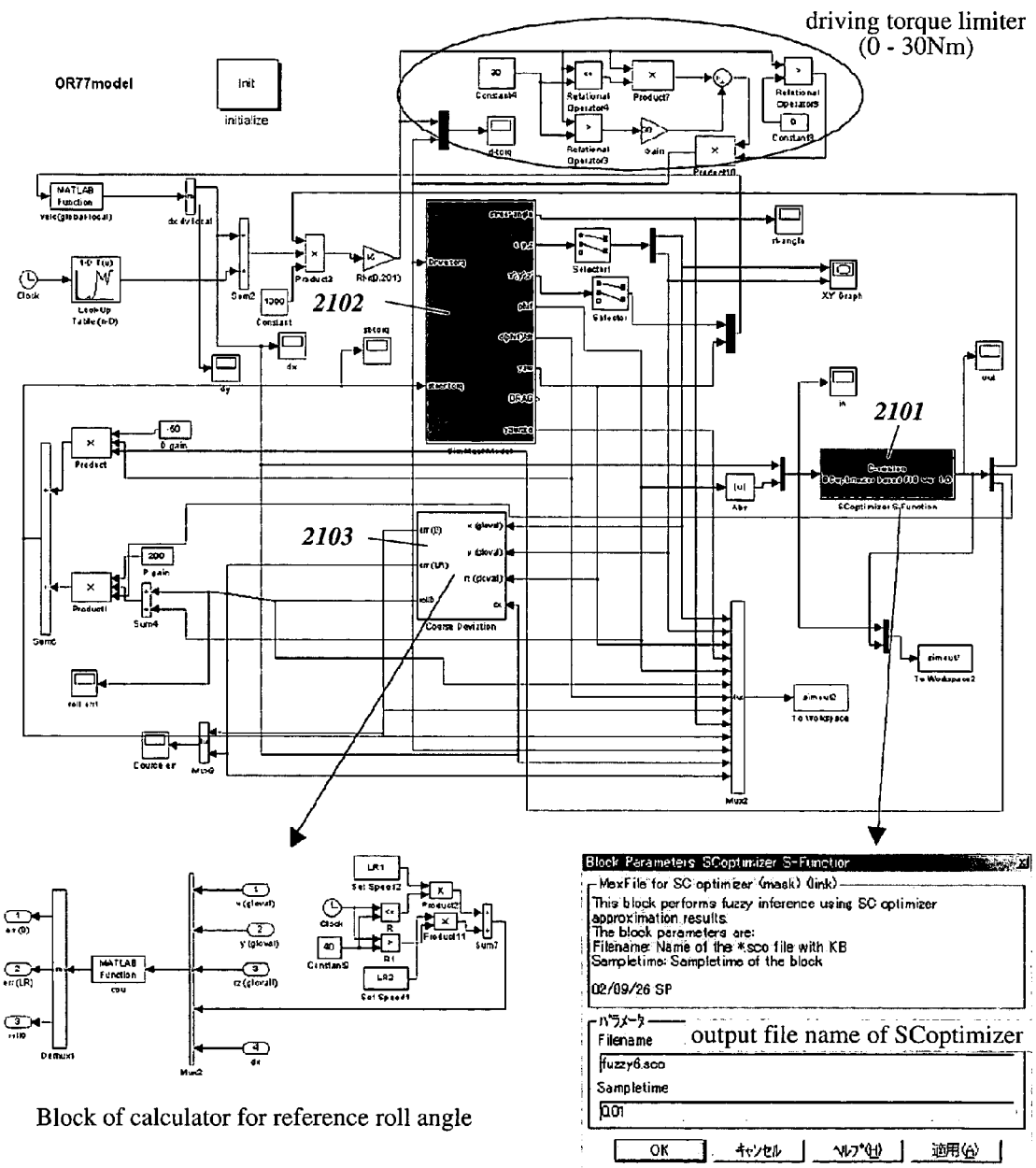
FIG. 21 shows a simulation model for the fuzzy controller.

In FIG. 21 is a block diagram of the simulation model including a fuzzy controller block 2101 The block 2102 serves as the external performance function of the SC optimizer, which provides gain parameters for the simulation using the fuzzy rules. A reference roll angle calculator 2103 block calculates the reference roll angle from assigned course data and LR (length of reference) and input data (position, velocity and yaw).

Figure 22:
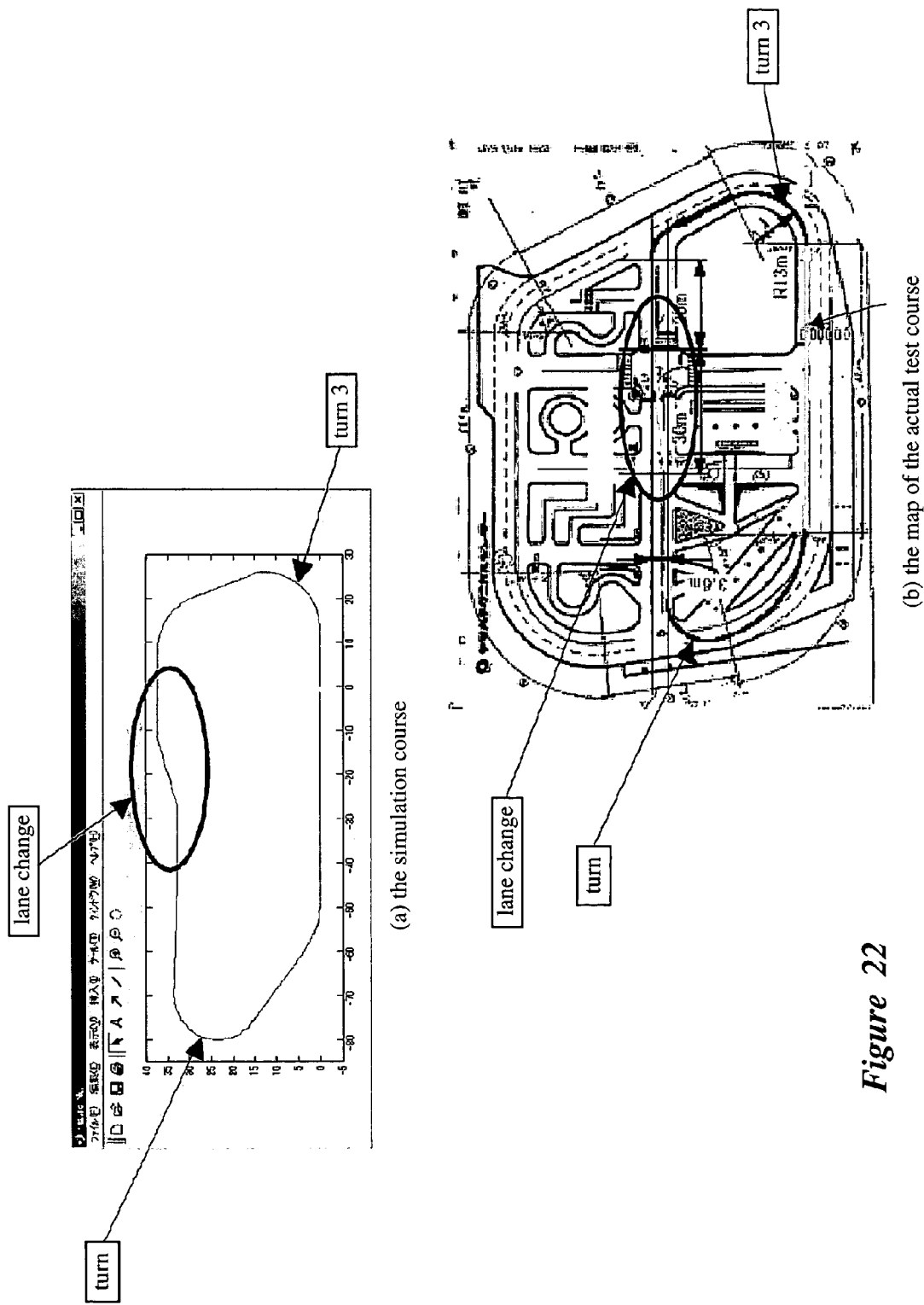
FIGS. 22A-B show the map of the actual test course and simulated course.

The test course assigned here and the simulation are shown in FIG. 22. The course is driven in a counterclockwise direction. The course starts in a straight line and goes into a J-turn of 13 meter radius. After a short straight and turn, it goes to lane change and J-turn of 10 meter radius. The course then goes through a large radius turn and back the starting straight. In this simulation, the motorcycle run along this course two times, and as the reference velocity the experiment data (FIG. 23A) was used. In the first turn the reference velocity is approximately 5 m/s and in the second turn the reference velocity is approximately 7 m/s. LR is 6 meters for the first turn and is 7.5 meters for the second turn.

FIGS. 23B-E show the resulting data of simulation and corresponding measured data. At the 10 meter J-turn R10 in the second circle (in time scale 70 sec), the simulation data vibrates strongly compared to experiment data. The reason lies in the torque of the front tire around the steering axis.

Figure 23:
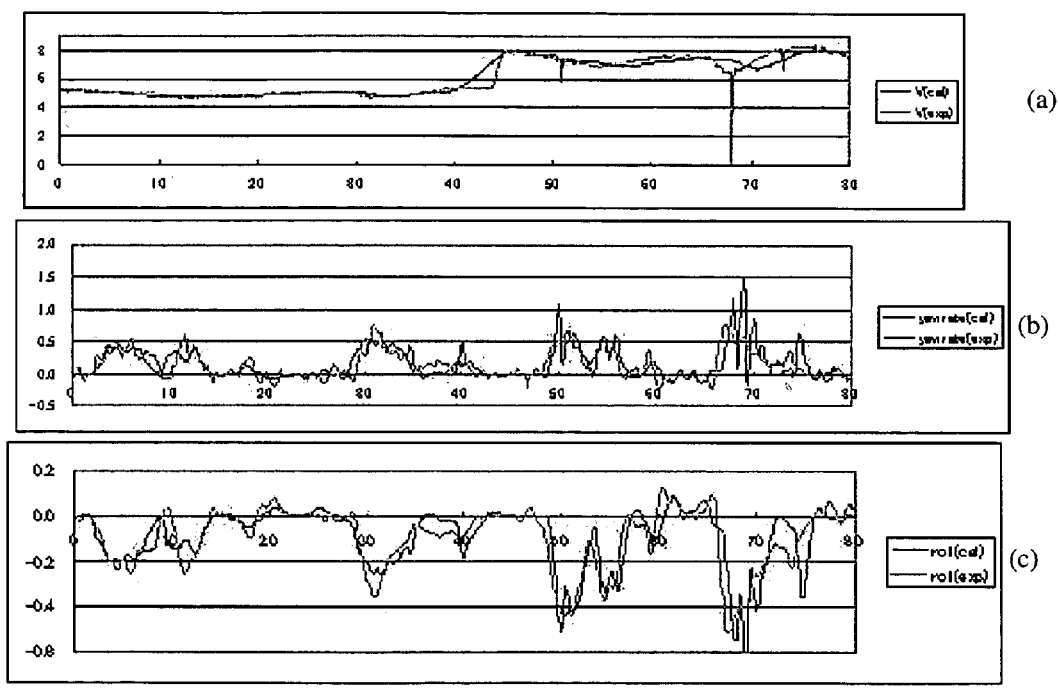
FIGS. 23A-F show the results of the simulation with the fuzzy controller (without excitation).
Figure 23:
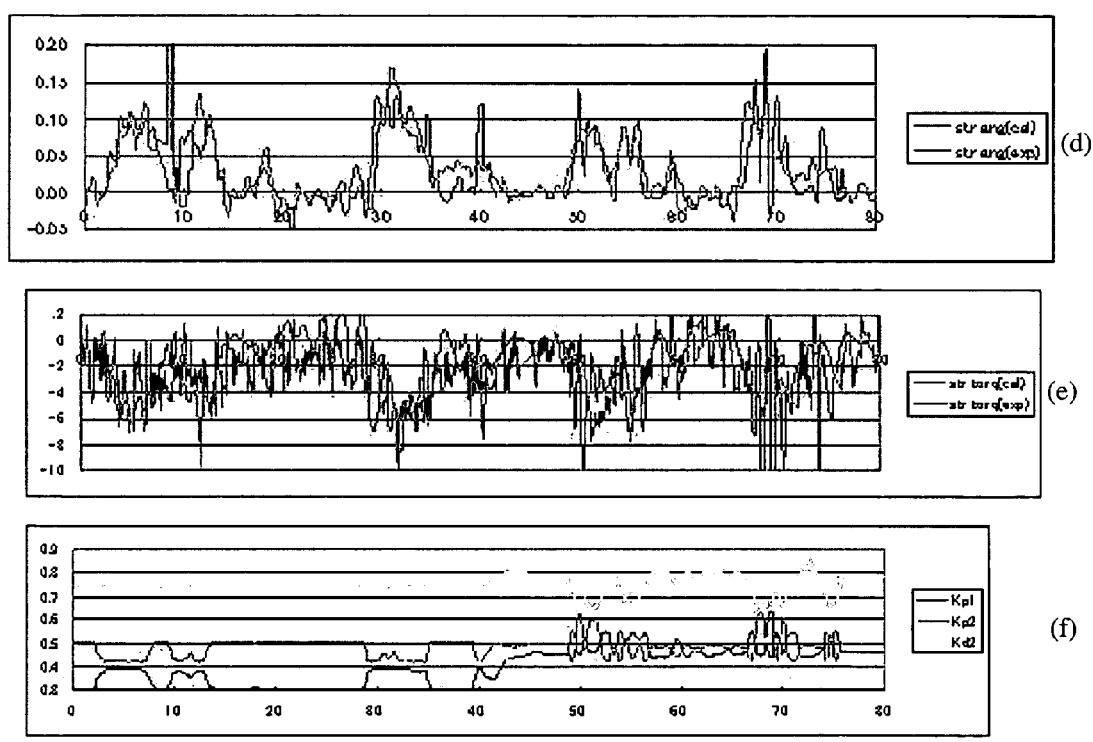
Figure 24:
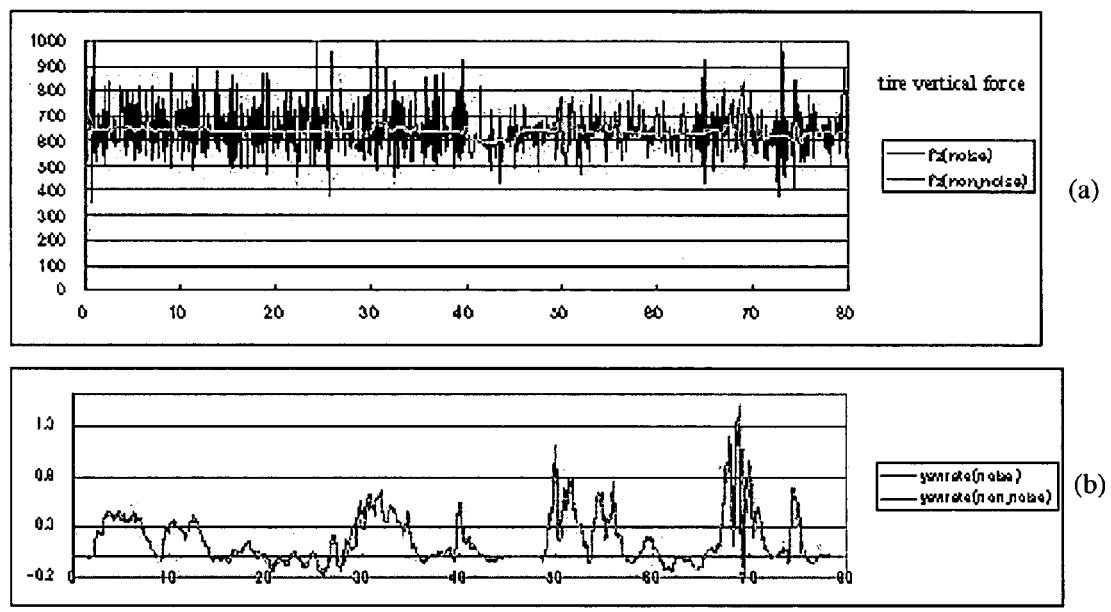
FIGS. 24A-E show the results of the simulation with fuzzy controller (with excitation).
Figure 24:
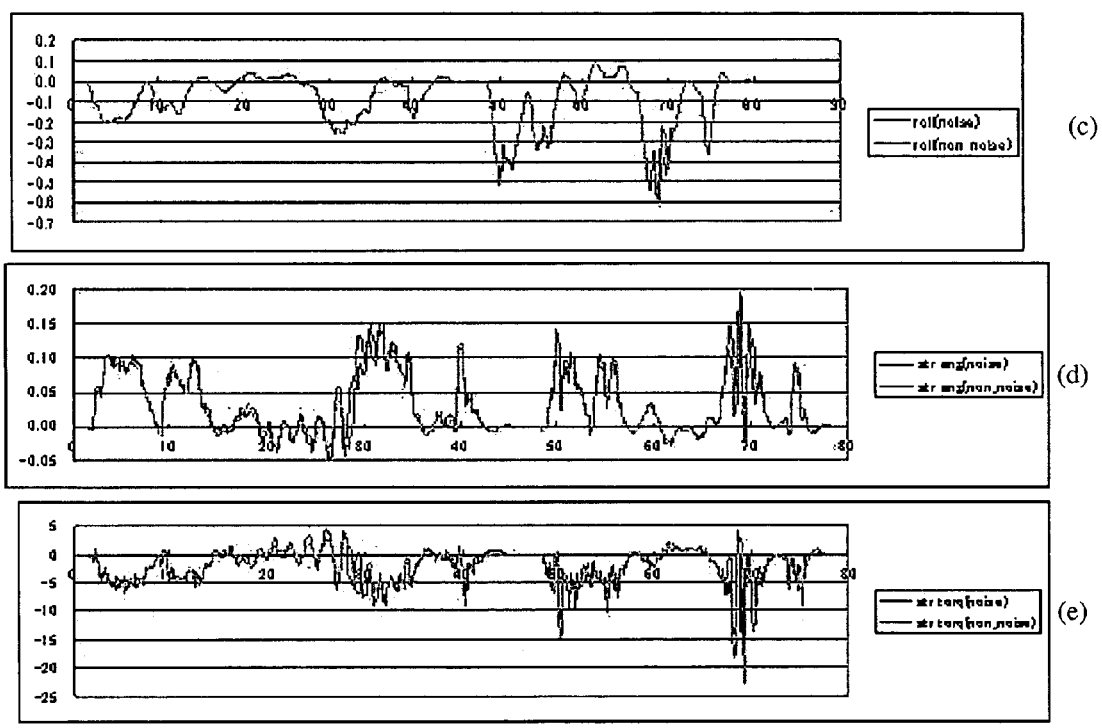
Figure 25:
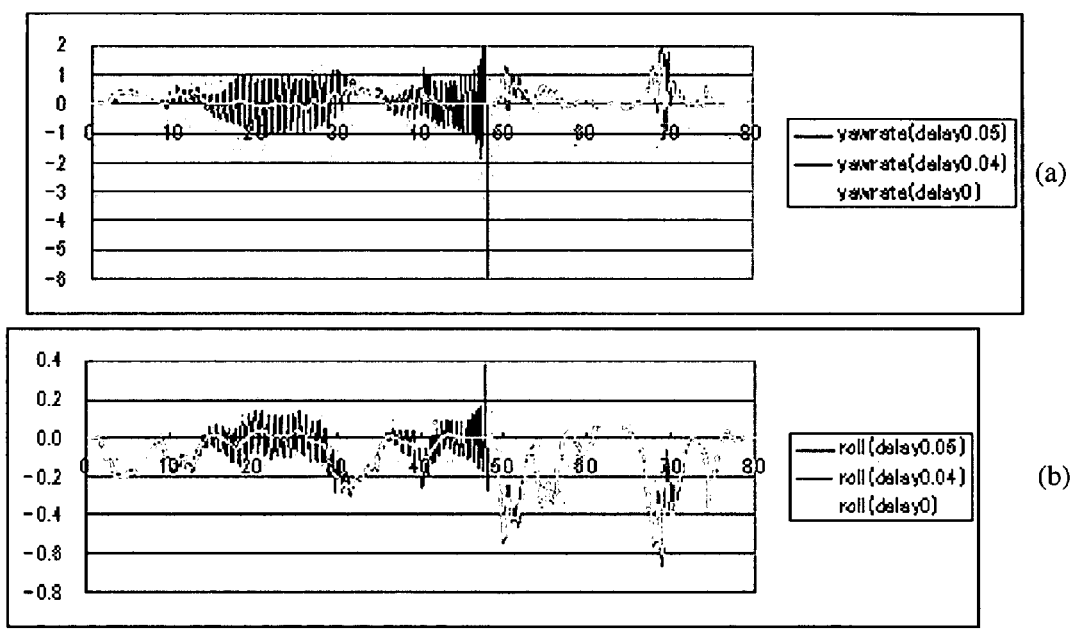
FIGS. 25A-D show simulation results with different transport delay.
Figure 25:
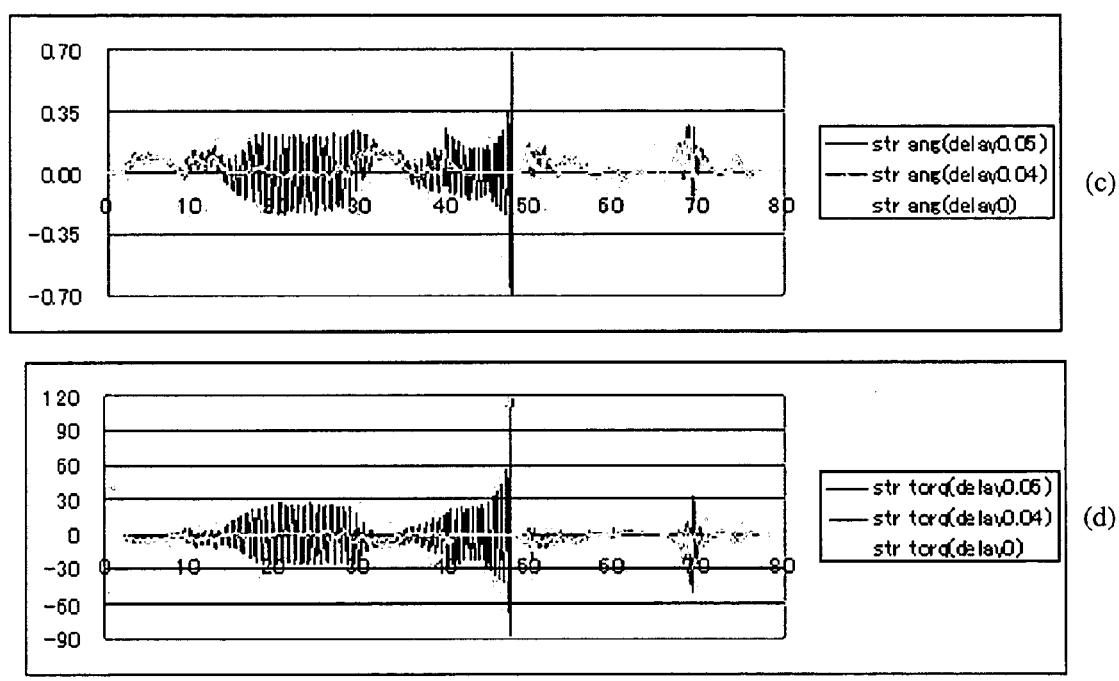

When it is about to go into a regular circle, the calculated control torque approaches 0. If the torque of the front tire around the steering axis is 0, the regular circle revolution would be kept. But the torque is not 0, so the vibration is provoked. FIG. 23F shows the change of gain parameters by the fuzzy controller.

To evaluate the robustness of the controller, a simulation with disturbance in tire load was carried out as shown in FIGS. 24A-E. The effect is relatively small as the frequency of the weave mode, which is the dominant mode of MC at researched velocity range, is about 0.5 Hz. So the high frequency noise effect is small. If the velocity range was different and the high frequency modes were dominant, the influence of the tire noise would be more important.

The other tests for the robustness was simulations assuming the transport delay of the actuator. As shown in FIGS. 25A-D, until 0.04 sec of delay is introduced, the result did not change much. However, when assuming a 0.05 sec delay, the vibration of the MC diverged and the simulation became unstable.

In optimization of control of a motorcycle, stabilizing roll angle goes together with steering the desired course (see FIG. 26A). It is thus useful to first explore control methods that can stabilize the motorcycle when driven in a circle. The reason is that roll angle will be almost constant in a circular path for constant velocity and any course desired can be resolved into combinations of short circular arcs. If the control method can stabilize the motorcycle through a circular arc of any desired radius, then the MC can be stably steered through any course constructed from arcs having radii within the design range.

Accordingly, a circular course was used for the simulation and the circular course was run while computing a reference roll angle, and optimization of the parameter by the SC optimizer was used during the simulation (see FIG. 26B). As described by equation 9-4, it is necessary to provide a holding torque to counter the torque of the front tire around the steering axis to hold the reference roll angle. So, a feedforward rider model can be used. The method of computing the reference roll angle in equations (9-3)-(9-5) assumes the course deviation to be small. Ignoring the change of yaw, the constant lateral acceleration cancels the predicted course deviation. So when the course deviation is large, computing reference roll angle by this method has a large error. The present method for computing reference roll angle (equations (9-14)-(9-17) assumes the arc course. So this method fits the circle course rather better. However, there is still some difference between computed reference roll angle and actual converged roll angle. The correction value introduced in equation (9-18) and optimized in simulation of circle course reduces the error. The correction compensates for the overturning moment of the tire and wheel base length. The optimization of parameter (the holding torque and the correction value of reference roll angle) by simulation of circle course, the controllability for transient response can not be optimized enough. The lane change simulation was added for optimization of length of reference (LR) and the PD gains (Kp2, Kd2).

In this method velocity control gain was fixed. The equations for controller torque are:

$$\tau_d = -K_{p1}(v - v_{ref}) \quad (9\text{-}12)$$

$$\tau_s = -K_{p2}(\phi - \phi_{ref}) - K_{d2}\dot{\phi} + \tau_{offset} \quad (9\text{-}13)$$

The equations for reference roll angle are:

$$\omega = v/R \quad (9\text{-}14)$$

$$a = v * \omega \quad (9\text{-}15)$$

from FIG. 26(a)

$$R = (y^2 + LR^2)/2y \quad (9\text{-}16)$$

$$\phi_{ref0} = \tan^{-1}(a/g) = \tan^{-1}\left(\frac{2y * v^2}{g * (y^2 + LR^2)}\right) \quad (9\text{-}17)$$

$$\phi_{ref} = \phi_{ref0} - \phi_{cor} \quad (9\text{-}18)$$

Figure 27:
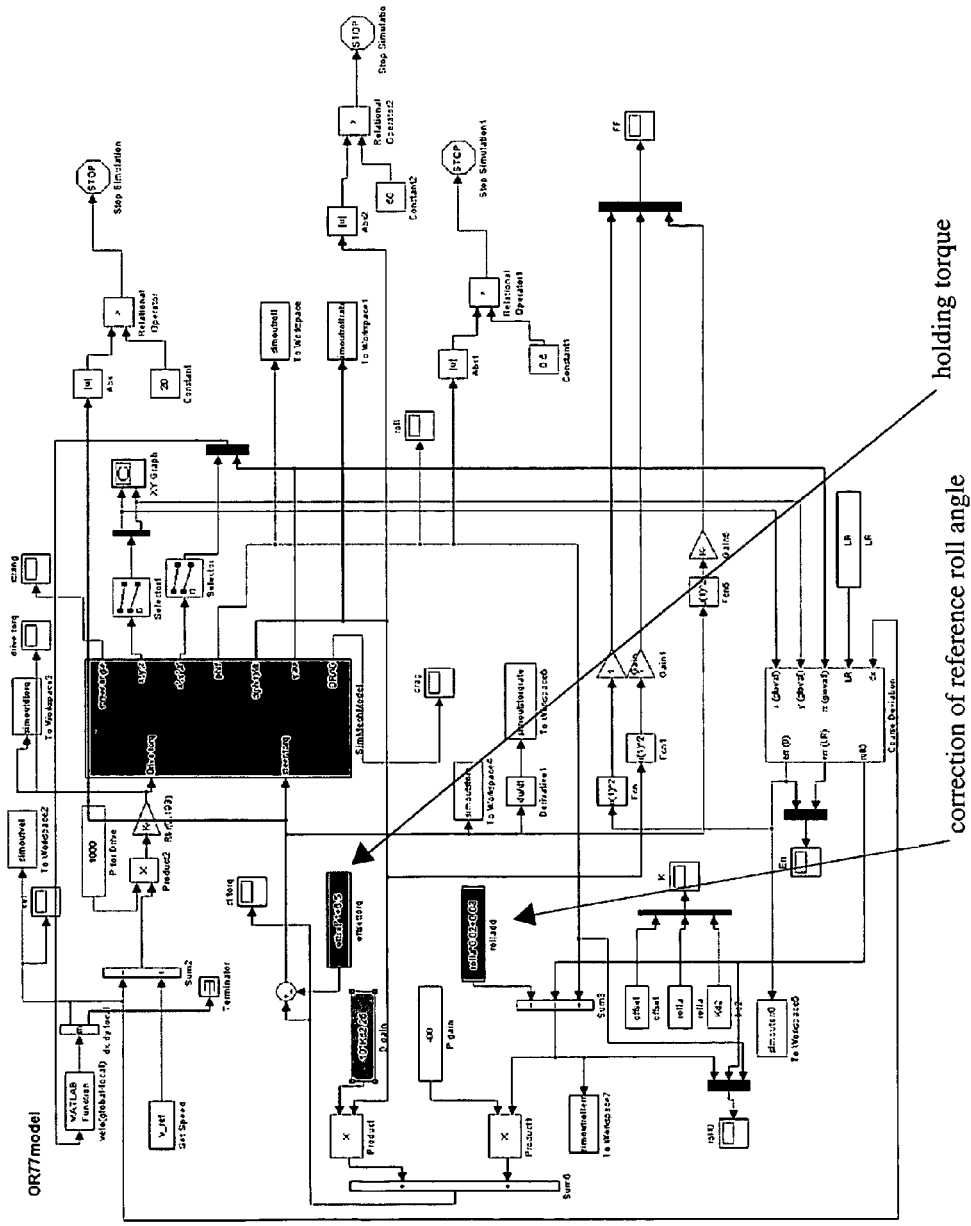
FIG. 27 shows a model for circular course simulation.

FIG. 27 shows the model for circular course simulation.

To construct the feedforward rider model, simulation of the circular course controlled by SC optimizer was done under several conditions. The holding torque and the correction value of the reference roll angle were optimized and the converged roll angle were obtained in each condition. Gain parameters Kp1 and Kp2 were fixed (Kp1=1000, Kp2=80). The gain parameter Kd2 was added to the optimization.

Figure 29B:
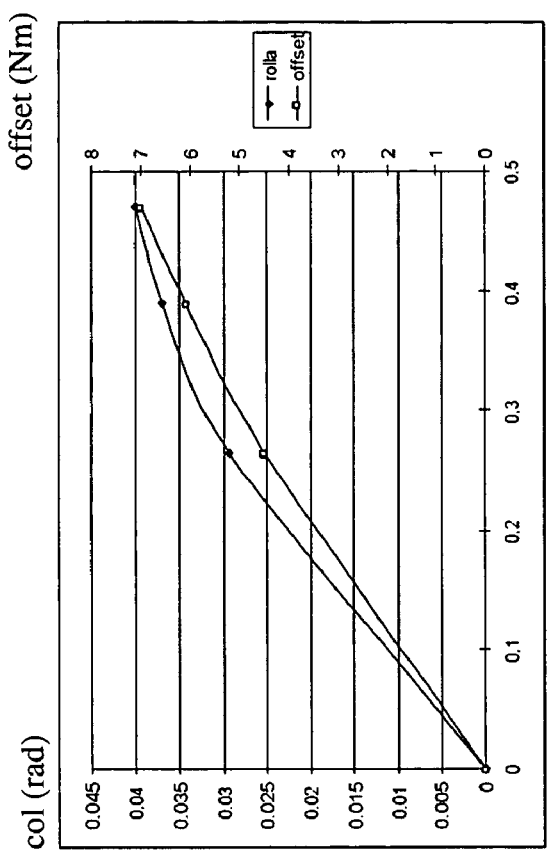
FIG. 29A-B shows the relation between computed reference roll angle and the optimized parameter.
Figure 29A:
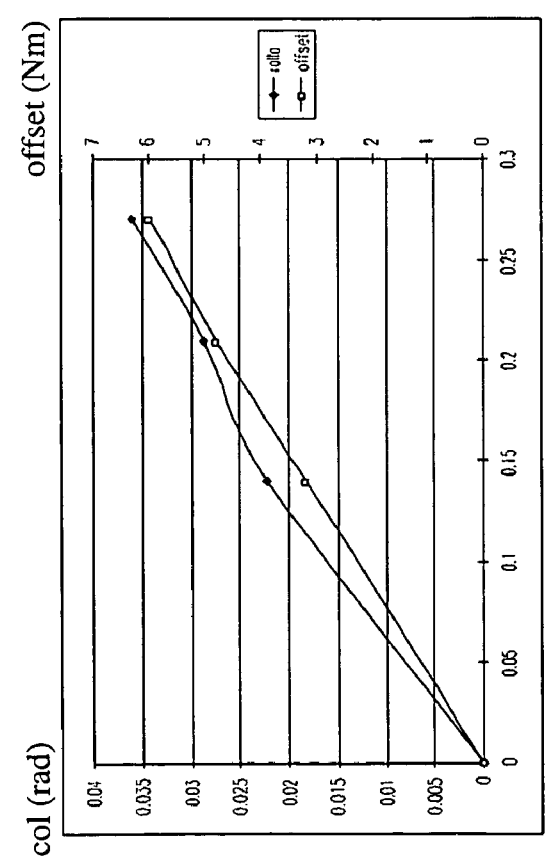

The results of the simulation are shown in FIG. 28. The holding torque and the correction value of the reference roll angle and the converged roll angle become larger as the radius of the course becomes smaller. LR affects the correction value of reference roll angle. The holding torque and the correction value of reference roll angle are nearly in proportion to the computed reference roll angle (FIG. 29A-B).

It is difficult to optimize the controllability of transient response by circle course. The lane change simulation (see FIG. 30) can be used for parameters to be optimized in transient conditions. The result of the optimization in circle course simulation was used in lane change simulation.

ref. velocity, / optimized parameter Kp2 Kd2 fitness function $$FF = y_o^2 + \tau_s^2 \times 0.007 \quad (9\text{-}19)$$

Holding torque was computed by interpolation of input data as a function of the computed reference roll angle. (assuming velocity as constant) Correction of reference roll angle was computed by interpolation of input matrix data as function of LR and computed reference roll angle. (assuming velocity as constant).

Figure 31:
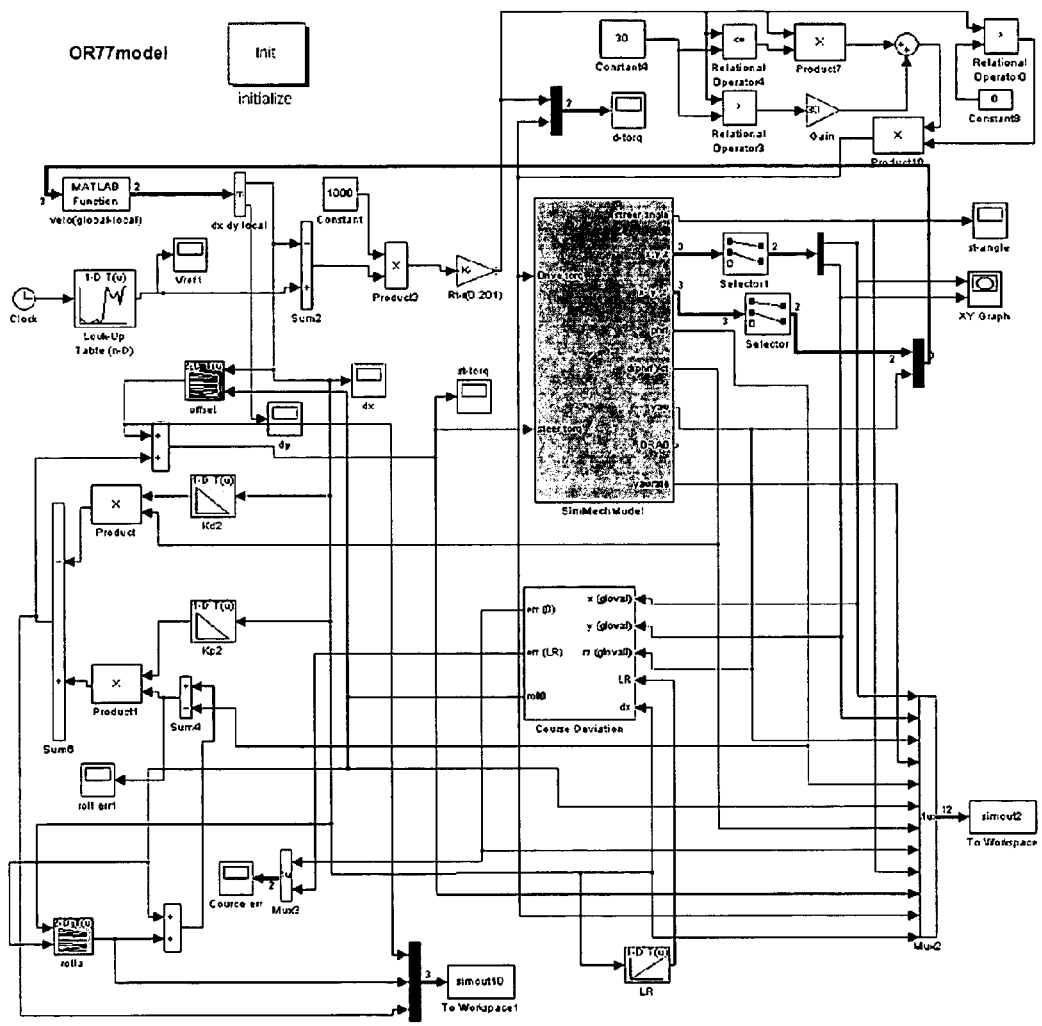
FIG. 31 shows the feedforward model.
Figure 32:
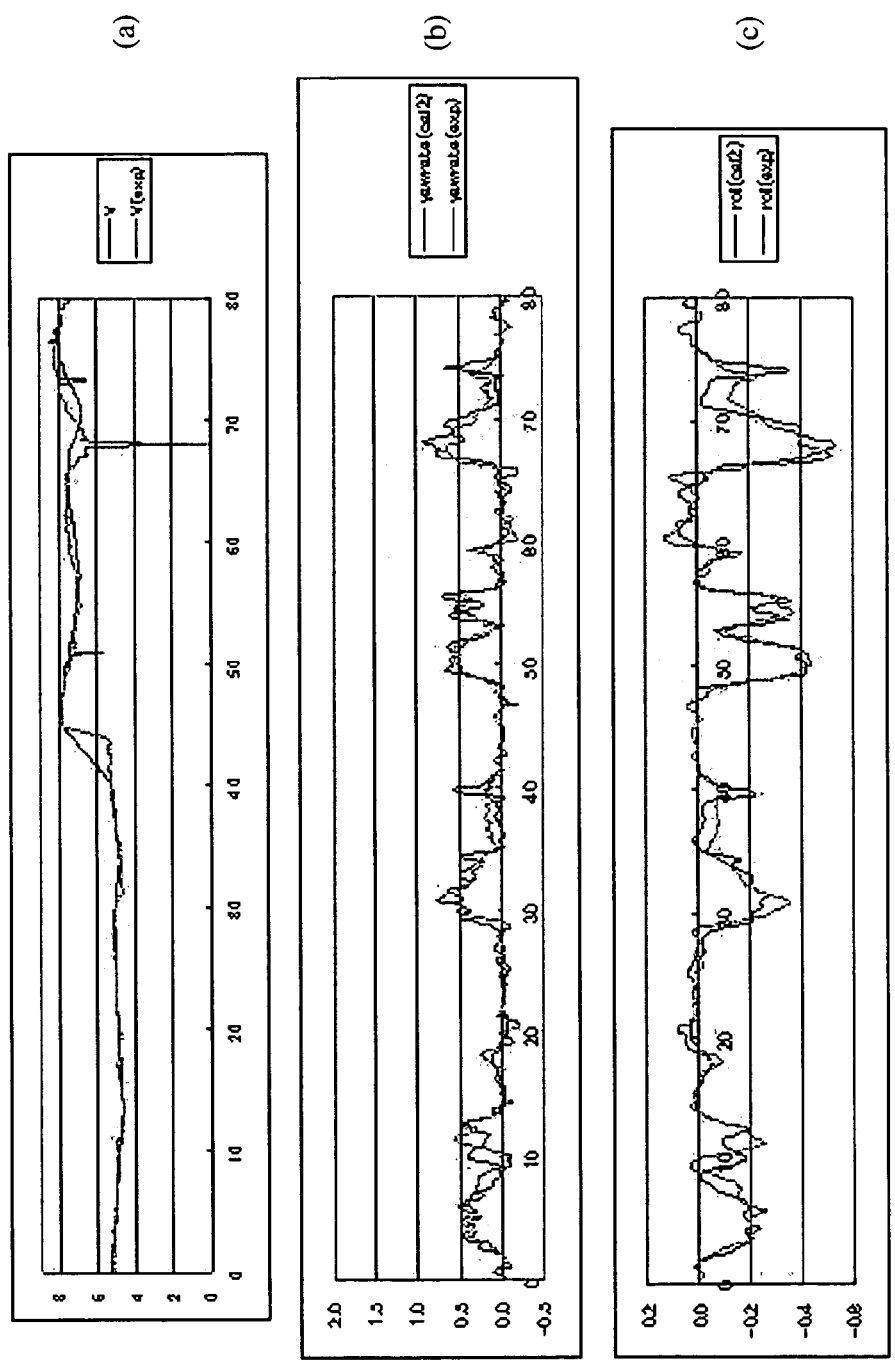
FIG. 32A-E show results of the simulation with a hold torque feedforward controller.
Figure 33:
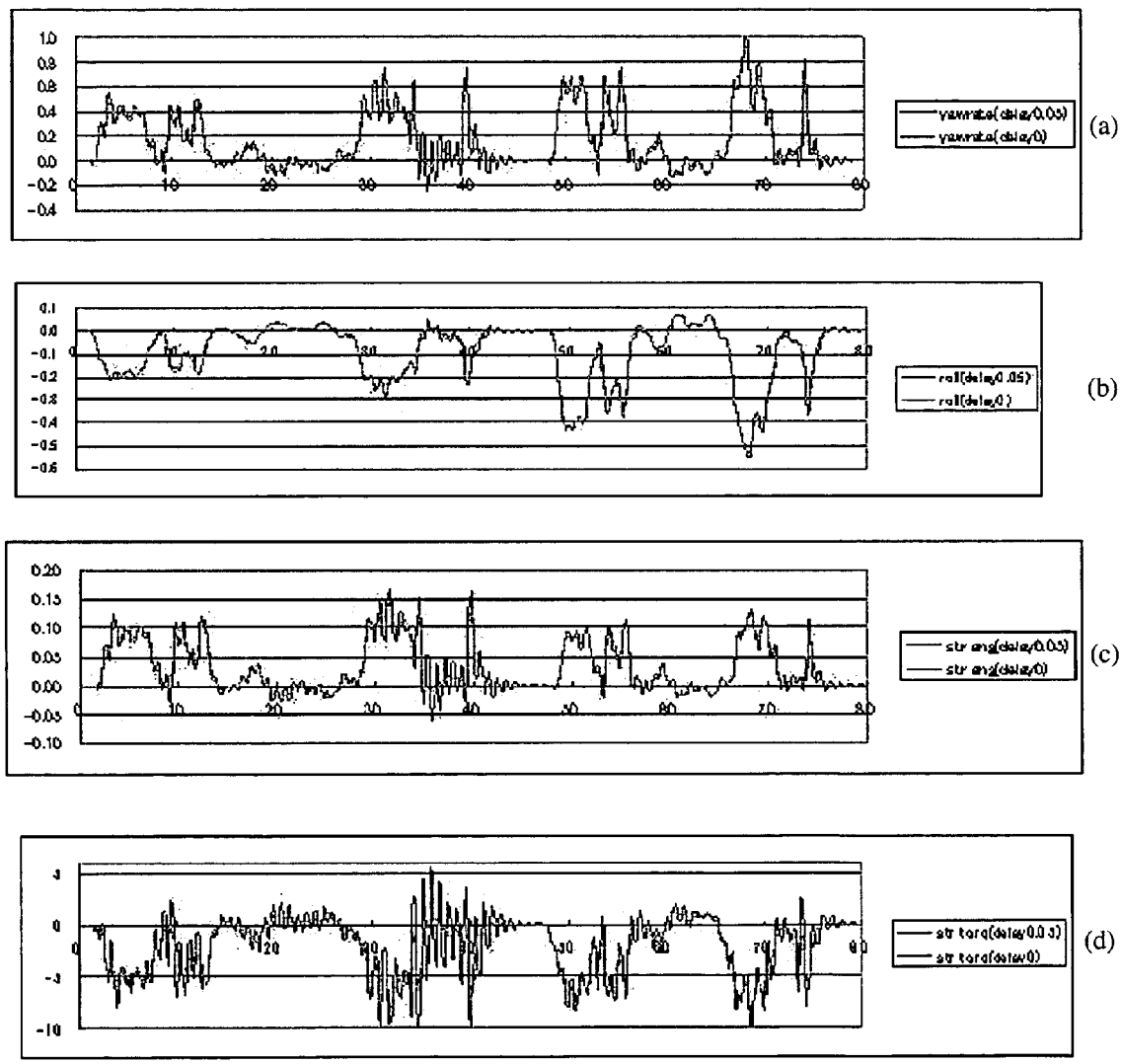
FIG. 33A-D show results of the simulation with transport delay.

The feedforward rider model (see FIG. 31) was made as the table data (Table 2) which are optimized by simulations of the circle course and the lane change course controlled by the SC optimizer. The resulting data of simulation in the test course fit well to experiment data (FIGS. 32A-E). At the 10 meter J-turn in the second circuit (in time scale 70 sec), the simulation data does not vibrate.

The tests for the robustness in the simulation are provided by assuming the transport delay of the steering actuator. As shown in FIGS. 33A-D, until 0.05 sec of delay is introduced, the control result does not change substantially. Introducing a 0.07 sec delay causes vibration of the MC and instability in the simulation.

Figure 34:
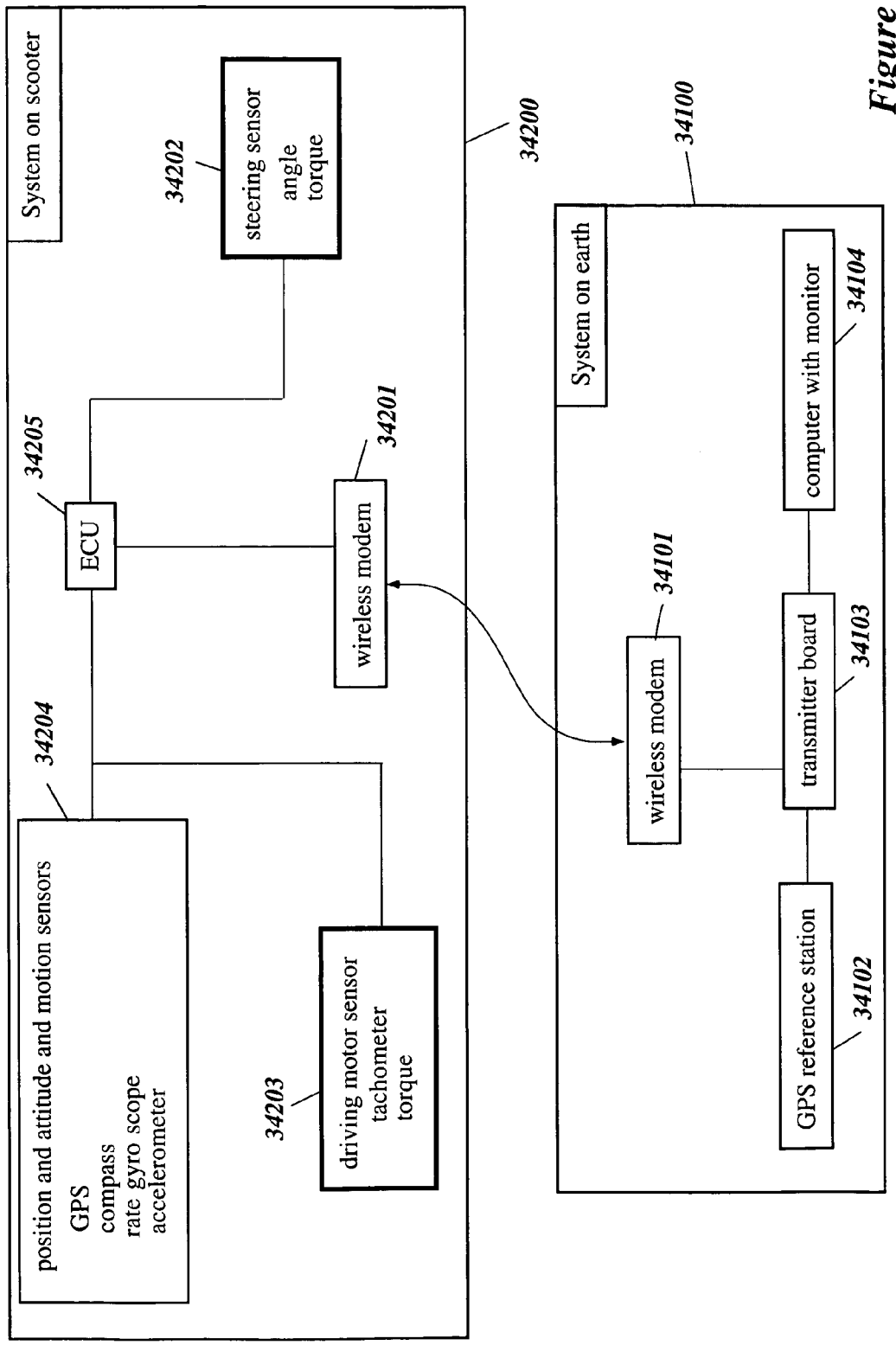
FIG. 34 shows the structure of the measurement system.
Figure 35:
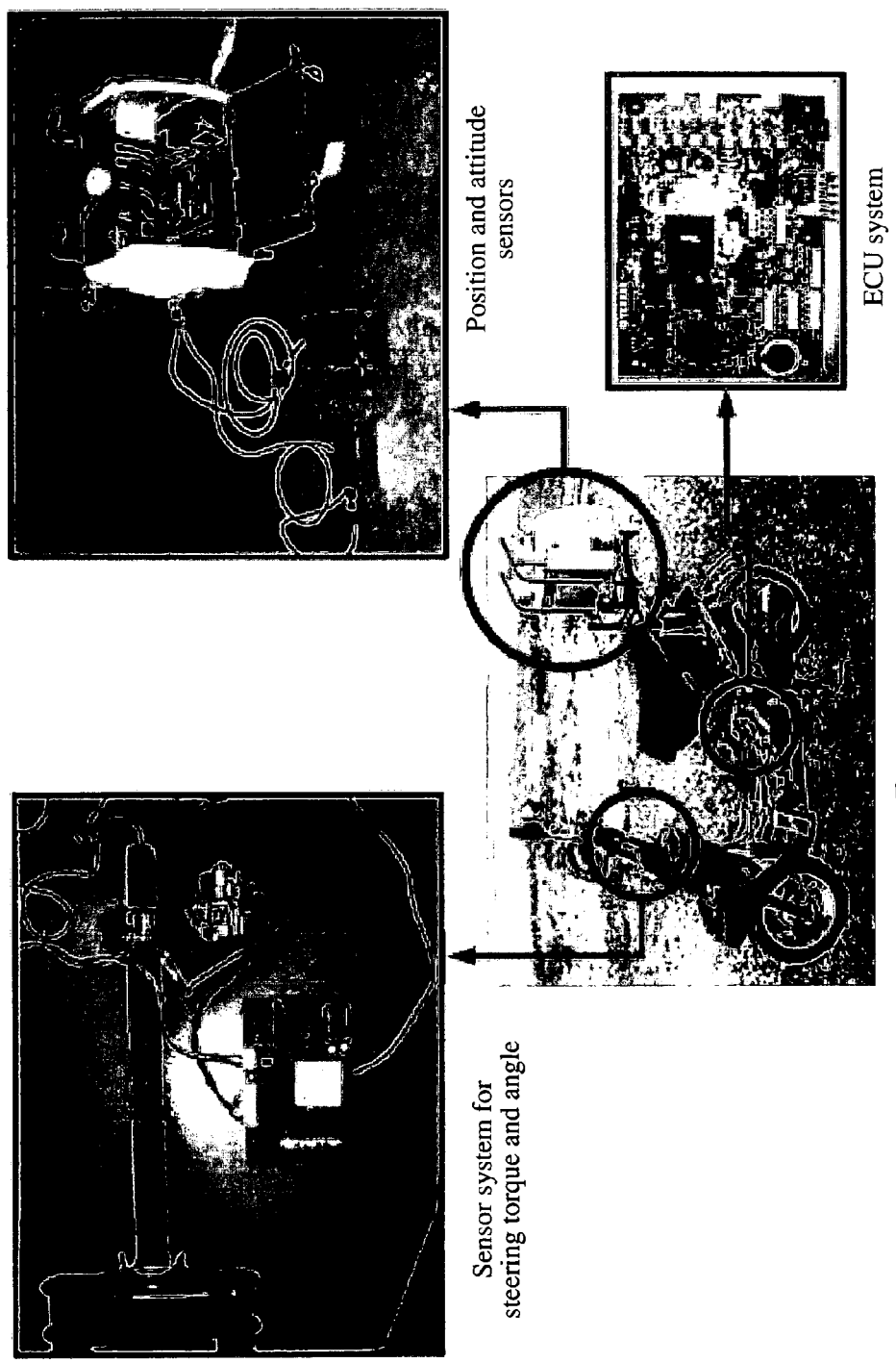
FIG. 35 shows a test scooter with telemetry system.

FIG. 34 shows the sensor and measurement apparatus. The measuring system has two portions. The first portion 34200 is integrated into the test scooter as shown in FIG. 35. The second portion 34100 is the measurement base which includes a wireless modem 34101, GPS reference station 34102, transmitter board 34103, and computer with monitor 34104. The measured data (position and attitude of the scooter, steering angle, steering torque) can be seen on the monitor as shown in FIG. 36. The first portion 34200 integrated in the test scooter includes a wireless modem 34201, steering sensor system 34202, which is installed in the steering part of the scooter as shown in FIG. 35, driving motor sensor 34203, position and attitude sensors 34204 attached to the scooter as shown in FIG. 35, and ECU unit 34205. The block 34202 and 34203 are the additional part to the original system in order to specialize the original system for the scooter measurement.

The invention claimed is:

1. A method for optimizing a knowledge base in a soft computing controller for maneuvering a motorcycle, comprising:

selecting a fuzzy model by selecting one or more parameters, said one or more parameters comprising at least one of a number of input variables, a number of output variables, a type of fuzzy inference model, and a teaching signal;

optimizing linguistic variable parameters of a knowledge base according to said one or more parameters to produce optimized linguistic variables according to a teaching signal obtained from a dynamic simulation model of a motorcycle and rider;

ranking rules in said rule base according to firing strength; and eliminating rules with relatively weak firing strength leaving selected rules from said rules in said rule base;

optimizing said selected rules, using said fuzzy model, said linguistic variable parameters and said optimized linguistic variables, to produce optimized selected rules.

2. The method of claim 1, further comprising optimizing said selected rules using a derivative-based optimization procedure.

3. The method of claim 1, further comprising optimizing parameters of membership functions of said optimized selected rules to reduce approximation errors.

* * * * *

UNITED STATES PATENT AND TRADEMARK OFFICE
CERTIFICATE OF CORRECTION

PATENT NO. : 7,251,638 B2
APPLICATION NO. : 10/792292
DATED : July 31, 2007
INVENTOR(S) : Fujii et al.

It is certified that error appears in the above-identified patent and that said Letters Patent is hereby corrected as shown below:

On page 2, column 2 (Other Publications), at line 62 after "Intelligent" and insert --Industrial--.

In column 8, at approximately line 11, change "$\phi$" to -- $\dot{\phi}$ --.

In column 10, at approximately line 3, change "$+Cx_{12}$" to --$+Cz_{12}$--.

In column 10, at approximately line 13, change "$\frac{\sigma}{V}F_{Yci}$" to -- $\frac{\sigma}{V}F'_{Yci}$ --.

In column 10, at approximately line 16, change "$\frac{\sigma}{V}T_{Zci}$" to -- $\frac{\sigma}{V}T'_{Zci}$ --.

In column 10, at approximately line 18, change "$\frac{\sigma}{V}T_{Xci}$" to -- $\frac{\sigma}{V}T'_{Xci}$ --.

In column 10, at approximately line 33, change "$T_t$" to --$T_x$--.

In column 13, at line 66, change "$j_i=1$," to --$\mathbf{n}, j_i=1$,--.

In column 14, at approximately line 56, before "are" change "$lx_k$," to --$lx_k$--.

In column 15-16 (Table 3), at approximately line 9, change "product" to --sum--.

In column 23, at line 50, change "$\phi^2+\tau_d^2 0.0001$" to --$\phi^2 + \tau_d^2 \times 0.0001$--.

In column 26, at line 10, change "$+\tau_s^2=0.0005$" to --$+ \tau_s^2 \times 0.0005$--.

UNITED STATES PATENT AND TRADEMARK OFFICE
CERTIFICATE OF CORRECTION

PATENT NO. : 7,251,638 B2 Page 2 of 2
APPLICATION NO. : 10/792292
DATED : July 31, 2007
INVENTOR(S) : Fujii et al.

It is certified that error appears in the above-identified patent and that said Letters Patent is hereby corrected as shown below:

In column 26, at line 10, change "(7-6)" to --(9-11)--.

Signed and Sealed this

Twenty-second Day of July, 2008

JON W. DUDAS
*Director of the United States Patent and Trademark Office*